United States Patent
Yoshimura et al.

[11] Patent Number: 5,300,353
[45] Date of Patent: Apr. 5, 1994

[54] SHRINKABLE, STRETCHABLE MULTI-LAYERED FILM

[75] Inventors: Isao Yoshimura, Fujisawa; Shin Kahata, Tsu, both of Japan

[73] Assignee: Asahi Kasei Kogyo Kabushiki Kaisha, Osaka, Japan

[21] Appl. No.: 863,307
[22] PCT Filed: Nov. 13, 1991
[86] PCT No.: PCT/JP91/01551
  § 371 Date: Jul. 13, 1992
  § 102(e) Date: Jul. 13, 1992
[87] PCT Pub. No.: WO92/08611
  PCT Pub. Date: May 29, 1992

[30] Foreign Application Priority Data

Nov. 14, 1990 [JP] Japan .................................. 2-306301

[51] Int. Cl.$^5$ .................................................. B32B 7/02
[52] U.S. Cl. ................................... 428/213; 428/349; 428/516; 428/520; 428/518; 428/910
[58] Field of Search ............... 428/516, 213, 520, 518, 428/349, 910

[56] References Cited

U.S. PATENT DOCUMENTS 4,619,859 10/1986 Yoshimura .......................... 428/213

FOREIGN PATENT DOCUMENTS 8175635 10/1983 Japan .
60-79932 5/1985 Japan .

*Primary Examiner*—Edith Buffalow
*Attorney, Agent, or Firm*—Birch, Stewart, Kolasch & Birch

[57] ABSTRACT

A high-strength multi-layered film excellent in heat resistance, shrinkability and stretchability and usable for wrapping of various articles which comprises at least five layers comprising a surface layer (S layer) mainly composed of at least one polymer selected from (A), (B), etc. and as inner layers at least one base layer (SBC layer) containing mainly a mixed composition comprising a combination such as (A)+(B)+(C) or the like, at least one core layer (H layer) containing mainly a polymer selected from (C), and at least one auxiliary layer (R layer) containing mainly at least one polymer selected from (A) and (B), with a proviso that when the R layer is placed adjacent to the S layer, the R layer comprises the resin different from that of the S layer, said (A) being a low-density polyethylene or a copolymer of ethylene with a specific monomer, said (B) being a soft thermoplastic elastomer having a Vicat softening point of 80° C. or lower, and said (C) being a specific polymer such as a crystalline polypropylene or the like or a mixed polymer thereof; and a process for producing the same.

15 Claims, No Drawings

SHRINKABLE, STRETCHABLE MULTI-LAYERED FILM

TECHNICAL FIELD OF THE INVENTION

The present invention relates to a multi-layered film (oriented and imparted with high strength) for use mainly in a wrapping material field, and its modified film (orientation degree control by heat treatment, crosslink by energy beam or other chemical treatment). More specifically, it relates to an at least monoaxially stretched/oriented, high-strength, multi-layered film excellent in heat resistance, shrinkability and stretchability, which has a layer constitution of at least five layers comprising at least one base layer (SBC layer) mainly containing a specific mixed composition to improve the stretchability, at least one core layer (H layer) composed mainly of at least one hard polymer selected from crystalline polypropylene, crystalline polybutene-1 and crystalline poly-4-methylpentene-1, the core layer being to improve the elastic modulus and heat resistance of the film at least one auxiliary layer (R layer) for the purpose of further synergistically improving the strength of the film, and surface layers (S layers) to improve the optical properties, anti-fogging property and sealability of the film surface.

The film of the present invention can be used not only for shrink wrapping, stretch wrapping and stretch-shrink wrapping but also for skin pack wrapping, tight-contact household wrap, nonshrink wrapping, soft deep-drawn wrapping and the like.

TECHNICAL BACKGROUND

In film wrapping, a variety of wrapping methods taking advantage of the film properties are used. For example, many methods are used such as a method of sealing in a bag form, a method of wrapping by twisting a film, a method of wrapping by heat shrinking (to be referred to as a "shrink method" hereinafter), a tight-contact wrap method typified by Saran Wrap ® (made by Asahi Chemical Industry Co., Ltd.), a stretch wrap method and a skin pack method. Each wrapping method is required to have its own wrapping properties, and in a practical sense, film materials, composition, form and properties are selected suitably for each wrapping method.

Of the above methods, the shrink method uses the heat shrinkability of a preliminarily stretched and oriented film. In this method, an article to be wrapped is preliminarily loosely wrapped by a film, for example, an article is wrapped by sealing, and then the film is allowed to shrink by heating it with hot air, infrared rays, hot water or other heating medium to bring the film into tight contact with the content contained therein. The characteristics of this wrapping are that the appearance of the wrapped article is esthetically good, that the commercial value is improved, that the content quality can be visually and tangibly recognized while the article is kept in a hygienic wrapping, that even an irregularly-formed article and even a plurality of articles can be tightly fixed or wrapped in one wrapping, and that the protection performance for the content against vibration and impact is excellent. Further, as compared with a stretch wrapping method which is popular nowadays in supermarkets and will be described later, the above shrink method characteristically permits an increase in wrapping speed. The shrink method also permits the wrapping of an irregularly formed article which cannot be wrapped esthetically by a stretch wrapping and of an article without any container such as a tray. Moreover, the shrink method characteristically permits the wrapping of various articles more tightly. However, on the other hand, the shrink method has defects in that the film is required to be sufficiently heated until the film becomes shrunken. This would result in the likelihood that the sealing portion would break and that the film would deteriorate after being shrunk (strength and optical properties). On the other hand, conventional shrink films have low stretchability, and would break if stretched, to any large extent. Some conventional shrink films cannot simply be stretched due to too strong of a stress caused by the stretching. Further, these films have almost no self-adhesion properties. For these reasons, these shrink films are not at all suitable for stretch wrapping. Conventional shrink films have the above-described defects and problems.

As long as the above defects can be overcome, shrink wrapping is more advantageous than stretch wrapping in use of film area a film, in lesser film thickness and in wrapping speed.

Meanwhile, stretch wrappings have the following excellent characteristics. An easily stretchable film is rich in fitness in which it is free from permanent deformation and the tendency to form a crease when stretched and it can cope with the concavo-convex form and size of an article to be wrapped. A film can be simply fixed by a wrapping tension without loosening by lightly attaching it under pressure or heat-sealing it. A film for fresh foods has proper permeability to gas to prevent the decrease in freshness and weight. The quality of an article can be visually and tangibly known while the article is kept in a hygienic wrapping. The appearance of a package is esthetically good and the commercial value of a wrapped article can be remarkably improved. A wrapping machine can be selected from less expensive manual wrapping machines and high speed automatic wrapping machines a required. Further, an article to be wrapped is not at all heated. As a wrapping method having the above excellent characteristics, the stretch wrapping method is widely used in supermarkets, etc., for wrapping fruits and vegetables, fresh foods, meat and cooked dishes. However, films for the stretch wrapping have the following defects and problems. Due to having low strength, the film is likely to break mechanically during wrapping or in distribution. The film is likely to form holes when sealed. Since the film is imparted with stretchability by taking care not to give too stretch and orientation when produced, the film is characterized with a low modulus of elasticity. The film thickness cannot be extremely decreased as a result of the importance placed on its operational capabilities (e.g. mechanical suitability and manual workability) (in order to avoid deteriorating these capabilities), and accordingly, a film having a large thickness is inevitably used. Many manufacturers have attempted to create films equivalent to or films which are excellent over conventionally widely used films formed of plasticized vinyl chloride (containing 30 to 33% by weight of a plasticizer), and these manufacturers have manufactured a variety of films from various resins by way of trial. However, up to the present time they have not been successful. From the viewpoint of environmental pollution and hygiene, it has been desired to develop a substitute film for the plasticized vinyl chloride film. However, the use of films having inferior qualities and being poor in handling properties is unavoidable at the present time. However, these substitute films being used at present are poor in handling and are used with reluctance in a working site due to their poor wrapping workability. These substitute films are not used in such amounts that they can replace vinyl chloride films. Presently, the amount of these films which are in use is very small.

The shrink wrapping is explained hereinafter, which, of course, does not limit the present invention.

As for shrink wrapping, a stretched film of plasticized polyvinyl chloride (to be referred to as PVC hereinafter) is used in the largest quantity as a high-class shrink wrapping film. This film has superior advantages in that it is capable of heat shrinkage at a high rate and at a relatively low temperature. It permits excellent shrink wrapping in a wide temperature range, and also has a high film elastic modulus (50 to 200 kg/mm$^2$) and excellent suitability to mechanical wrapping. However, it is inferior in heat sealability and in moisture proof, and it has a hygienic problem due to the presence of a plasticizer and a problem of deterioration with time due to the plasticizer. There are also problems in that it generates a toxic gas such as a chlorine-containing gas when fused with a heating wire for cutting. It also generates a corrosive toxic gas when incinerated after use, and it also becomes stiff and fragile and is likely to break due to having poor resistance to cold when a wrapped article is preserved at a low temperature, handled in a cold area or frozen.

In recent years, a polypropylene-based (to be referred to as PP-based hereinafter) shrink wrap film has been attracting attention. The defect with this film is that the shrinkability is inferior to that of a PVC film. A PP-based stretched film is superior in mechanical properties, moisture resistance and fusion-sealability and excellent as a shrink wrapping film. Further, it has a lower specific gravity than PVC, and is advantageous in terms of material cost.

However, PP is a crystalline polymer having a high softening point, and likely to tear when stretched. Moreover, it has a higher heat-shrink temperature than a conventional stretched film, particularly a PVC film, and shows a small shrinkage at a lower temperature of about 100° C. For this reason, PP is required to be heated to a higher temperature in a shrink wrapping step. The tolerable range of the heating temperature is narrow, and further, the dependence of the shrinkage on temperature is sharp. Therefore, due to a local uneven heating during the wrapping, it shrinks unevenly to cause undesirable defects, such as "creases" and "pockmarks", in the course of practical use. If the pp film is sufficiently heated to prevent the above defect, undesirably, an article to be wrapped would become over-heated, and the PP film would undergo devitrification, form holes by being melted, deteriorates in performance and would result in a large breaking which starts from a sealing portion or an air-discharge opening portion. These constitute serious defects. A PP film also has defects in that a wrapped article is likely to be loose since a stress is released after a certain period of time and the film after wrapping becomes hard and more fragile.

In a conventional polyethylene-based film, the molecule cannot be sufficiently stretched or oriented. Therefore, such a film has a low heat shrinkage, a low heat shrink stress in particular. Further, the film has a high shrink temperature, and it is also inferior in strength and optical properties. The strength of the film binding a wrapped article is also low. Therefore, the film having an increased thickness is used in a special field.

The polyethylene-based film, which is obtained by using high energy rays to cause a sufficient crosslinking reaction on the molecule and by stretching it at a high temperature, has a high heat shrinkage and a high heat shrink stress in a high-temperature range, and such a film is excellent before wrapping over a general polyethylene-based film in optical properties such as transparency and gloss and heat resistance such as melt resistance or resistance to formation of holes. Since, however, it is allowed to shrink in a high-temperature range, its performance greatly deteriorates as compared with a film used for shrink wrapping at a low-temperature (particularly, the optical properties greatly decrease). Furthermore, the above film has a defect in that the wrapping speed is inferior for the following reasons. It has heat shrink properties in which it rapidly shrinks under heat. It is difficult to heat-seal due to high crosslinking. It is easily broken due to inferior resistance to tearing and difficult to cut with a heating wire. As described above, to maintain the performance of a film, one of the important features required of shrink wrapping is that the wrapping can be carried out effectively at a low temperature, and this feature is also required when an article to be wrapped is brought into contact with the film (particularly when fresh foods are wrapped).

In case that a known film which has a high shrink temperature (it is practically required to allow the film to shrink at least 20% in the width and length directions), or which shrinks rapidly under heat (due to high shrink dependency upon temperature) is used wrapping is required to be conducted at a temperature greatly exceeding the melting point of the polymer and under very narrow conditions in order to particularly improve the finish of a wrapped article. This case involves a contradicting problem in that the properties of the film are greatly decreased.

On the other hand, when a stretched film is produced from PP as a material, there is employed a method in which PP is melted in an extruder, extruded through dies and rapidly cooled to obtain a film (hereinafter referred to as "raw film") in a tubular form, the tubular raw film is reheated at a high temperature of 130° to 150° C., and stretched by introducing air into the tube. When the material is a low-density polyethylene, it is considered that biaxial stretching for high stretching and orienting easily causes breaking at a processing time and that the stretching is technically very difficult.

For this reason, it is a general practice to employ a one-stage inflation method in which the material is extruded, e.g., at a temperature of 180° to 220° C. and then immediately inflated while properly cooling it with air to form a film having a predetermined size.

The above method has a characteristic feature in that the film can be produced at a very low cost with ease. However, intermolecular flow is likely to occur, and no satisfactory molecular orientation can be obtained by stretching. Further, the film shows very poor optical properties. Therefore, the heat shrinkage and heat shrink stress are small, and the heat shrink temperature region is on a high-temperature side. Only when the film has an increased thickness, can it be used in a special field. For this reason, it is conceivable to prevent he intermolecular flow and obtain a sufficient molecular orientation by employing a method which comprises forming a low-density polyethylene, irradiating the formed product with high-energy radiation under proper conditions to cause a partial crosslinking reaction, reheating the product up to a temperature beyond the melting point (e.g., 140° C.) and stretching it. In this case, however, the degree of the shrinkage is low at a lower temperature, and the resultant film is likely to tear.

For other new wrapping film, a diversity of composite, multi-layered films are known.

With a technical advance in required properties, an increasing number of composite films tend to be produced. For example, there is a composite film obtained by melt-laminating other resin on a nearly unstretched film or a stretched film. Specifically, commercially available is a film having improved heat-sealability obtained by melt-laminating other resin on an unstretched polypropylene prepared by a casting method (called CPP) or an oriented polypropylene (OPP) or a film which is coated with vinylidene chloride-based latex to impart it with barrier properties (called K coat film). A variety of films or a combination of these films are selected depending upon use.

On the other hand, generally known is a co-extruded film obtained by melting a plurality of resins in separate extruders, extruding the resins through a multi-layer die while converging and fusing them inside the die and cooling the resultant product to form a film or sheet.

However, when a film having the above multi-layer structure of which at least one layer is highly stretched and oriented is obtained from a combination of resins having mutually different properties (melting point, softening point, melt index and orientation properties), the optimum extrusion conditions and stretching conditions differ depending upon the resins. Therefore, when such a film is produced by a prior art method, many problems occur including defective phenomena such as a nonuniform section, streaks including an insufficiently stretched portion, a puncture, breach, peeling of layers and whitening due to interfacial roughening. Further, there is obtained a film having different properties from those of an intended film. Thus, these defects have not yet been overcome. In order to overcome these defects, the present inventors completed composite films, which are disclosed in JP,A 55-118859 (corresponding to U.S. Pat. No. 4430378) and JP,A 58-175635. However, these films have not as yet sufficiently met the above requirement level. The present invention has achieved the creation of a film which fully satisfies the properties lacking in these composite films, which widens the use field, and which is capable of exhibiting high performances even though it has a much smaller thickness than any conventional film and is excellent in cost performance. These features will be more clear in comparison made with the Comparative Examples which will follow later.

The present status of the stretch wrapping, a second field to which the film of the present invention is directed, will be described hereinafter.

In this field, films formed from a soft PVC containing, as a material, a large amount, e.g., as much as about 30% by weight (nearly 50 vol %) of a plasticizer are mainly commercially used. If a large amount of a plasticizer is not incorporated, it would be difficult to process these films, or it would be impossible to impart the film with flexible properties, and these films could not be used in this field. Since a large amount of a plasticizer, such as DOP, DOA, etc., is incorporated, these films would have the problems in that the amount of permeating water vapor would increase, and a wrapped article would likely be altered, that these plasticizers would likely migrate to a wrapped article thus contaminating the article, that a gas of the plasticizer and a corrosive chlorine gas would be generated when the film is fused during a wrapping work, which would be hygienically undesirable, that a toxic gas would be generated when a used film is incinerated, and that the film would become less flexible and fragile and would be likely to break due to its poor resistance to cold when a wrapped article is preserved at a low temperature, which is as already described.

Meanwhile, single-layered films formed of a high-density polyethylene, a low-density polyethylene and a PP-based polymer among the generally usable polyolefins have excellent properties over the above defects. However these films do not have the other important properties required for use in the field to which the present invention is directed to. It has not been possible to form a practically usable stretch wrapping film which satisfies all of the following characteristics as a wrapping film. That is, any film for use in stretch wrapping is required to satisfy the following properties simultaneously.

a. The film is to be excellent in film-film adhesion.

b. The film is to have a proper degree of (excellent) recoverability from deformation, a proper degree of elastic elongation and high mechanical strength.

c. The film is to have a proper degree of lubricity.

d. The film is to be excellent in optical properties such as transparency and gloss.

e. The film is to a proper degree of gas permeability.

f. The film is to retain no water drops and to be excellent in anti-fogging property.

g. The film is to be excellent in wrapping workability.

h. The film is to have heat resistance sufficient to endure heat in sealing.

For example, when an unstretched film of PP is stretched, it causes a phenomenon called necking, that is, it is locally stretched and the thickness becomes extremely nonuniform. Even after a load is removed, the stretched portion remains as is. Therefore, the appearance of a wrapped article is extraordinarily impaired, and the purpose in wrapping is not achieved. A stretched film of the same is hard, strong and little extendable so that a very large force is required to extend it, and an article being wrapped would be destroyed. This film is also without any adhesion properties, and it is therefore required to incorporate as much as 5% by weight of a plasticizer such as low-molecular-weight polybutene in order to impart it with stretchability and adhesion properties. In this case, however, since polyolefin is, unlike PVC, not at all capable of retaining the plasticizer, most of the plasticizer bleeds out on the surface and makes the surface sticky, and such a film is not suitable for practical use.

A high-density polyethylene is also too hard to simply stretch. Even if stretched forcibly, it causes a nonuniform thickness due to necking, and results in a similar result. Further, it is all opaque or without gloss and cannot be put to practical use.

Films formed from low-density polyethylenes are much softer than the above film. However, unstretched films of this type cause a necking phenomenon in packaging, and they have little recoverability from deformation, low strength, low transparency, film-film adhesion property poor and a problem in practical use. Therefore, they cannot meet the object of the present invention. Further, when these films are sufficiently stretched (e.g., at an area stretch ratio of 20 times) at a temperature equal to or higher than the melting point according to a conventional method after imparted with a cross-linked structure by electron beam and rendered easily stretchable, the resultant films have the same defects as those of PP, and they cannot be used as a substrate for stretch packaging which is an object of the present invention.

A film formed from an elastic elastomer having nearly complete recoverability from deformation such as a styrene-butadiene copolymer and a rubber substrate formed from other material is free from a phenomenon of said necking. However, such a film has problems concerning optical, properties and hygienic storage of food. Besides these, the stress strength of elongation is nearly completely in proportion to the degree of elongation, and the response in recovery from deformation instantaneously occurs without any delay. There is therefore a problem in that the film takes its original shape immediately before the end portion of the film is set under an article to be wrapped or a tray. Thus, such a film has properties due to which it can be hardly employed for the use of the present invention.

Of these polyolefin-based films, those that are produced by mixing a main component such as linear low-density polyethylene, particularly an ultra-low-density polyethylene, crystalline 1,2-polybutadiene and an ethylene-vinyl acetate copolymer (EVA) with an anti-fogging agent and a tackifier and by forming the resultant mixtures into films by conventional methods (T-die method and air-cooling inflation method) are on trial in the market. However, these films have many of the defects as described above, and presently have not as yet arrived at the level of replacing conventional films.

These films cannot satisfy all of properties which are mutually contradicting such as easiness in elongation in wrapping, heat resistance of a sealing portion, easiness in sealing and prevention of breach in wrapping caused by insufficient film strength, and have unsatisfactory properties. For example, in an EVA film, it is required to increase the content of vinyl acetate (VAc) in EVA in order to make the film easily elongated. In this case, however, the bottom portion (under the tray) tends to be melted under heat and becomes broken in sealing. To prevent this, it is required to increase the film thickness from 16 $\mu$m up to 20 $\mu$, 22 $\mu$ or 24 $\mu$. When the film thickness is increased, however, the defects of the film also increases. That is, it is difficult to elongate the film, the film hardly adheres to the film before sealing, and the film is likely to break due to its decreased strength. Further, the film cost disadvantageously increases.

When other polymers, particularly a low-density polyethylene (particularly a linear type one) or PP-based rubber is incorporated, another problems arise. That is, the important properties such as transparency and gloss tend to be decreased.

DISCLOSURE OF THE INVENTION

The present inventors have made a study to overcome these defects of the films. As a result, they have succeeded, for the first time, in greatly improving the films in heat shrink properties, particularly in heat shrink properties at a low temperature, heat shrink stress, widening of temperature dependence of heat shrink properties, optical properties, heat sealability of films, elongation properties and strength all together, and arrived at JP,A 60-79932 (corresponding to U.S. Pat. No. 4619859). This film has a lower elongation stress than that in the aforedescribed JP,A 58-175635 and is excellent over any existing film in stretchability. However, in order to improve the function, performance and cost performance, it is required to satisfy contradicting properties such as strength (strength against tear), easiness in elongation of a film, stiffness of a film, etc., at the same time, and the above film is still unsatisfactory for these requirements.

The present inventors have made a further study to improve the film on these points and arrived at an invention of a film of which the function is improved by imparting individual layers with divided functions separately and synergistically and arranging the layers three-dimensionally. For example, the film of the invention is remarkably much more improved in stretch-ability (particularly resistance to bubble puncture) than that of the above prior application, excellent in strength against breach under a variety of film use conditions and practically usable even though it has a small thickness.

That is, the present inventors have arrived at the present invention of a novel film, a composite film, which can simultaneously overcome the above-described defects of a variety of films and is most suitable for a variety of packaging methods by arranging specific layers and treating the film under specific conditions.

PREFERRED EMBODIMENT OF THE INVENTION

The present invention has a characteristic feature in that the composite film has a layer containing a specific mixed composition.components, that other specific layers are further combined and that at least one layer is highly stretched, preferably highly cold-stretched, whereby the stretch orientation effective for the unprecedented use of the present invention and other excellent properties which will follow are exhibited by a synergistic effect of said mixed composition.components and the layers of other resins.

The film of the present invention finds a wide range of use, that is, it can be used as a household wrap film and as a film for other various wrapping methods. Among these, it has excellent properties as a shrink film as described above. In particular, it can be produced as a film which is excellent in optical properties, strength, heat-sealability (surface sealability, fused sealability and hot tack properties), elongation and stress relaxation, and is also excellent in low-temperature shrinkability and shrink response (speed). It can further meet the use for stretch-shrink wrapping and complete stretch wrapping.

FIRST ASPECT OF THE INVENTION

The first aspect of the present invention is directed to a high-strength, multi-layered film excellent in heat resistance, shrink properties, stretchability and sealability, which comprises at least five layers comprising surface layers (S layers) composed mainly of at least one polymer selected from (A), (B), crystalline 1.2 polybutadiene and soft ethylene-based copolymer ionomer resins, and, inner layers, which comprises at least one base layer (SBC layer) mainly containing a mixed composition selected from (A)+(B)+(C), (A)+(B) and (B)+(C), at least one core layer (H layer) mainly containing polymers selected from (C), and at least one auxiliary layer (R layer: provided that R layer contains a resin different from that selected for the S layer when R layer is adjacent to S layer) mainly containing at least one polymer selected from (A) and (B), said (A) being at least one copolymer selected from low-density polyethylenes, copolymers of ethylene with at least one monomer selected from vinyl ester monomers, aliphatic unsaturated monocarboxylic acids and alkylesters of said monocarboxylic acids, and derivatives thereof, said (B) being at least one soft thermoplastic elastomer having a Vicat softening point of 80° C. or lower, said (C) being selected from a crystalline polypropylene, a crystalline polybutene-1 and a crystalline poly-4-methylpentene-1 or a mixture thereof.

Preferred embodiments of the present invention are as follows.

A film in which the low-density polyethylene as component (A) is a linear low-density polyethylene (including utra-low-density polyethylene) obtained by copolymerizing ethylene and at least one α-olefin selected from $C_3$–$C_{12}$ α-olefins.

A film in which the low-density polyethylene as component (A) has a Vicat softening point of 80° C. or higher.

A film in which the low-density polyethylene as component (A) is a copolymer obtained by copolymerizing ethylene and at least one α-olefin selected from $C_6$–$C_{12}$ α-olefins.

A film in which component (A) is an ethylene-vinyl acetate copolymer.

A film in which component (B) is at least one soft elastomer selected from an ethylene-α-olefin copolymer, a copolymer from mutually different α-olefins, a butyl rubber-based copolymer, a 1,2-polybutadiene-based polymer, a styrene-conjugated diene-based derivative copolymer and an at least partially hydrogenated polymer obtained by a hydrogenating a styrene-conjugated diene-based derivative copolymer.

A film in which the soft elastomer as component (B) is an ethylene-α-olefin copolymer containing 95 to 5 mol % of a content derived from ethylene and a content derived from at least one α-olefin selected from $C_3$–$C_{12}$ α-olefins.

A film in which the ethylene-o-olefin copolymer as component (B) has a melt index of 0.1 to 10 and a density of not more than 0.905 g/cm$^3$.

A film in which the mixed composition in a base layer (SBC layer) has a composition ratio by weight of $0.90 \geq B/(A+B) \geq 0.05$, $0.90 \geq B/(B+C) \geq 0.30$ or $0.90 \geq B/(A+B) \geq 0.05$ and $2.0 \geq C/(A+B) \geq 0.05$.

A film in which the surface layer (S layer) mainly contains at least one polymer selected from linear low density polyethylenes (including ultra-low-density polyethylenes) and an ethylene-vinyl acetate copolymer selected from component A.

A film in which the surface layer (S layer) is a soft thermoplastic elastomer having a Vicat softening point of 80° C. or lower selected from component (B).

A film in which the auxiliary layer (R layer) is mainly composed of at least one ethylene-α-olefin copolymer soft elastomer selected from component (B) and having a melt index of 0.1 to 10, a density of 0.905 to 0.870 g/cm$^3$ and an ethylene content of 95 to 85 mol % or at least one linear low-density polyethylene (including ultra-low-density polyethylenes) selected from component (A) and having a melt index of 0.1 to 10, a density of 0.905 to 0.935 g/cm$^3$ and an ethylene content of 99 to 90 mol %.

A film in which R layer is placed adjacent to S layer. In this case, R layer is an ethylene-α-olefin copolymer selected from component (A) and having a density of 0.905 to 0.935 g/cm$^3$, and the Vicat softening point of this resin is 1.05 times or more the Vicat softening point of a resin of the surface layer (S layer).

A film in which the base layer (SBC layer) is composed mainly of a mixed composition (A)+(B)+(C).

A film in which the core layer (H layer) is composed mainly of crystalline polypropylene and crystalline polybutene-1 from component (C).

A film having a seven-layer structure of S/R/H/SBC/H/R/S.

A film in which, based on the total thickness, the thickness of the base layer (SBC layer) is 20 to 80%, that of the surface layer (S layer) is 5 to 40%, that of the core layer (H layer) is 5 to 50% and that of the auxiliary layer (R layer) is 10 to 70%.

A film in which a 100% elongation stress of multi-layered film is of 100 to 800 g/cm width on the average (of width and length directions).

A film in which multi-layered film is treated with energy beam and in which at least one layer has a boiling xylene-insoluble gel of 0 to 70% by weight and a melt index of 1.0 or less.

Another aspect of the present invention is directed to a process for producing a highly stretched multi-layered film, which comprises separately melt-kneading resins which are to constitute at least five layers comprising surface layers (S layers) composed mainly of at least one polymer selected from (A), (B), crystalline 1,2-polybutadiene and a soft ethylene-based copolymer ionomer resin, and, inner layers which comprises at least one base layer (SBC layer) mainly containing a mixed composition selected from (A)+(B) (C), (A)+(B) and (B)+(C), at least one core layer (H layer) mainly containing polymers selected from (C), and at least one auxiliary layer (R layer: provided that R layer comprises a resin different from that selected for S layer when R layer is adjacent to S layer) mainly containing at least one polymer selected from (A) and (B), Said (A) being at least one copolymer selected from low-density polyethylenes, copolymers of ethylene with at least one monomer selected from vinyl ester monomers, aliphatic unsaturated monocarboxylic acids and alkylesters of said monocarboxylic acids and derivatives thereof.

said (B) being a soft thermoplastic elastomer having a Vicat softening point of 80° C. or lower, said (C) being any one of a crystalline polypropylene, a crystalline polybutene-1 and a crystalline poly-4-methylpentene-1 or a mixture thereof, extruding the resins through a multi-layer die, rapidly cooling and solidifying the extrudate by means of a liquid cooling medium to prepare a tubular or flat master roll, optionally heating it to a temperature of not more than a temperature of 120° C., and stretching it at a stretching temperature in the range of 3° to 110° C., and at an area stretch ratio of 4 times to 30 times. Preferred embodiments thereof are as follows.

A process in which the stretching temperature is not higher than the crystal melting point of a polymer which mainly compose at least one layer constituting other layers than the core layer (H layer).

A process in which the orientation is modified by shrinking the post-stretched raw film at 40° to 90° C. by at least 5 to 80% (area).

A process in which the rapidly cooled and solidified raw film is irradiated with high-energy beam having an energy of 100 KV to 1 MV at a radiation dose of 1 to 10 megarad, and then stretched.

The present invention will be described in detail hereinafter.

Component A

As component (A), a polymer having an intermediate degree between hard and soft and relatively low crystallinity (crystallinity of 20 to 60%, preferably 30 to 55% by an X-ray method) is mainly selected in view of stretchability and physical properties (softness and strength) The component A includes an ethylene-based copolymer group (former) such as low-density polyethylenes (preferably including ethylene-α-olefin copolymers such as linear low-density polyethylenes (LLDPE) and ultra-low-density polyethylenes (VLDPE)) and a polar functional group-containing group (latter) such as copolymers of ethylene with at least one monomer selected from vinyl ester monomers, aliphatic unsaturated monocarboxylic acids and alkyl esters of said monocarboxylic acids, and derivatives thereof.

The latter group preferably includes an ethylene-vinyl acetate copolymer (EVA), an ethylene-ethyl acrylate copolymer (EEA), an ethylene-methyl methacrylate copolymer (EMMA), an ethylene-acrylic acid copolymer (EAA), an ethylene-methacrylic acid copolymer (EMA), an ethylene copolymer with an alkyl ester of an unsaturated monocarboxylic acid in which the alkyl group of the alcohol component has 2 to 12 carbon atoms, preferably 2 to 8 carbon atoms (e.g., propyl, butyl, hexyl and octyl), a terpolymer formed from at least two monomers above and a polymer (ionomer resin) of which at least part has a saponified carboxyl group and at least part is converted to an ionomer. The content derived from monomer(s) other than ethylene in these copolymers is preferably 1.5 to 12 mol %, more preferably 2 to 10 mol %. When this content is 1.5 mol % or more, the resultant film is excellent in sealability, flexibility, transparency and various strength properties. When this content exceeds 12 mol %, the extrusion processability, the mixability with other components and the heat resistance are inferior, or the use of component (A) as a surface layer (outer layer) sometimes causes blocking of the surfaces, which is a problem in handling. The melt index (ASTM: D1238 (E conditions): to be referred to as MI hereinafter) of the resins, when used directly as a material, is generally 0.2 to 10, preferably 0.3 to 5. When it is less than 0.2, there is a problem on mixability of the materials and extrusion properties. When it exceeds 10, an interlayer disorder is likely to be caused in multi-layer extrusion. Further, there is a case when the strength as the base layer (SBC layer) is insufficient. For example, undesirably, there is a bad phenomenon that bubbles are likely to break in stretching. Of the above, preferred for use as one component in the base layer (SBC layer) is EVA, and the vinyl acetate (VAc) content thereof is preferably 3 to 8 mol %, more preferably 3 to 7 mol %.

Among the former polyethylene group, the linear low-density polyethylene (LLDPE) as a preferred example refers to a substantially linear, or nearly linear low density ethylene obtained by an intermediate-, low- or optionally high-pressure method, which is obtained by copolymerizing ethylene with not more than 9 mol %, preferably approximately 1.5 to 8 mol % of at least one olefin selected from $C_3$–$C_{12}$ α-olefins such as propylene, butene, pentene, hexene, heptene, octene and 4-methyl-1-pentene. MI of these LLDPEs (including VLDPE) is generally 0.2 to 15, preferably 0.2 to 10 for the same reasons as those described concerning the above latter group. Further, the density is generally in the range of 0.890 to 0.935 g/cm$^3$. More preferred ultra-low-density polyethylene (VLDPE) refers to polyethylene which has the above factors and has a relatively high copolymerization ratio (provided that this polyethylene has a short-chain branch as the above comonomer but has a nearly linear region of which the long-chain branch content is substantially small or absent) and which generally has a density of 0.890 to 0.905 g/cm$^3$ (including 0.905 g/cm$^3$) and a crystallinity of approximately 20 to 35%.

The usual linear low-density polyethylene portion other than the above VLDPE has a density of 0.905 to 0.935 g/cm$^3$, preferably 0.910 to 0.935 g/cm$^3$. These resins has a VSP (to be described later) of 80° C. or higher, preferably not less than 85° C. Alpha-olefin having 5 to 12 carbon atoms are preferred as a comonomer. These polyolefins have a crystal melting point (mp) of not less than 108° C. to not more than 125° C. at a main peak or a high-temperature side peak in the case of multipeaks (2 or 3) when measured by a DSC method (measured at a scan speed of 10° C./minute), and can be distinguished from those having a crystal melting point of 100° to 108° C., having a long-chain branched low density polyethylene of 0.915 to 0.927 g/cm$^3$ which are generally produced by high pressure method.

More preferred a mixed composition containing at least one copolymer selected from a copolymer group (Af) of the above EVA, EEA, EAA, EMMA, EMA and ethylene copolymer with said ester of which the alcohol component has 2 to 8 carbon atoms and least one selected from a copolymer group (Al) of the above LLDPEs, VLDPEs and an ethylene-α-olefin copolymer. In this case, the mixing ratio is preferably $0.10 \geq Al/(Af+Al) \geq 0.9$, more preferably $0.30 \geq Al/(Af+Al) \geq 0.70$. Graft-modified resins (so-called modified resins) obtained by modifying the above resins with a carboxylic group-containing monomer may be used.

Component (B)

The soft thermoplastic elastomer having a Vicat softening point [ASTM D1525 (value under a load of 1 kg), to be referred to VSP] of 80° C. or lower is at least one polymer selected from an α-olefin elastomer, i.e., a copolymer obtained from mutually different at least two α-olefins (carbon number, $C_3$–$C_{12}$), a copolymer obtained from ethylene and an α-olefin having 3 to 12 carbon atoms, butyl rubber type elastomer, styrene-conjugated double bond diene derivative block copolymer elastomer, a copolymer prepared by hydrogenating at least part of a portion derived from the conjugated double bond polymer of said elastomer and thermoplastic polyurethane. Graft-modified resins from the above resins (treated in the same manner as above) may be used.

Of these, preferred are α-olefin elastomer, 20 i.e , a copolymer of α-olefins and a thermoplastic elastomer formed of a copolymer of ethylene and α-olefin. The former refers to a copolymer obtained from a combination of at least two different α-olefins ($C_3$ to $C_{12}$), and the latter refers to a copolymer obtained from ethylene and at least one selected from α-olefins having 3 to 12 carbon atoms. Further, these copolymers may have a content derived from a small amount of hydrocarbon having a polyene structure such as dicyclopentadiene, 1,4-hexadiene, ethylidene-norbornene, derivatives of these and other component. The α-olefin includes propylene, butene-1, hexene-1, heptene-1, 4-methylpentene-1 and octene-1. The former includes a copolymer from propylene and butene-1, a copolymer from propylene and 4-methyl-pentene-1 and a copolymer from butene-1 and 4-methylpentene-1. In the latter case, the α-olefin preferably includes propylene and butene-1. The ethylene content in the copolymer is 5 to 95 mol %, preferably 40 to 93 mol %, more preferably 65 to 90 mol %. It is further preferably 75 to 85 mol %.

These α-olefin elastomer copolymers generally have a density of 0.870 to 0.905 g/cm$^3$, preferably 0.880 to 0.900 g/cm$^3$, they preferably has a Vicat softening point of not more than 75° C., more preferably not more than 70° C., further preferably of not more than 60° C. The α-olefin elastomer copolymer includes those which are substantially amorphous in a rubbery zone and partially crystalline copolymers which have a crystallinity (measured by an X-ray method) of about 30%, preferably not more than 20%, more preferably not more than 15%, further preferably not more than 10%. The melting point of the crystal thereof by a DSC method (temperature elevation ratio of 10° C./minute) is generally preferably not more than 125° C., more preferably not more than 110° C., further preferably not more than 100° C. Preferred are a copolymer from ethylene and propylene or butene-1, a copolymer from propylene and any one or a mixture of butene-1 and 4-methylpentene-1, and a copolymer from these monomers and those including a small amount of a compound having a diene structure. For example, preferred is a thermoplastic elastomer which is a random copolymer obtained by polymerization in the presence of a catalyst containing a vanadium compound and an organoaluminum compound and having MI of 0.1 to 10 preferably 0.2 to 6. These copolymers preferably have no block form unlike general unvulcanized rubber, cause no cold flow, have the form of pellets, and have plasticity sufficient to enable the extrusion processing of themselves alone into a film form.

Component (C)

The component (C) includes crystalline polypropylene, high-molecular-weight crystalline polybutene-1 and crystalline poly-4-methylpentene-1 (to be respectively abbreviated as IPP, PB-1 and PMT-1 hereinafter) which are formed from a relatively hard (harder than the components (A) and (B)) and relatively highly crystalline. Each or a mixture of these as component (C) has a Vicat softening point (specified already) of not less than 80° C., preferably not less than 90° C., more preferably not less than 100° C.

IPP included in the component (C) refers to generally commercially available crystalline PP having high isotacticity. Preferred are a homopolymer of propylene and copolymer from propylene and not more than 7 mol % of ethylene, butene-1 or other α-olefin. IPP is not limited to the above. IPP may be another copolymer which is obtained from α-olefins (for example, a copolymer obtained by arbitrary combining propylene, butene-1, 4-methylpentene-1, etc., or obtained from these and a small amount of ethylene, although PP shall not be limited to these) and which satisfies the above properties. IPP may be a mixture of the above copolymers. The melt flow index [measured by ASTM: D1238 (L conditions), to be abbreviated as MFI hereinafter] is 0.1 to 30, preferably 0.5 to 20, more preferably 0.7 to 15. When MFI is less than the above, there arises a problem on the mixability in processing and the optical properties. When it is used in an amount exceeding the above, there arises a problem on the extrusion stability and the stability in a sealing portion.

PB-1 is crystalline polymer having a butene-1 content of not less than 93 mol % and it is also a high-molecular-weight polymer including a copolymer from another monomer (for example, ethylene, propylene and others having at least 5 carbon atoms). Differing from liquid and wax-like polymers having a low molecular weight, for the same reasons described about the above IPP, polymers having a melt index of 0.2 to 10 are preferred. Also preferred is a mixture of IPP and PB-1, either one of these or a composition obtained by adding a hydrogenated hydrocarbon resin (preferably a hydrogenated hydrocarbon resin obtained from constituent monomers, at least one of which at least partially contains a cyclic portion) to one of these two or both. In addition to these, a hard polymer may be used if it has compatibility and dispersibility and meets the object of the present invention.

PMT-1 may include crystalline copolymers having a 4-methylpentene-1 content of at least 90 mol % and obtained from at least one other α-olefin monomer. Further, the polymer and copolymers may be used in any mixing ratio. PMT-1 may contain the above IPP, PB-1 or other known resin in an amount of not more than 50 wt%. This amount is preferably not more than 40 wt%, more preferably 30 wt%.

There may be used one obtained by adding to the above component (C) at least one of an AS agent and P agent which will, follow in an amount which will follow, or there may be used one obtained by allowing it to support additives such as anti-fogging agents and plasticizers which will follow.

SBC layer

The base layer (SBC layer) composed of a specific mixed composition.component in the film of the present invention comprises the above components, and mainly contains (1) (A) and (B) (2) (B) and (C) or (3) (A), (B) and (C). The amount range of these is preferably
(1) $0.05 \leq B/(A+B) \leq 0.90$,
(2) $0.30 \leq B/(B+C) \leq 0.90$ or
(3) $0.05 \leq B/(A+B) \leq 0.90$ and $0.05 \leq C/(A+B) \leq 2.0$,
more preferably,
(1) $0.07 \leq B/(A+B) \leq 0.70$
(2) $0.40 \leq B/(B+C) \leq 0.87$ or
(3) $0.07 \leq B/(A+B) \leq 0.70$ and $0.07 \leq C/(A+B) \leq 1.0$,
further preferably
(1) $0.10 \leq B/(A+B) \leq 0.50$
(2) $0.50 \leq B/(B+C) \leq 0.85$ or
(3) $0.10 \leq B/(A+B) \leq 0.50$ and $0.10 \leq C/(A+B) \leq 1.0$.

When the amount of the soft component (B) is small, mixtures in any case of (1), (2) and (3) hardly exhibit any synergistic effect, and the properties decrease. For example, the resultant film is inferior in strength, optical properties, low-temperature properties, flexibility, sealability and stretchability. When it is too large, the resultant film is too soft, and tends to be poor in heat resistance, sealability and optical properties. Further, when the amount of the component (B) is selected from the preferable range, or from the further preferable range, the synergistic effect of the mixture increases in any case of (1), (2) and (3), and the various properties are more improved. For example, the film strength, optical properties, low-temperature properties, flexibility, sealability and stretchability are improved further.

Of the above combinations, particularly preferred is the combination (3) mainly containing (A), (B) and (C). Further preferred is a combination of (A), (B) and (C) to which 1 to 10% by weight of at least one additive selected from anti-fogging agents and plasticizers is added, and further preferred is a mixture of this with 1 to 30% by weight of at least one resin (to be described later) which is to support said additives. This tendency similarly appears in the other cases of (1) [A+B] and (2) [B+C]. The component (C) improves the tensile, impact strength, heat resistance, extrusion.stretchability, elastic modulus and heat-sealable range of the mixed composition synergistically with other components, and particularly has a great effect on the heat resistance, extrusion.stretchability, elastic modulus and heat-sealable range. When the mixed amount is small, the effect is lower on the improvement, for example, of film processability or heat-sealable range and strength. The expected value of heat resistance also decreases. When it is too large, the effect is poor in extrusion moldability, transparency, flexibility and impact resistance. Therefore, it is preferably in the above range. The component (A) preferably comprises a specific ethylene-based copolymer among the aforedescribed ones, and in some cases, it is preferred to use the component (A) as a main component among the those components (A), (B) and (C).

A mixture of the components (A) and (C) alone is generally poor in mixability and compatibility, and the above synergistic effect cannot be expected. However, when the component (B) is added, these defects can be remarkably overcome.

The reason therefor is considered to be that the above is due to a complex synergistic effect including a subtle interaction between the properties derived from a structure relating to ethylene and a polar functional group (in a preferable case) contained in the component (A) and other components, or the crystal structure of the mixture and the dispersion state of the mixture, and an effect of the aforementioned post treatment.

For example, when the component (A) is main, it is considered that there is a state of a synergistic effect in which, when the above components are dry-blended in the form of pellets, melt-kneaded and extruded with a highly efficient extruder to form a raw film, the component (B) intricately disperses itself or reacts inside or near the component (C) dispersed in the component (A).

The form of these molded articles differs depending upon molding conditions when these are processed into a film-shaped molded article and imparted with flow orientation.

For example, when a film is formed from the above mixture by extruding the mixture through a film- or sheet-forming die having a small slit (e.g. 1.5 mm) at a relatively high temperature of 230° to 260° C. optionally under a predetermined draw ratio, rapidly cooling the extrudate and processing it into a film, the following is considered although it depends on the kind and amount of the component (C). When the mixture contains 20% by weight of PP, some portions of the component (C), PP, have its dispersed particles in a fibrous form oriented in the flowing direction in the main component (A), and the resultant film is structured as if the film were reinforced with a glass fiber. As a result, the film may exhibit very improved properties such as improved strength. In some cases, further improved properties are exhibited by adding processing such as energy beam processing, chemical treatment and ion injection after the above treatment. This is not necessarily essential.

In the case of (2) (B)+(C), the (B) thermoplastic elastomer particularly preferred is an amorphous or partial-low-crystallinity copolymer having an ethylene content of 65 to 95 mol %, preferably 75 to 93 mol %. This includes a random copolymer obtained from propylene and butene-1, and is supplied in the form of pellets.

Further, the base layer (SBC layer) may contain other known resin if it contains at least 50% by weight, preferably 80% by weight or more of the polymer mixture of the above (1), (2) and (3) and if the other resin does not impair various properties of the film.

Furthermore, preferably the base layer (SBC layer) of the special multi-layered film of the present invention after extruded in the form of multi-layer together with other resins is subjected to activation treatment with high-energy beams such as electron beam ($\beta$-ray), $\gamma$-ray and ultraviolet ray having an energy of 100 KV-1 MV to treat the all layers or optional layer(s), or to treat gradiently it in the thickness direction or is modified by allowing a selective crosslinking reaction to take place in continuous phase or dispersion phase of the base layer (SBC layer) prepared by mixing other resins with the base resin to disperse the other resins in the form of particles, plates, fibers or net work. These treatments result in remarkable improvements of strength (especially tear strength), heat resistance, and stretchability. The degree of the "crosslinking" is such that boiling xylene insoluble gel content is 0–50% by weight and MI is 1.0 or less, preferably the gel content is 0.1–40% by weight and MI is 0.5 or less, more preferably the gel content 0.5–30% by weight and MI is 0.1 or less, further preferably the gel content is 1–25% by weight and MI is 0.1 or less and most preferably the gel content is 1–20% by weight and MI is 0.1 or less as a whole of the specified layers or preferably in the unit of at least 0.3 $\mu$m in the thickness direction in the case of gradient treatment in the layer and in terms of single material as a whole of the dispersion layer in the case of dispersion state.

When the insoluble gel content is larger than the above amount, the molded article shows decrease in elongation, strength and deterioration. In particular, a film formed therefrom causes the problems that the heat-sealability deteriorates, for example, it cannot be sealed or it cannot be cut with a heating wire, that it is liable to break, and that the degree of stretchability imparted by post treatment is small. Therefore, the above range is preferred. When the undissolved gel content is set in the preferable range or in the more preferred range, the film is more improved in the property balance among sealability, heat resistance, stretchability, and, the like.

The insoluble gel content can be obtained from calibration curve easily prepared from dosage by treatment of single material.

In the thickness structure, the percentage of the base layer (SBC layer) based on the total thickness of the film is preferably 20 to 80%, more preferably 30 to 70%, further preferably 40 to 70%. The lower limit of the above range is the percentage required for producing the synergistic effect of the present invention by particularly stably (without breach of the film by puncture and surging) achieving the cold stretching of other layers as well, which could not be successfully cold-stretched in themselves, with the cold stretching force of the base layer (SBC layer). This is also the thickness required for producing the above-described various properties which the composition of the base layer imparts. A similar effect is also obtained in a high-temperature stretching zone. The optimum percentage thereof can be determined depending upon the purpose of the film. For example, when other layers include a composition layer which can be hardly imparted with cold stretching, the lower limit of the thickness of the base layer is relatively higher. When a composition layer which can be easily imparted with it is included, the layer percentage level may be lower if the processability alone is considered. However, in order to take advantage of the properties of the base layer formed from said composition after stretching other than the processability (i.e., cold stretching force) of the base layer, it can be determined after a balance between these two is considered. The upper limit of the above range is the percentage to be determined depending upon the effect of the other layer to be used, and it can be determined depending upon a purpose and as required.

H layer

The core layer (H layer) composed of the component (C) as other layer of the present invention has a higher elastic modulus than any other layer, and it imparts the entire film with rigidity, imparts the entire film with dimensional stability, and imparts the film with heat resistance represented by VSP, melting point. It is composed mainly of a single polymer or polymer mixture selected from the aforedescribed crystalline polypropylene (IPP), crystalline polybutene-1 (PB-1), crystalline poly-4-methyl.pentene-1 (PMT-1) and other $\alpha$-olefin copolymers, and it is preferably a polymer mixture. In addition to the above polymers, the core layer may contain not more than 50% by weight, preferably not more than 40% by weight, more preferably not more than 30% by weight of the polymer(s) described concerning the other layers of the present invention or other known polymer(s). To be more specific, these "other" polymers include a resin or resin mixture used in the above base layer (SBC layer), resins or petroleum resins used in the surface layer (S layer) and auxiliary layer (R layer) which will be described later, and other known resins. These may be [IPP+PB-1+petroleum resin], [IPP+component (A)] and [IPP+component (B)]. The core layer may be imparted with heat resistance by using a highly crosslinkable resin and crosslinking it preferentially over other layers. In this case, it is advantageous to constitute the composition of the core layer (H layer) so as to have higher heat resistance than any other layer. The "heat resistance" refers to the properties of the resin per se or the resin mixture and a value expressed as a synergistic effect of the other layer in the use to be described later, particularly when the sealability is measured. The multi-layered film of the present invention has the contradictory properties, heat resistance, low-temperature shrinking properties and stretchability. When the core layer is present as a layer obtained by a high-temperature (higher than melting point) stretching method other than the preferred process of the present invention, a general low-stretch ratio stretching method or an unstretched method, the object of the present invention, of course, cannot be achieved. The percentage of the thickness of the H layer based on the total thickness of the film is preferably 5 to 60%, more preferably 5 to 40%, further preferably 5 to 30%. In particular, when the film is used for stretch wrapping, it is 5 to 20%. The lower limit is set for a reason that the core layer (H layer) takes part in exhibiting the above synergistic effect. The upper limit is set for reasons that the synergistic effect with the other layers such as the base layer (SBC layer), the surface layer (S layer) and the auxiliary layer (R layer) is not exhibited any further and that the processability is decreased eve if the amount exceeds it. For the layer constitution meeting a purpose, it is sufficient to set the percentage of the thickness of the core layer in the above range. In addition, the lower limit of the thickness is preferably 0.5 $\mu$m.

S layer

The surface layer (S layer) is composed mainly of at least one polymer selected from the component (A), the component (B) and other resin. These copolymers are selected from those specified as the component (A) such as linear low-density polyethylenes (LLDPEs including VLDPEs), an ethylene-vinyl acetate copolymer (EVA), an ethylene-acrylic acid copolymer (EAA), an ethylene-acrylic acid ester copolymer, an ethylene-methacrylic acid copolymer (EMA), an ethylene-methacrylic acid ester copolymer, a copolymer of ethylene with an alkyl ester of said unsaturated carboxylic acid in which the alkyl group of the alcohol component has 2 to 12 carbon atoms, preferably 2 to 8 carbon atoms (e.g., propyl, butyl, pentyl, hexyl, heptyl and octyl) and a multi-element copolymer formed therefrom, an ethylene-$\alpha$-olefin copolymer included in the component (B) (preferably an ethylene-butene-1 random thermoplastic elastomer), crystalline 1,2-polybutadiene, and a resin (Io) obtained by saponifying at least part of ethylene-acrylic acid ester or ethylene-methacrylic acid ester and further crosslinking at least part thereof.

LLDPEs (excluding VLDPEs, which will be described later) preferably has MI of 0.2 to 10 and a density of 0.905 to 0.935 g/cm$^3$, more preferably has MI of 0.2 to 8 and a density of. 0.910 to 0.925 g/cm$^3$, further preferably has MI of 0.2 to 6. The lower limit of the MI is set for a reason that the extrusion to form a film has a limit. The upper limit is set for reasons that the use of such a material for the surface layer (S layer) makes the cold stretchability of the above base layer (SBC layer) unstable, that the seal strength of the sealed portion of the film is insufficient, that the film strength is insufficient and that the film stretchability is insufficient. The upper limit is also set because of a tendency toward instability of stretchability, a decrease in low-temperature sealability of a cold-stretched film, bleeding properties of additives, a decrease in optical properties, and particularly extreme deterioration of optical properties after the film is shrunk (e.g., haze value and gloss). The following has been found; In the above range, the above processability and the various properties are not deteriorated, and the various properties of the multi-layered film, particularly the base layer (SBC layer) are not deteriorated. In contrast, due to the synergistic effect with other layers, these factors are remarkably improved. In properties in particular, the various strength properties, the sealability and the resistance to an oil at a high temperature are remarkably improved. It is preferred to use one having a crystal melting point (mp) of 110° to 125° C. as a main peak value or a high-temperature side peak value in case of a plurality of peaks, measured by a DSC method (temperature elevation rate 10° C./minute). It is also preferred to use one obtained from octene-1, 4-methylpentene-1 and hexene-1 as a comonomer in view of film formability and tear strength. Further, LLDPE which is a main component may be used in combination with ones disclosed in the present specification or other known polymers if these do not impair the above properties. The limit of the amount of these other components is not more than 50% by weight, preferably not more than 40% by weight, more preferably not more than 30% by weight.

In case of preferred ultra-low-density polyethylene (VLDPE), it generally has a melt index of 0.2 to 15, preferably has a melt index of 0.2 to 10. The upper and lower limits above are set for the same reasons as those described concerning LLDPE. The density is preferably 0.880 to 0.910 g/cm$^3$, more preferably 0.890 to 0.905 g/cm$^3$. The upper limit of the density is set because of flexibility, a decrease in an elongation stress and widening of the lower limit of the heat-sealable temperature in the film grade for a more stretching use. The lower limit is set due to the film strength (tear strength) and excess sticky nature on the film surface. VLDPE may be used in combination with other resins in the same manner as in the case of the above LLDPE. The same can be applied to other soft elastomers than those mentioned above. The crystallinity of VLDPE (by an X-ray method) is preferably 10 to 40%, preferably approximately 15 to 35%.

In the ethylene-vinyl acetate copolymer (EVA), the vinyl acetate group (VAc) content is 3 to 10 mol %, preferably 3 to 7.5 mol %, more preferably 3.5 to 6 mol %. MI is preferably 0.2 to 5, more preferably 0.5 to 3, further preferably 0.5 to 2.0. This description can apply to the other copolymers obtained from aliphatic unsaturated monomers. The surface layer may be formed from a copolymer or monomer having a carboxylic acid group or a resin blend, and the surface layer may be subjected to ionomerization treatment (e.g., chemical treatment and physical treatment such as ion injection, to add alkali metal or alkaline earth metal), crosslinking treatment or other chemical reaction treatment such as grafting. These treatments may be carried out with an angle in the thickness direction of the layer.

The ethylene-α-olefin copolymer is preferably a random thermoplastic copolymer elastomer obtained from ethylene and at least one of butene-1, 4-methylpentene-1, hexene and octene. This elastomer has MI of 0.5 to 10.

The crystalline 1,2-polybutadiene copolymer is thermoplastic, and has a crystallinity of 10 to 35% and MFI (the aforedescribed ASTM method, C conditions) of 1 to 10. Plasticized PVC may be used case by case.

Of the above, preferred is the case in which the surface layer is composed mainly of EVA. Further, a mixture of the above resins for the surface layer (S layer) may be used. Further, the material for the surface layer may contain other resins described in the present invention and other known resins in such an amount that they do not impair the object of this layer, low-temperature heat-sealability, bleeding properties of additives, optical properties (particularly improvement in haze and gloss values) and the characteristic in that the deterioration of the optical properties after the film is allowed to shrink is prevented by a synergistic effect with the other layers. The amount thereof is not more than 50% by weight, preferably not more than 40% by weight, more preferably not more than 30% by weight.

The percentage of the thickness of the surface layer (S layer) based on the total thickness of the film is preferably 5 to 40%, more preferably 10 to 40%, more preferably 15 to 30%. Further, the total thickness is preferably 0.5 to 25 μ, more preferably 1 to 20 μ. The above "lower limit" is the minimum thickness required for the surface layer (S layer) exhibiting its effect synergistically with the other layers. The upper limit is the limit required to obtain the processability and the properties of the other layers.

R layer

The auxiliary layer (R layer) is described hereinafter, which improves the tear strength synergistically with the other layers and controls the bleeding of additives The R layer characteristically refers to at least one layer composed mainly of at least one polymer selected from the aforedescribed components (A) and (B). However, when R layer is placed adjacent to the above S layer, R layer is composed of a resin which is different from the resin selected from S layer (in copolymerization ratio, graft treatment, MI, crystallnity, density, monomers). The resin selected from the preferred component (A) to constitute this layer includes linear low-density polyethylene (LLDPE) or ultra-low-density polyethylene (VLDPE) included therein, an ethylene-vinyl acetate copolymer (EVA), an ethylene-acrylic acid copolymer (EAA), an ethylene-acrylic acid ester copolymer (EEA) and an ionomer resin. In these copolymers, the content derived from monomers other than ethylene is preferably 2 to 12 mol %, preferably 2.5 to 10 mol %. When this content is less than 2 mol %, the film tends to show a decrease in flexibility, stretching properties, resistance to tear and stretchability. When it exceeds 12 mol %, the extrusion moldability, stretchability, resistance to tear tend to decrease.

The above copolymers generally have MI of 0.2 to 15, preferably 0.2 to 10. When MI is less than the lower limit, the extrusion moldability and the mixability in use as a mixture decrease. When it exceeds the upper limit, the extrusion moldability (in particular, interlayer disorder) and the tear resistance tend to decrease. Of the above, preferred is LLDPE (density 0.905 to 0.935 g/cm$^3$). More preferred is one obtained from ethylene and α-olefin having 5 to 12 carbon atoms. When R layer is placed adjacent to S layer, preferred is a resin, having a VSP which is at least 1.05 times the VSP of the resin of S layer, and more preferred is an ethylene-α-olefin copolymer selected from the component (A) and having a density of 0.905 to 0.935 g/cm$^3$. When an ethylene-α-olefin copolymer is selected for the surface layer (S layer), there is selected a resin having VSP which is 1.05 times or more higher than VSP of the resin of said surface layer. In this case, the strength in a sealing portion and the low-temperature sealability tend to be more improved.

In place of the above ethylene-based co-polymer, there may be used a copolymer (B) composed mainly of other α-olefin and ethylene-α-olefin copolymers other than the above. In this case, the above copolymerization ratio and the limitation of MI can also apply.

Of the above, preferred is LLDPE (including VLDPE) having a density of 0.870 to 0.915 g/cm$^3$, preferably 0.880 to 0.910 g/cm$^3$ or other ethylene-α-olefin copolymer. And, it is advantageous to use a copolymer obtained from an α-olefin having 4 to 12 carbon atoms, preferably 5 to 10 carbon atoms (e.g., 4-methylpentene-1, hexene and octene) in view of improvement particularly in tear resistance among the above described properties. When stretchability of a film is regarded as important in addition to the above, preferred is one having a density of 0.880 to 0.905 g/cm$^3$. The film is preferably provided with at least two R layers, and in this case, the number of other layer(s) between R layers is preferably one, more preferably two and further preferably three.

The percentage of the total thickness of the R layer based on the total thickness of the film is generally 5 to 45%, preferably 10 to 40% for both a single or a multi-R layers. Further, the total thickness thereof is 0.5 to 15 μm, preferably approximately 1 to 10 μm.

Additives to layers

An additive may be incorporated into at least one of the surface layer (S layer), the base layer (SBC layer) and the auxiliary layer (R layer). The additive includes slip agents such as erucic amide, behenic amide, acid bisamide-based agents, oleic amide and stearic amide, liquid slip agents such as silicon-based agents and polyethylene glycol-based agents, various solid resins, fine particles of crosslinked resins (average particle diameter 0.1 to 5 μm), inorganic fillers and others. These are used alone or in combination. The amount thereof is 0.1 to 2.0% by weight, preferably 0.2 to 1.0% by weight. An anti-fogging agent may be also used alone or in combination with the above slip agent. The anti-fogging agent includes nonionic surfactants such as polyhydric alcohol esters of fatty acids, polyoxyethylene alkyl ether, polyoxyethylene alkyl phenyl ethers. For these, there is used at least one of monoester of glycerin and either oleic acid or stearic acid, diglycerin monoglyceride of oleic acid or lauric acid, sorbitan monolaurate, polyoxyethylene alkyl ether, polyoxyethylene sorbitan oleic acid ester, polyoxy.ethylenenonyl.phenyl ether, alkyl.alkylolamide, alkylalkylolamine, polyoxyethylene monooleate and others. The amount thereof for use in each of the layers is generally 0.3 to 5% by weight.

In addition, a small amount of mineral oil and a small amount of a known plasticizer ma be added to the above layers. The amount of each for use is preferably approximately 0.5 to 5% by weight. Further, a tackifier (to be referred to as P agent) may be added to the above as required. The tackifier includes alicyclic unsaturated hydrocarbon-based resins (hydrogenated cyclopentadiene resin, a hydrogenation resin from a petroleum resin containing a cyclic component as a C$_9$ fraction, etc.), rosins, esterified rosins, petroleum resins other then the above, and terpene resins. The amount thereof for use is preferably 0.5 to 7% by weight, more preferably 1 to 5% by weight These additives can be added to any layer(s) alone or in combination depending upon purposes. The total amount thereof for use is nearly 0.5 to 15% by weight, preferably 1 to 10% by weight When the above additives are incorporated into one or both of the base layer (SBC layer) and R layer as internal layers, these produce a further effect In his case, these additives bleed out to the film surface through the surface layer (S layer) and produce their increased effect as compared with the case in which these are added to the surface layer (S layer) alone. Further, the bleed speed can be adjusted by the base layer (SBC layer). Thus, there is produced a synergistic effect on retaining the persistence of the effect. Further, unexpectedly, a phenomenon of contamination on the film surface occurs to a particularly less degree than that in the case of adding the additives to a single layer, the reason for which is not yet known.

Further, especially excellent synergistic effect can be exhibited when to the base layer (SBC layer) are added the P agent, at least one of APP, 1.2PB, EVA of high VAc content and others, and 1-30% by weight, more preferably 3-20% by weight, further preferably 5-15% by weight of a carrier resin (AS agent) which retains the above-mentioned anti-fogging agent and plasticizer and inhibits bleeding of these additives and amounts of the additives are freely balanced. That is, the anti-fogging agent and the plasticizer are effectively retained and total amount of these additives acts as a polymer plasticizer without bleeding most of these additives and they are stabilized. Further surprisingly, it has been found that the addition of the carrier resin is effective for reduction of rubber elastic component by improvement of hysteresis curve of the whole film caused by impartment of an elasticity which is a viscoelastic property which has not been sufficiently attained. As a result, the wrapping capability has been remarkably improved.

Further, it has been also made clear that the sticky nature on the film surface and the contamination of an article to be wrapped, which are of serious problems in wrapping, are reduced. The above balanced amounts produce interesting effects: It is made possible to satisfy both the plasticizing effect and the rigidity which are contradictory to each other (even if the film thickness is decreased, e.g., to 5 to 10 μ, surprisingly, the degree of easiness of wrapping increases). It also satisfies the film moldability, in particular, the cold stretchability to be stabilized (less puncture, etc). Specific heat treatment works good, and the elongation stress is easily decreased (that is, the film is modified due to partial removal of orientation, and easily elongated). A portion modified in stretch wrapping is again cold-stretched in the elongation direction, and the film strength nonlinearly and easily increases with elongation (wrapping is made easier). This effect can be applied to the other layers. Resins recovered from all the layers may be incorporated into at least one of S layer, R layer, H layer and the base layer in such an amount that does not exceed 30 wt%. It is preferred to incorporate it into the base layer.

Layer arrangement of multi-layered film

Examples of the above compositions and the layer constitution are described below, in which the base layer is SBC layer, the surface layer is S layer, the auxiliary layer is R layer and a heat resistance layer as the core layer is H layer. Other combinations are also possible, and the present invention shall not be limited to the following examples.

(1) Five layers
   S/SBC/H/R/S,
   S/SBC/R/H/S,
   S/R/SBC/H/S (2) Six layers
  i)
    S/SBC/H/SBC/R/S,
    S/SBC/H/R/SBC/S,
  ii)
    S/R/SBC/H/R/S,
    S/R/SBC/R/H/S,
  iii)

S/H/SBC/R/H/S,
S/H/SBC/H/R/S, (3) Seven layers i)
S/R/SBC/H/SBC/R/S,
S/SBC/R/H/R/SBC/S,
S/R/SBC/R/H/SBC/S,
S/H/R/SBC/R/SBC/S,
S/H/SBC/R/SBC/R/S ii)
S/H/R/SBC/R/H/S,
S/R/H/SBC/H/R/S,
S/R/SBC/H/R/H/S,
S/R/H/SBC/H/R/H/S,
S/SBC/H/R/H/R/S,
S/SBC/R/H/R/H/S iii)
S/H/R/SBC/H/SBC/S,
S/H/SBC/R/SBC/H/S,
S/SBC/H/R/H/SBC/S,
S/R/SBC/H/SBC/H/S,
S/H/SBC/R/H/SBC/S,
S/SBC/R/H/SBC/H/S (4) Eight layers
S/R/H/SBC/R/SBC/H/S,
S/R/H/SBC/H/SBC/R/S,
S/R/H/SBC/R/SBC/R/S,
S/H/SBC/R/SBC/R/SBC/S, (5) Double There is also included a film obtained by selecting arbitrary two films from the above combinations, stacking one on the other, and bonding these two in a double state as they are or attaching the facing surfaces by blocking or sealing to form one sheet.

In the above combination, ---/SBC/--- includes not only an embodiment containing one base layer (SBC layer) but also an embodiment in which at least two base layers (SBC layers) having mutually different compositions are laminated as ---/(SBC)$_1$/(SBC)$_2$--- or recovered layer is incorporated into the base layer (SBC layer). This is also the case with the other layers other than the base layer. A particularly preferable tendency is found when a layer having a relatively high tensile modulus, e.g., the core layer, is divided into two layers or more and placed near the film surface layer (S layer). That is, although the tensile modulus of the entire film remains unchanged in the above case, the flexural modulus of the film is greatly improved. When the so-constituted film having an extremely small thickness is for practical wrapping, the wrapping suitability (handling properties and mechanical suitability) and the properties of the folded film for setting it are greatly improved. Further, surprisingly, when the auxiliary layer (R layer) is similarly divided, there is produced an unexpected synergistic effect that the resistance to tear is remarkably improved as compared with the case where it is present as a single layer. The principle of these is not known in detail. However, it is assumed that the effect of dispersing the stress concentration in a tear point is advantageously produced in the case where a specific layer is divided into two layers or more and these layers are placed as far as possible in the thickness direction with other layer(s) therebetween, than in the case where it is present as a single layer.

In addition to the above, layer(s) composed of other different resin(s), e.g., thin PVC layer(s) having a total thickness of 1 to 10 $\mu$, may be incorporated (particularly as a surface layer (S layer)), and the present invention shall not be limited to the above embodiments.

The entire thickness of the film of the present invention is generally 3 to 50 $\mu$, preferably 5 to 30 $\mu$, more preferably 6 to 25 $\mu$. The film of the present invention remarkably produces excellent characteristics as a stretch film for tray wrapping and no tray wrapping when it has an extremely small thickness of 5 to 20 $\mu$, preferably 6 to 15 $\mu$, more preferably 6 to 11 $\mu$. However, the thickness of the film of the present invention shall not be limited to these. The lower, limit of the thickness is the minimum at which the film can be stretched since the film specially has high strength, and the minimum at which the film can compete with other conventional films, even if it is thinner than any other film, since it has a higher strength over any conventional film. When the above thickness is smaller than the above lower limit, it causes a problem in manufacturing and handling. The upper limit is set naturally for a reason based on manufacturing and for a reason that it has sufficient properties as compared with other films having a larger thickness. For example, surprisingly, while a general soft PVC stretch film has a practical thickness of 16 $\mu$, the film of the present invention is superior in many ways in practical use even if the film of the present invention has a thickness, e.g., of 7 to 10 $\mu$.

The film of the present invention may be that which is nearly monoaxially stretched lengthwise or widthwise according to cold-stretching as a preferred embodiment in addition to that which is biaxially stretched. However, the film of the present invention is preferably that which is first biaxially stretched and then allows the lengthwise or widthwise shifting of the orientation. Depending upon usage and use, the stretchability of the film can be controlled. This point is not observed in any conventional films. Further, the film of the present invention is so formed that it can be imparted with elongation by freely changing its orientation (removing the orientation) by heat-treating it in a constrained state, in a freely shrunk state or in a monoaxially shrunk free state, and further, it can be again imparted with cold orientation depending upon the stretching degree in wrapping thereby to strengthen it in wrapping, whereby wrapping can be remarkably easily conducted. Among other numerous characteristics, this is the most advantageous point of the present invention. This is achieved by an unconventional new technique and method. As described above, it is preferred to carry out the biaxially stretching first.

The film of the present invention has an optical properties [haze value (ASTM-D1003-52)]of not more than 3.0%, preferably 2.0%. For example, in Run No. 5 in Example 1, the haze value is 0.5%, or the film is remarkably superior. According to the present invention, the film can be processed without impairing the properties (a crystal form which is small in an amount and fine) obtained by rapidly cooling the composition. That is, the film of the present invention can be particularly transparent, since it can be stretched stably in a bubble form at a temperature of not higher than the melting point, preferably not higher than the softening point, of the composition used as a main component.

The film of the present invention has a low-temperature shrinkability of not less than 15% at 80° C., and therefore, it can be effectively used when an article which cannot be wrapped by a stretch method alone is wrapped. This point is not possible with any conventional stretch-wrapping film.

The heat shrinkage is a specific value obtained by taking a square test piece from film, drawing lines lengthwise and widthwise at a predetermined dimension, covering a powder such as a talc powder so that the test pieces does not adhere to its other portion or other substance, treating it with hot air having a predetermined temperature for 5 minutes to allow it to shrink, then obtaining change ratios in both directions and calculating an average of the lengthwise change ratio and the widthwise change ratio.

The present invention also has a characteristic feature in that the rigidity of the film can be freely adjusted to a soft one to a relatively hard one by changing the constitution of the base layer (SBC layer), the constitution of the core layer (H layer) or the thicknesses or compositions of both.

Further, the film of the present invention has another characteristic feature in that it has particularly high tensile strength. In the direction in which the tensile strength is high, at an average in the directions lengthwise and widthwise or in each of the directions lengthwise and widthwise, the film of the present invention has a tensile break strength (the value and values to follow were all obtained by the measurement according to the ASTMD 882-67 method) of at least 4 kg/mm$^2$, preferably at least 5 kg/mm$^2$, more preferably at least 6 kg/mm$^2$. The film of the present invention also has a tensile break elongation, in the stretching direction (in the easily stretchable direction), at an average in both the directions, or preferably in the both directions, of at least 150%, preferably at least 200%, more preferably at least 250%.

The above high tensile strength and great elongation means that the film is tough and does not easily break, and are highly advantageous as a film for protecting a wrapped article, nd the thickness of the film can be remarkably saved.

The film of the present invention further has a characteristic feature in that it is particularly excellent in tear strength (measured according to ASTM D1922-67 at 50 to 100% of a full scale) in addition to the above features. This value (as a film having a thickness of 10 $\mu$) is at least not less than 10 g, preferably not less than 15 g, more preferably not less than 20 g. For example, the film obtained in Run No. 11 in Example 3 has a tear strength of 62 g, while the film in Run No. (1) as a comparative example in Example 3 has a low tear strength of 3 g, which has a similar layer structure but has no auxiliary layer (R layer). From these results, it is clear that Example of the present invention produces a remarkably excellent effect.

The film of the present invention is at the level at which the tensile break strength (average of those lengthwise and widthwise) is 10.8 kg/mm$^2$ and the tensile break elongation is 380% as will be described later (in Example 1, Run No. 7). In general, when the strength is improved by orientation according to a conventional method, the tensile break elongation tends to extremely decrease. For example, a commercially available, fully crosslinked (insoluble gel in boiling xylene 67% by weight) film composed of low-density polyethylene alone, described in Example 1, Comparative (b), has a tensile break strength of 6.9 kg/mm$^2$ and a tensile break elongation of 110%, which values are low. As a result, this film is too easily broken to be used for stretch wrapping. The film of the present invention has the following properties for a stretch film easily stretchable under a small load, one of the important uses of the present invention.

The stretchability is the most important factor for conducting stretch wrapping with a machine, particularly manually. The stress at an average in the length and width direction, as a value for practical use, at 100% elongation is 100 to 800 g/cm width, preferably 150 to 600 g/cm width, more preferably 200 to 400 g/cm width. When the film is stretched in the width direction for wrapping, the length/width balance is preferably 5/1 to 1/1, more preferably 5/1 to 4/3. The former value (5/1) is set due to necking in wrapping by stretching the film and a failure in cutting.

Second, the stress at 200% elongation, expressed as above, is 200 to 1,000 g/cm width, preferably 250 to 900 g/cm width, more preferably 300 to 600 g/cm width. When the film is stretched in the width direction for wrapping, the length/width balance is preferably 5/1 to 1/1, more preferably 5/1 to 4/3. (When a film is broken just before fully stretched due to insufficient elongation in measurement, data is to be obtained by extrapolation.) These values are preferably applied to the case of using the film for stretch wrapping.

Viewed from orientation properties, the stress per unit area on average (length and width directions), at 100% elongation, is 1 to 6 kg/mm$^2$, preferably 1.5 to 5.0 kg/mm$^2$, more preferably 2 to 4.0 kg/mm$^2$. The stress at 200% elongation under the same conditions is 2 to 10 kg/mm$^2$, more preferably 2.5 to 8.0 kg/mm$^2$, further preferably 3.0 to 6.0 kg/mm$^2$, and the balance is at the same level as above.

That is, the film of the present invention preferably has a specific layer structure in which all the layers are at least unidirectionally cold-oriented. Therefore, when the film wrapping an article is first loosely stretched in the direction in which the film can be elongated to a greater extent, the stress extends in the direction at right angles to the direction in which a force is applied, and the film orientation also shifts to the direction in which a force is applied to improve the film strength. That is, it has been found that the film is oriented by cold-stretching. This fact is because a film obtained by a cold-stretching method has a high degree of orientation and a greater residual elongation than a film obtained by any other method. It has been found that the stress propagates in every directions to work and the film in the loosened direction shifts to tightly wrap an article.

Having a specific layer structure, the film of the present invention shows excellent handling properties, excellent heat resistance, particularly excellent resistance to opening caused by melting of a sealing portion in sealing and a wide sealing range. In particular, the film or the present invention produces a remarkable effect when a sealing portion has a portion folded in two or more and an unfolded portion under a tray (in that the heat resistance and sealability which are contradictory to each other should be concurrently satisfied.) Further, the present invention has for the first time succeeded in making an extremely thin film usable as a result of remarkable improvement in the film strength properties and the handling properties in addition to the sealability. For example, in a test in a commercial market, the film of the present invention having a thickness of 10 $\mu$ can replace a plasticized PVC stretch film having a thickness of 16 $\mu$ and enables the fully sufficient wrapping with satisfying various requirements, and the film of the present invention makes the wrapping possible even if it is an extremely thin film having a thickness of 6 μ. It has been found that an article which should be packaged with a plasticized PVC film having a thickness of 26 μ due to severe wrapping requirements can be fully packed with a film having a thickness of 10 μ, provided by the present invention, without any problem. Further, the film of the present invention is optimum for [shrink +stretch] wrapping, and in this case, it is not always necessary to satisfy the above various requirements for elongation and stress in stretch wrapping.

In such a case, that the characteristic of the low-temperature shrink properties further becomes a merit by a wrapping system, consists in an excellent point that a portion near a sealed portion of the film or the entire film shrinks by heat of the sealed portion in sealing concurrently with sealing and wrapping is completed tight. Further, the film of the present invention permits complete wrapping with excellent heat efficiency without altering a wrapped article with heat by a simple method in which there is used hot air having a lower temperature than that used in a shrink wrapping method, a sealed portion is covered to keep the heat of the sealed portion or air is additionally stirred. The above stretch and shrink wrapping-like wrapping with a film has not yet been achieved, and can be one of the fields where the features of the film of the present invention can be worked.

The use and fields of the film of the present invention have been described above. However, the present invention shall not be limited thereto. The film of the present invention is a remarkable film usable for various uses, and no special limitation is imposed on the use of the film of the present invention.

Further, the film of the present invention has a well balance of contradictory properties such as a combination of heat resistance, shrinkability and sealability, that of tear strength and a film thickness, and that of rigidity of a film and easiness in elongation. For example, in the relationship between the heat resistance value $[T_H]°$ C. and the sealing temperature value $[T_s]°$ C. measured by methods specified in Examples to be described later, the value of $[T_H-T_s]$ is at least 15° C., preferably at least 25° C., more preferably at least 35° C.

PRODUCTION OF MULTI-LAYERED FILM

The process for producing the film, provided by the present invention, will be described hereinafter. However, the present invention shall not be limited thereto.

In a preferred embodiment of the process of the present invention, the raw materials are individually thermoplasticized and melted with separate extruders so as to form the above polymer compositions and the layer structures and extruded through a multi-layer die after these materials are allowed to converge inside the die or before the die, or separately extruded resin films are consecutively coated one on another, and the resultant product is solidified by rapidly cooling it to form a sufficiently uniform, tubular or sheet-shaped raw film. Alternatively, raw films are separately prepared by extrusion and laminated one on the other. In the present invention, it is preferred to employ a method in which the raw materials are co-extruded through an annular, multi-layer die to form a tubular raw film although the present invention shall not be limited thereto.

The above-obtained raw film constituting the above layers may be pretreated with high-energy beam as required, for example, with electron beam, gamma ray or ultraviolet ray at a dose of 1 to 10 megarad, preferably 2 to 7 megarad. For example, a variety of electron beam irradiation apparatus producing an electron beam energy of 100 to 1,000 KV are advantageously used, although the apparatus is not specially limited. The irradiation may be carried out from one side only or from both sides. The depth degree of electron beam penetration may be controlled by adjusting irradiation energy. The sensitivity of the resin of each layer of the multi-layered film in the film thickness direction may be changed, for example, on the basis of the molecular weight (relating to melt flow rate) of each resin, the kind of comonomers to be copolymerized, a blend of resins having different crosslinking capability or incorporation of an additive to promote or inhibit the crosslinking. For example, the crosslinking degree (represented by gel %) of one surface or both surfaces of the film or any internal layer may be increased or decreased, an intended layer alone may be crosslinked, a blend component may be mainly crosslinked, and the sealability (widening of the upper and lower limits of the temperature for sealing) may be greatly improved by keeping the crosslinked degree of an intended layer (e.g., surface layer) low, or increasing the crosslinked degree of at least one internal layer. In some cases, crosslinking at so low a level that cannot be represented by gel % (e.g., to an extent that MI of an intended layer is decreased), i.e., low-level treatment may be carried out. Further, the film may be modified by causing gradient crosslinking among the layers in the film thickness direction or in one layer. In this case, desirably, the heat resistance, sealability, surface modification (lubricity, anti-fogging property and optical properties), various strengths and stretchability are sometimes greatly improved. Further, the stretched film may be treated in the same manner as above.

The excessive crosslinking treatment brings an unfavorable result on various properties.

Then, the raw film is heated up to no more than 120° C., or as it is (room temperature), and the film is cold-stretched at a stretch temperature between 110° C. and 30° C. at an area stretch ratio of 4 to 30 times. This stretch temperature refers to the temperature at a stretch initiation point. When the film is used for stretch-applied use rather than shrink-applied use, the lower temperature range is preferred. In particular, the feature is that the stretchability of the film is more improved by allowing the film to shrink at 40° to 100° C. at an arbitrary ratio lengthwise and widthwise but at a total ratio of 5 to 80%, preferably 10 to 60% (area) before or after, or before and after a nip roll after deflating of a bubble after the film is stretched in the process. In this case, the temperature for the treatment is 40° to 90° C., more preferably 45° to 80° C. In this case, the shrink ratio is more preferably 10 to 50 (area) %. The lower limits of the temperature and the shrink ratio is determined in view of the imparting of stretchability. The upper limit of the temperature is determined in view of the film strength, deterioration of the optical properties and a problem of film blocking during the process. The upper limit of the shrink ratio is determined in view of a problem that an uneven thickness in the film width direction occurs.

Preferred embodiments will be described hereinafter. However, the present invention shall not be limited thereto.

Heating, of the above raw film is carried out generally at 120° C. or lower, preferably at 110° C. or lower, more preferably 100° C. or lower. Further preferably, the raw film is heated to a temperature at which the main crystal component is not melted in any one of the base layer (SBC layer), the surface layer (S layer) and the auxiliary layer (R layer), secondly preferably in the two of these layers and thirdly preferably in the all layers and at which the properties obtained by the rapid cooling as mentioned above are not damaged, and then inflated in the form of bubble and sufficiently stretched at a temperature not higher than 110° C., preferably 35°-105° C., more preferably 35°-100° C., further preferably 35°-90° C., and then at a temperature of 40°-80° C. and at a temperature lower than the melting point of the crystal component used in the composition of the above layers, further preferably at a temperature of not higher than the Vicat softening point of the polymer or the mixture used as a main component under sufficient internal pressures, whereby the intended film can be obtained. The above stretch temperature conditions are preferably applied to all layers, but in some case the conditions may not be restricted by the melting point or the Vicat softening point depending on the kind of the main components contained in the surface layer (S layer), the base layer (SBC layer) or the auxiliary layer (R layer). This is because the above restriction is not so significant when the composition is, for example, a soft composition or a composition containing resin of low crystallinity or free of crystal. The optimum area stretch ratio in this case varies depending on composition, construction of layers and temperature at that time, but is generally 4-30 times, preferably 5-20 times and widthwise stretch ratio conducted in the preferred case of biaxial stretching is generally 2-6 times, preferably 2-4 times. In this case, as conditions in order that cold stretching can be sufficiently attained with inhibiting puncture, important are compositions within the above-mentioned ranges and the above-mentioned combination of layers, and besides, preparation of sufficiently uniform raw film is important. However, it is the preferred method for carrying out the stretching most stably to stretch the raw film to the extent at which inflation in width-wise direction of the bubble stops and to immediately deflate at the portion of the maximum diameter by driving roll type deflator. In view of the relation between internal pressure and diameter, the raw bubble has a diameter of about 30 mm or more, preferably 50 mm or more and conveniently has a large size as far as the apparatus permits. By adding the above-mentioned auxiliary layer (R layer), stability of stretching is obtained and especially, there is obtained the effect that puncture occurs quite a few even in the case of extremely thin film. Furthermore, it has been found that when the auxiliary layer (R layer), the core layer (H layer) and other layers are dividedly arranged, further conspicuous effect is exhibited and even the surprisingly extremely thin film of 4 μm with totally 7 layers can be more stably subjected to continuous stretching at 45° C. This effect has been conspicuously superior to that of JP,A 60-79932 (corresponding to U.S. Pat. No. 4,619,859).

The whole layer is uniformly, stably and highly stretched by the feature of the present process of less heat transfer and besides, by the synergistic effect of each layer in the multi-layer being highly stretched and as a result, the film having the above-mentioned characteristics can be obtained. Moreover, film thickness of from extremely-thin level to thick level can be freely obtained. Further, ultra-high speed stretching has become possible for the first time and production of low cost films has become possible.

The above effects cannot be obtained by the conventional stretching method of heating the raw film to higher than the melting point. Especially, in such method, the stretching temperature must be further raised for improving the optical characteristics and as a result, in many cases, it becomes further difficult to apply orientation and strength tends to decrease.

The same thing can be said in the case of the temperature of melting point ±5° to 10° C. and not only the optical characteristics are not further improved, but also puncture occurs due to the temperature at which brittleness of raw film results or high characteristics cannot be imparted in the case of mixed composition. Especially, when different resins are combined in multi-layer, the resins differ in their respective optimum stretching temperature and stretching of all layers is impossible in many of the combinations and normally in many cases, impartment of orientation by stretching of either layer is sacrificed while according to the present method, stretching orientation can be effectively imparted to all layers or layers of as many as possible.

To effectively apply the stretching of the present invention at very low temperatures has never been attained. For example, at 40° C. as in Example 12 given hereinafter, this has been attained for the first time by the synergistic effects of using a uniformly rapidly cooled multi-layered tube containing the specific copolymer layer and satisfying conditions of specific stretching method.

The heating temperature herein used is the maximum temperature of raw film before subjected to stretching in the stretching part and the stretching temperature herein used is the temperature of the part at which the stretching is started and naturally the temperature further lowers by cooling from that part towards the region in which the stretching is terminated. It is desired in the stretching termination region (region in which diameter of bubble reaches maximum) to sufficiently cool to 45° C. or lower, preferably 35° C. or lower and more preferably 30° C. or lower. Therefore, it is desired that the difference in temperature of the stretching starting part and the stretching terminating part is at least 5° C., preferably at least 10° C. and more preferably at least 15° C. These temperatures are those which are measured at the surface of bubble by a contact thermometer. Furthermore, for example, in the case o Run No. 65 of Example 12, temperature of the stretching starting region was 53° C., and temperature at ⅓ length from raw film in the region during inflation between bubble of maximum diameter and raw film was 50° C., temperature at ⅔ length was 39° C. and temperature in the stretching terminating region was 20° C. From the above, it can be seen that the method of the present invention is a novel cold stretching method. Furthermore, when shrinkability is regarded to be important, it is preferred in some case to carry out the stretching at higher temperature side in the above-mentioned range in view of dimensional stability, elastic recovery after shrink and high shrink characteristics.

In order to smoothly carry out the cold high stretching, the stretching in this case is preferably carried out with blowing the air controlled in its temperature by an air ring to the bubble during heating and stretching and with controlling air flow over the surface layer portion as uniformly as possible. The heating temperature of raw film, one which does not exceed by 20° C. over the temperature of the stretching starting part is preferable for stability of bubble.

As one method for controlling air flow near the surface layer portion, there is a method according to which fluid (gas) accompanied on the surface of the film and the boundary film are discontinuously contact removed in circumferential direction by a rectification contacting guide used for substantial separation of the heating part and the stretching starting part, thereby to remove non-uniformity caused by mutual action of the heating part, the stretching starting part and the cooling part. This controlling method can be similarly used in the stretching starting part, the stretching part and the stretching terminating region. Internal pressure in the bubble is high and it is preferred to sufficiently highly stretch the bubble under a high pressure, preferably, 100–5000 mmH$_2$O (for raw film of 200 $\mu$ and 100 mm$\phi$) and more preferably 200–2000 mmH$_2$O. Furthermore, the film of the present invention may be subjected to the aforementioned crosslinking treatment after stretching.

The film of the present invention has the excellent properties as mentioned above and simultaneously has very uniform section after stretching. It is considered that this is because a high extension power is applied to the film by the high bubble internal pressure and thermal history of heating and cooling is especially small as compared with the conventional production method, resulting in high uniformity and stability. There is the characteristic that even if the optical characteristics (both the haze and the gloss) appear somewhat inferior in the stage of raw film, they become much superior after cold stretching. Furthermore, by employing the multi-layers as mentioned above, stability in processing is remarkably improved as compared with employing a single layer, and uniform and high quality products can be obtained.

For example, in the case of PP single layer, the film can be stretched at a temperature in a very narrow range of about 140°–160° C. and moreover the stretching is difficult and continuous stretching can be attained only under severe conditions. When the temperature is lower than the above range, puncture occurs and stretching is impossible and when it is higher than the range, only whitened and weak film can be obtained. In the case of around 80° C. and besides, for example, 37° C. as in the Example of the present invention, stretching cannot be attained at all and in this respect, too, the effect of the present invention is utterly surprising.

The characteristics obtained are also superior to those in the case of single layer, for example, in optical characteristics, low-temperature shrinkability, sealability, tear strength, and impact strength and normally, the film of the present invention can be stretched to the level higher than conventional film. The film of the present invention to be finished as a film for stretch wrapping is characterized in that in addition to selection of the resin compositions of respective layers, it is subjected to heat treatment freely on-line or after winding up after stretching to partially release degree of orientation to impart elongation and cold stretchability and shift of orientation between length direction and width direction can be freely attained.

Specifically, the present invention provides an at least monoaxially stretched and oriented high strength multi-layered film which has a layer constitution of at least five layers comprising at least one layer containing a specific mixed composition which improves mainly stretchability, a layer mainly composed of at least one hard polymer selected from crystalline polypropylene, crystalline polybutene-1 and crystalline poly-4-methyl-pentene-1 which improves elastic modulus and heat resistance of the film, an auxiliary layer which mainly further improves strength of the film, and a surface layer which improves mainly optical characteristics of the surface, anti-fogging propartly and sealability. This film is excellent in especially tear strength and impact strength in addition to heat resistance, low-temperature shrinkability and stretchability and is a packaging film superior in practical wrapping properties and furthermore, this film has sufficient practicality even in the form of extremely-thin film which has not been attained until now and is excellent in cost and performance. Uses of this film include shrink wrapping, stretch wrapping, stretch-shrink wrapping and besides, skin pack wrapping, tight-contact household wrapping, non-shrink wrapping, and soft deep-drawn wrapping. Thus, the film of the present invention is industrially very useful.

EXAMPLES

The present invention will be explained by the following examples and comparative examples.

EXAMPLE 1

Mixed Composition for SBC Layer (M$_1$):

a$_1$: Ethylene-vinyl acetate copolymer (EVA) [Content of vinyl acetate group: 13% by weight; MI: 1.0; mp: 95° C.; VSP: 79° C.]: 35% by weight.

a$_3$: Linear low-density polyethylene (LLDPE) [Copolymer of ethylene with 10% by weight of octene-1 as the $\alpha$-olefin, MI: 3.3; VSP: 85° C.; mp: 120° C. (main peak in the high temperature side); density: 0.912 g/cm$^3$]: 30% by weight.

b$_1$: Ethylene-$\alpha$-olefin copolymer thermoplastic elastomer [Random copolymer with 15 mol % of propylene as the $\alpha$-olefin and 3% by weight of ethylidene-norbornene, MI: 0.45; VSP: 40° C. or lower; density: 0.880 g/cm$^3$; noncrystalline]: 15% by weight.

c$_1$: Crystalline polypropylene (IPP) [Polypropylene homopolymer, MFI: 3.3; mp: 160° C.; VSP: 153° C.; density: 0.90 g/cm$^3$]: 15% by weight.

c$_2$: Crystalline polybutene-1 (PB-1) [MI: 4.0; density: 0.900 g/cm$^3$; VSP: 81° C.; mp: 86° C.]: 5% by weight.

The above resins were mixed (VSP: 78° C.) and 5 parts by weight (based on 100 parts by weight of the mixed resins) of the following AS agent is added thereto.

AS$_1$: Hydrogenated cyclopentadiene resin [Softening point: 125° C. measured by ring and ball method].

The resulting mixture is kneaded.

Mixed Composition for H Layer (H$_1$)

IPP (C$_1$): 70% by weight and PB-1 (C$_2$) 30% by weight are mixed.

R layer

LLDPE (a$_3$).

S layer a$_2$: EVA [Content of vinyl acetate group: 14% by weight; MI: 2.0; mp: 88° C.; VSP: 74° C.]

The above components are thermoplasticized and melt mixed at a cylinder maximum temperature of 220° C. by the following four extruders, respectively: an extruder having a screw of 50 mm in diameter (L/D=37) and an injection port at the position of L/D=8 from the tip portion, an extruder having a screw of 40 mm in diameter (L/D=29), an extruder having a screw of 40 mm in diameter (L/D=37) and an injection port at the position of L/D=8 from the tip portion, an extruder having a screw of 40 mm in diameter (L/D=37) and an injection port at the position of L/D=8 from the tip portion. In this case, from the injection port of extruders for R layer, S layer and SBC layer, two anti-fogging agents of glycerin monooleate and diglycerin monooleate are injected so that each of the layers contained the anti-fogging agents in an amount of 1.5% by weight each and totally 3.0% by weight and are kneaded. Respective kneaded products are extruded from an annular die having 7 layers of 4 kinds and rapidly cooled by a water cooling ring provided at the position of 6 cm from the tip of the die which uniformly discharges water to obtain a raw film of 180 mm$\phi$ (Run No. 1 in Table 1). Various raw films were obtained in the same manner as above except that compositions of the S layer and the R layer are changed as in Run Nos. 2-8.

Unevenness (circumferential direction) in thickness of the resulting films was within ±2%. Each of these raw films is passed between two pairs of carrying nip rolls and take-off nip rolls, where the films are heated to 55° C. for Run Nos. 1-5 and to 45° C. for Run Nos. 6-8 and then air is introduced into the films as they are and the films are continuously inflated by the above-mentioned rectification contact guide to stretch them to nearly 3.2-3.6 times in length direction and 3.2-3.7 times in width direction. The films of stretching terminated area are cooled by an air ring from which cold air of 18° C. is jetted, folded by a deflator, and taken off by nip rolls and air of 50° C. is blown against the films of Run Nos. 1-5. Then, films of Run Nos. 1-5 are shrunk by 10% in length direction and by 30% in width direction in a zone between two pairs of inlet nip rolls and outlet nip rolls, speed of the latter being slower 10 or 15% than that of the former. For the films of Run Nos. 6-8, air of 60° C. is blown against the films and these are shrunk by 15% in length direction and 40% in width direction in a zone between two pairs of nip rolls, speed of outlet nip rolls being slower 15%. Thereafter, these films are simultaneously subjected to heat setting stabilization treatment and edge portions of each film are slit to separate into two films, which are respectively wound up to the predetermined tension to obtain desired films having a given thickness. Table 2 shows various characteristic values of the resulting films and commercially available five films (a), (b), (c), (d), and (e).

It is clear that the films of Run Nos. 1-8 has stable stretchability, has no stain on the surface and are excellent in unti-fogging property and thus are superior to the samples of comparative examples.

Furthermore, all of the films of the present invention are superior, in stretchability to the degree of extremely thin film. For example, when the raw film comprising the combination of layers of Run No. 4 is thinned as above and stretched and heat treated in the same manner as above to obtain finally a film of 4 $\mu$ thick (OF-1), surprisingly the stretching is very stable with few punctures. For comparison, the same raw film from which R layer is omitted and the same raw film from which R layer is similarly omitted and in which H layer is provided at the center portion of SBC layer are thinned to the same thickness and are stretched and stretchability is examined to find that these are both inferior in stretchability (evaluated by the number of punctures). The numbers of punctures of these three films in terms of the number per 1 hour are 2, 15 and 30, respectively. Tear strength also are decreased in this order. Other characteristics of the former film are all within the preferred ranges of the present invention.

Furthermore, the former film of the present invention is obtained in the same manner and is passed between Teflon-coated heating rolls and instantaneously pressed to cause blocking of the seventh layers inside of the bubble to obtain a double film (having totally 14 layers and having a total thickness of 8 $\mu$m). Tear strength of this film is markedly improved, namely, 110 g. Other characteristics are similarly within the preferred ranges.

As practical packaging test, four cucumbers are wrapped with the film of Run No. 2 by the commercially available fused sealing L type packaging machine and passed for 2 seconds through a shrinking tunnel in which a hot air of 90° C. is blown. The resulting package is tight and free from creases of the film and the film well fitted to the content and thus the content is beautifully shrink wrapped in good state without deterioration in optical characteristics after shrinking. Furthermore, the wrapping could be accomplished in good state in a wide range of temperature from low temperature side and in a wide range of wrapping speed.

On the other hand, the commercially available polypropylene shrink film ((c) of comparative example) scarcely shrunk even at 90° C. for 10 seconds and has creases. It could not be sufficiently shrunk unless the temperature of the hot air is raised to 170° C. and residence time is increased to 5 seconds. Even when the temperature of the hot air is further raised and the residence time is further increased, the film has holes and is broken or has lost the clarity. Thus, proper temperature range is very narrow. Moreover, the commercially available PVC shrink film is still insufficient in shrink even under the above conditions. The temperature must be 150° C. and the time must be 5 seconds. The film of the present invention is especially high in shrink respondency (speed) and wrapping could be accomplished in 1 second.

Furthermore, the commercially available crosslinked polyethylene shrink film ((b) of comparative example) also does not shrink well unless the temperature is high (170° C.). A good wrapping is not obtained. This film is readily broken in the sealed portion and the film per se also readily broken. Further, wrapping capability range is judged after wrapping by having creases, banding power, holes in the sealed portion, break of the film which begins from air venting holes and loss of clarity and besides, the degree of finishing to find that the film of the present invention is the most excellent.

Furthermore, wrapping is carried out with the film of Run No. 7 by various wrapping machines commercially sold as automatic wrapping machines for stretch wrapping, namely, one type (called pillow type) according to which the film is stretched in width direction along the direction of flow, the front and rear portions of the film are cut and the film edge portions are tucked in the front and rear of tray and another type (called elevator type) according to which the film is cut to a given size and pulled to the four sides and an article on a tray to be wrapped is pushed up to the said film from underside of the film and then, the four sides of the film are tucked in underneath the tray. The wrapping could be performed by any of these wrapping machines without causing problems in respective steps and with good sealing by a hot plate. Furthermore, good wrapping could be obtained using all of the films of Nos. 1-8 even if the content is loosely wrapped when a simple tunnel in which hot air of 80° C. is blown, is placed above the sealing part of the above wrapping machines.

Especially, when an article having projections is wrapped by the film of the present invention, no break occurs or even when a hole is formed, break is not propagated while when such article is wrapped by conventional films, break occurs frequently. Furthermore, even when wrapping is carried out with the film of the present invention by the above various wrapping machines at increased wrapping speed, good wrapping free from creases could be obtained.

As explained above, the film of the present invention has many superior features over conventional films in the use of shrink film and completely satisfies the various conditions necessary for this use and besides, can also be used for conventional stretch wrapping.

Furthermore, when the above mentioned extremely thin film (OF-1) of 4 μ is tested by the former wrapping machine mentioned above, wrapping could be accomplished without causing creases without using a simple shrink tunnel. Moreover, hand stretch wrapping could also be easily performed without occurrence of break.

Besides, films of Run Nos. 1-8 and OF-1 (especially, films of Run Nos. 6-8 and OF-1) are superior in recovery properties against external deformation caused by the projections after stretch (and shrink) wrapping. The film of comparative example (d) does not recover at all, resulting in looseness and permanent deformation.

The marks in Table 1 indicate the following resins of resin compositions.

$a_4$: Linear low-density polyethylene [Copolymer of ethylene with 9% by weight of 4-methylpenten-1 as α-olefin, MI: 3.6; VSP: 92° C.; density: 0.910 g/cm$^3$].

$a_5$: Linear low-density polyethylene [Copolymer of ethylene with 9% by weight of hexene-1 as α-olefin, MI: 3.2; VSP: 92° C.; density: 0.912 g/cm$^3$].

$a_6$: Linear low-density polyethylene [Copolymer of ethylene with 7% by weight of 4-methylpentene-1 as α-olefin, MI: 2.0; VSP: 109° C.; density: 0.930 g/cm$^3$].

$a_7$: EAA [Content of acrylic acid group: 15% by weight; MI: 5; mp: 95° C.; VSP: 65° C.].

$a_8$: EVA-AA [Content of vinyl acetate group: 4.0% by weight and content of acrylic acid group: 8% by weight; MI: 6; mp: 102° C.; VSP: 70° C.].

$M_2$ - EVA (al): 35% by weight; linear low-density polyethylene ($a_4$): 30% by weight; elastomer ($b_1$): 15% by weight; IPP ($c_1$): 15% by weight; PB-1 ($c_2$): 5% by weight.

$MS_3$ - EVA ($a_1$): 35% by weight; linear low-density polyethylene ($a_5$): 30% by weight; elastomer ($b_1$): 15% by weight; IPP ($c_1$): 15% by weight; PB-1 ($c_2$): 5% by weight.

$M_4$ - EVA ($a_1$): 35% by weight; linear low-density polyethylene, ($a_6$): 30% by weight; elastomer ($b_1$): 15% by weight; IPP ($c_1$): 15% by weight; PB-1 ($c_2$): 5% by weight.

$M_5$ - EVA ($a_1$): 65% by weight; elastomer ($b_3$): 15% by weight; IPP ($c_1$): 15% by weight; PB-1 ($c_2$): 5% by weight.

$M_6$ - EVA ($a_1$): 35% by weight; EAA ($a_7$): 30% by weight; elastomer ($b_1$): 20% by weight; IPP ($c_1$): 10% by weight; PB-1 ($c_2$): 5% by weight.

$M_7$ - EVA ($a_1$): 35% by weight; linear low-density polyethylene ($a_3$): 30% by weight; elastomer ($b_1$): 20% by weight; IPP ($c_1$): 10% by weight; PB-1 ($c_2$): 5% by weight.

$M_8$ - EVA ($a_1$): 35% by weight; EVA-AA ($a_8$): 30% by weight; elastomer ($b_1$): 20% by weight; IPP ($c_1$): 10% by weight; PB-1 ($c_2$): 5% by weight.

$a_{1-3}$ - EVA ($a_1$): 30% by weight; linear low-density polyethylene ($a_3$): 70% by weight.

$a_{1-19}$ - EVA ($a_1$): 30% by Weight; linear low-density polyethylene ($a_{19}$: mentioned hereinafter): 70% by weight; VSP of the composition: 81° C.

$b_2$ - Ethylene-α-olefin copolymer elastomer (copolymerized with 10 mol % of butene-1 as α-olefin); density: 0.895 g/cm$^3$; VSP: 60° C.; mp: 116° C.; crystallinity: 15%.

$b_3$ - Propylene-butene-1 copolymer elastomer (butene-1: 30 mol %); density: 0.880 g/cm$^3$; VSP: 45° C.; mp: 78° C.; crystallinity:, 9.0%.

TABLE 1

| Layer construction of raw film | 1 | 2 | 3 | 4 | 5 | 6 | 7 | 8 |
|---|---|---|---|---|---|---|---|---|
| The first layer (S layer) μ | $a_2$ 9 | $a_{1-19}$ 9 | $b_2$ 9 | $a_8$ 9 | $a_2$ 9 | $a_2$ 6 | $a_2$ 6 | $a_2$ 7 |
| The second layer (R layer) μ | $a_3$ 9 | $a_4$ 9 | $a_5$ 9 | $a_6$ 9 | $a_1$ 9 | $a_7$ 6 | $a_{1-3}$ 6 | $a_8$ 7 |
| The third layer (H layer) μ | $H_1$ 18 | $H_1$ 18 | $H_1$ 18 | $H_1$ 20 | $H_1$ 18 | $H_1$ 3 | $H_1$ 3 | $H_1$ 4 |
| The forth layer (SBC layer) μ | $M_1$ 18 | $M_2$ 18 | $M_3$ 18 | $M_4$ 20 | $M_5$ 18 | $M_6$ 36 | $M_7$ 36 | $M_8$ 35 |
| The fifth layer (H layer) μ | $H_1$ 18 | $H_1$ 18 | $H_1$ 18 | $H_1$ 20 | $H_1$ 18 | $H_1$ 3 | $H_1$ 3 | $H_1$ 3 |
| The sixth layer (R layer) μ | $a_3$ 9 | $a_4$ 9 | $a_5$ 9 | $a_6$ 8 | $a_1$ 9 | $a_7$ 3 | $a_{1-3}$ 3 | $a_8$ 7 |
| The seventh layer (S layer) μ | $a_2$ 9 | $a_{1-19}$ 9 | $b_2$ 9 | $a_8$ 9 | $a_2$ 9 | $a_2$ 6 | $a_2$ 6 | $a_2$ 7 |
| Total thickness (μ) | 90 | 90 | 90 | 95 | 90 | 60 | 60 | 70 |

TABLE 2

| Characteristics | unit | Run No. | | | | | |
|---|---|---|---|---|---|---|---|
| | | 1 | 2 | 3 | 4 | 5 | 6 |
| Haze | % | 0.6 | 0.7 | 0.7 | 1.0 | 0.5 | 0.5 |
| 80° C. shrinkage | % | 37 | 38 | 38 | 35 | 35 | 35 |
| Tensile break strength | Kg/mm$^2$ | 16.2 | 15.9 | 16.5 | 16.9 | 15.1 | 9.6 |
| Tensile break elongation | % | 220 | 240 | 230 | 250 | 280 | 330 |
| Stress at 100% elongation (length direction/ width direction) | g/cm | 860/ 220 | 830/ 230 | 820/ 270 | 850/ 300 | 850/ 250 | 300/ 150 |
| Stress at 200% elongation (length direction/ width direction) | g/cm | —/ 550 | —/ 560 | —/ 520 | 1650/ 530 | 1150/ 470 | 580/ 320 |
| Sealing temperature (Ts)$^{\times 1}$ | °C. | 87 | 85 | 86 | 87 | 85 | 85 |
| Heat resisting temperature (Ts)$^{\times 2}$ | °C. | 155 | 158 | 156 | 159 | 155 | 150 |

TABLE 2-continued

| | | | | | | | | |
|---|---|---|---|---|---|---|---|---|
| Anti-fogging property *3 | — | ⊙ | ⊙ | ⊙ | ⊙ | ⊙ | ⊙ | ⊙ |
| Sealability *4 | — | ⊙ | ⊙ | ⊙ | ○ | ⊙ | ⊙ | |
| Tear strength | g | 26 | 25 | 27 | 39 | 17 | 43 | |
| Stiffness | mg | 45 | 42 | 49 | 49 | 41 | 29 | |
| Thickness of film | μ | 10 | 10 | 10 | 10 | 11 | 10 | |

| | | Run No. | | | | | | |
|---|---|---|---|---|---|---|---|---|
| Characteristics | unit | 7 | 8 | Comparative (a) | Comparative (b) | Comparative (c) | Comparative (d) | Comparative (e) |
| Haze | % | 0.8 | 0.7 | 1.7 | 2.5 | 2.8 | 2.0 | 2.0 |
| 80° C. shrinkage | % | 32 | 37 | 33 | 5 | 3 | 0 | 0 |
| Tensile break strength | Kg/mm² | 10.8 | 9.5 | 8.0 | 6.9 | 12.0 | 2.2 | 3.1 |
| Tensile break elongation | % | 380 | 370 | 150 | 110 | 110 | 300 | 280 |
| Stress at 100% elongation (length direction/width direction) | g/cm width | 280/150 | 280/160 | 500/140 | 1100/1200 | 1500/1600 | 200/120 | 350/150 |
| Stress at 200% elongation (length direction/width direction) | g/cm width | 570/320 | 540/330 | —/— | —/— | —/— | 250/140 | 500/250 |
| Sealing temperature (Ts)*1 | °C. | 85 | 83 | 160 | 170 | 175 | 100 | 180 |
| Heat resisting temperature (Ts)*2 | °C. | 150 | 150 | 150 | 165 | 170 | 95 | 165 |
| Anti-fogging property *3 | — | ⊙ | ⊙ | Δ | Δ | x | ○ | ○ |
| Sealability *4 | — | ⊙ | ⊙ | Δ | Δ | x | x | x |
| Tear strength | g | 46 | 40 | 2 | 4 | 4 | 100 | 100 |
| Stiffness | mg | 25 | 22 | 50 | 12 | 60 | 7 | 6 |
| Thickness of film | μ | 11 | 10 | 13.5 | 15 | 15 | 21 | 16 |

*1 [Sealing temperature]

A commercially available tray (10 cm×20 cm) made of high-impact styrol is wrapped with the film and twofold and four-fold portions of the film are formed under the bottom of the tray and these portions are pressed under a force of 2 g/cm² for 3 seconds to seal the film. The sealing temperature is the lower limit of temperature at which the portions can be sealed without causing peeling of the film when the edge portion of the film is lightly pulled.

*2 [Heat sealing resisting temperature]

This is the temperature at which hole is formed in some place of the film when the folded portion of the film in the above 1 is pressed under 4 g/cm² for 3 seconds. In the case of the thickness of the film being 20 μ or more, the two-ply portion of the film is evaluated.

*3 [Anti-fogging property]

The film is spread over a container containing water of about 15° C. and this is left in a refrigerator at 5° C. for 10 minutes and thereafter, state of waterdrops formed and sticking to the film is observed.

⊙: A uniform water film is formed and the inside can be completely seen through the film.

○: A water film is formed, but has irregularity and the inside is distortedly seen.

Δ: Large waterdrops stick to the film and the inside can be merely partially seen.

x: Waterdrops stick to the film and the inside cannot be seen at all.

*4 [Practical sealability]

Two oranges are put on a tray made of expanded polyethylene and these are hand wrapped by a commercially available hand wrapper for stretch packaging and sealability at the bottom portion by a hot plate is examined by selecting optimum temperature.

⊙: The whole area of the bottom portion is nearly completely sealed under the condition of wide temperature range.

○: 60-80% of the whole area is sealed.

Δ: The bottom portion is spottedly sealed, but holes are formed when it is attempted to seal the whole area.

x: A part is sealed and other part is molten to form holes.

*5 [Loop stiffness strength]

A sample of 25 mm in width and 250 mm in length is curved in the form of loop (length of loop: 60 mm) and the load (mg) when the loop is squashed in the direction of diameter is measured by loop stiffness tester D-R manufactured by Toyo Seiki Seisakusho Co. and this is taken as stiffness (average value of length and width directions).

*6 Gloss is measured in accordance with ASTM-D523-67 at an angle of 45° (Table 10 given hereinafter).

Comparative sample (a) is a commercially available PVC shrink film plasticized to a middle degree (20% by weight).

Comparative sample (b) is a commercially available crosslinked polyethylene shrink film.

Comparative sample (c is a commercially available PP shrink film.

Comparative sample (d) is a commercially available non-stretched type stretch film (EVA containing 20% by weight of VAc group).

Comparative sample (e) is a commercially available highly plasticized PVC stretch film (containing 31% by weight of plasticizer).

The tensile characteristic in Table 2 is expressed by average value in length and width directions (same in all other Examples).

EXAMPLE 2

Films of Run Nos. 9-10 are obtained in the same manner as in preparation of the film of Run No. 1 in Example 1 except that arrangement of the layers and thickness of each layer are changed as shown in Table 3. However, heat setting stabilization treatment after stretching is carried out by blowing air of 50° C. to the films to shrink by 10% in length direction and by 30% in width direction. Characteristics of the resulting films are shown in Table 4.

Four cucumbers are wrapped with the resulting film in the same manner as in Example 1 by the commercially available L type wrapping machine using a shrinking tunnel. The film tightly fitted to the content without occurrence of creases to obtain good wrapping. Optical characteristics after shrinking does not deteriorate to obtain a beautiful shrink wrapping.

Furthermore, a crab with arms or a frozen fish as articles having projections to be wrapped is wrapped with the film in the same manner as above to find no break which might be caused by the projections and shrink wrapping with good finishing could be performed.

Furthermore, when wrapping is carried out by various stretch wrapping machines with a simple tunnel as used in Example 1, there occurs no problems.

TABLE 3

| Layer construction of raw film | 9 | 10 |
|---|---|---|
| The first layer (S layer) μ | $a_2$ 9 | $a_2$ 9 |
| The second layer (SBC layer) μ | $M_1$ 9 | $M_1$ 9 |
| The third layer (H layer) μ | $H_1$ 18 | $H_1$ 14 |
| The forth layer (R layer) μ | $a_3$ 18 | $a_3$ 27 |
| The fifth layer (H layer) μ | $H_1$ 18 | $H_1$ 13 |
| The sixth layer (SBC layer) μ | $M_1$ 9 | $M_1$ 9 |
| The seventh layer (S layer) μ | $a_2$ 9 | $a_2$ 9 |
| Total thickness (μ) | 90 | 90 |

TABLE 4

| Characteristics | unit | Run No. 9 | Run No. 10 |
|---|---|---|---|
| Haze | % | 0.7 | 0.9 |
| 80° C. shrinkage | % | 35 | 33 |
| Tensile break strength | Kg/mm² | 16.2 | 16.8 |
| Tensile break elongation | % | 230 | 230 |
| Stress at 100% elongation (length direction/width direction) | g/cm width | 830/260 | 800/220 |
| Stress at 200% elongation (length direction/width direction) | g/cm width | —/540 | —/500 |
| Sealing temperature | °C. | 86 | 85 |
| Heat resisting temperature | °C. | 158 | 155 |
| Anti-fogging property | — | ⊚ | ⊚ |
| Sealability | — | ⊚ | ⊚ |
| Tear strength | g | 36 | 47 |
| Stiffness | mg | 44 | 40 |
| Thickness of film | μ | 10 | 10 |

EXAMPLE 3

Films of Run Nos. 11-14 and Comparative Run Nos. 1-3 are obtained in the same manner as in preparation of the film of Run No. 6 in Example 1 using raw films having compositions of the respective layers and the arrangement of the layers as shown in Table 5. However, for Run Nos. 11-13 and Comparative Run No. 1, the heat setting stabilization treatment after stretching is carried out by blowing air of 50° C. to the film to shrink by 10% in length direction and by 30% in width direction and for Run No. 14 and Comparative Run Nos. 2-3, the heat setting stabilization treatment after stretching is carried out by blowing air of 60° C. to the film to shrink by 15% in length direction and by 40% in width direction. Characteristics of the resulting films are shown in Table 6.

The resulting films of the present invention are excellent in various characteristics and are superior to the samples of the comparative examples.

When wrapping is carried out with the films of Run Nos. 11-13 for practical wrapping test using the above-mentioned L type wrapping machine, the films tightly fitted to the content with no creases to obtain good wrap and thus beautiful shrink wrapping could be attained without deterioration of optical characteristics after shrinking. Further results are obtained that the content could be wrapped well in a wide temperature range from lower temperature side and a wide speed range. Moreover, when an article having projections is wrapped as in Example 2, good shrink wrapping could be attained with no breaks.

On the other hand, when the same wrapping is carried out with the film of Comparative Run No. 1, stiffness of the film is insufficient and handling is somewhat difficult when the film is used in the form of a thin film. Furthermore, break occurred frequently when an article having projections is wrapped therewith. Moreover, in the case of the film of the present invention, wrapping could also be performed with no problems using various stretch wrapping machine with a simple tunnel. When the film of Run No. 14 is subjected to wrapping tests by various stretch wrapping machine mentioned above, problems in wrapping step are cleared in all of the wrapping machines and sealing by hot plate is satisfactory. When an article having projections is wrapped by various wrapping machines mentioned above, substantially no break occurs or even if a break occurs, it does not propagate in the case of the film of Run No. 14. That is, when the film of the present invention is used, stretch wrapping superior in finish with neither a break nor a crease can be attained even when wrapping speed is increased. Moreover, the wrapping is superior in recovery from deformation caused by the projections under external force.

On the other hand, when the above stretch wrapping is carried out with the films of Comparative Run Nos. 2-3, stiffness of the films is insufficient and running properties in various portions of the wrapping machine are inferior. Therefore, wrapping finish is somewhat inferior and loose wraps are recognized.

Furthermore, when an article having projections is wrapped, break occurs frequently and only the wrapping low in stretching with creases could be obtained. In addition to such tendencies, the film of Comparative Run No. 3 is inferior also in heat resistance and is narrow in temperature range in which sealing is possible and formed holes in sealed portion due to variation in temperature of the hot plate.

TABLE 5

| Layer construction of raw film | 11 | 12 | 13 |
|---|---|---|---|
| The first layer μ | (S layer) $a_2$ 9 | (S layer) $a_2$ 9 | (S layer) $a_2$ 9 |
| The second layer μ | (R layer) $a_3$ 9 | (R layer) $a_4$ 9 | (H layer) Hhd 3 18 |
| The third layer μ | (H layer) $H_2$ 18 | (H layer) $H_3$ 18 | (SBC layer) $M_3$ 9 |
| The forth | (SBC layer) | (SBC layer) | (R layer) $a_5$ |

TABLE 5-continued

| layer | $M_1$ | $M_2$ | |
|---|---|---|---|
| μ | 18 | 18 | 18 |
| The fifth layer | (H layer) $H_2$ | (H layer) $H_3$ | (SBC layer) $M_3$ |
| μ | 18 | 18 | 9 |

| | (R layer) $a_3$ | (R layer) $a_4$ | (H layer) $Hhd\ 3$ |
|---|---|---|---|
| The sixth layer | | | |
| μ | 9 | 9 | 18 |
| The seventh layer | (S layer) $a_2$ | (S layer) $a_2$ | (S layer) $a_2$ |
| μ | 9 | 9 | 9 |
| Total thickness (μ) | 90 | 90 | 90 |

| Layer construction of raw film | 14 | Comparative ① | Comparative ② | Comparative ③ |
|---|---|---|---|---|
| The first layer | (S layer) $a_2$ | (S layer) $a_2$ | (S layer) $a_2$ | (S layer) $a_2$ |
| μ | 6 | 9 | 6 | 6 |
| The second layer | (SBC layer) $M_1$ | (SBC layer) $M_9$ | (SBC layer) $M_9$ | (SBC layer) $M_9$ |
| μ | 15 | 18 | 21 | 21 |
| The third layer | (R layer) $a_3$ | (H layer) $H_1$ | (H layer) $H_1$ | (R layer) $a_3$ |
| μ | 6 | 36 | 6 | 6 |
| The forth layer | (H layer) $H_2$ | (SBC layer) $M_9$ | (SBC layer) $M_9$ | (SBC layer) $M_9$ |
| μ | 6 | 18 | 21 | 21 |
| The fifth layer | (R layer) $a_3$ | (S layer) $a_2$ | (S layer) $a_2$ | (S layer) $a_2$ |
| μ | 6 | 9 | 6 | 6 |
| The sixth layer | (SBC layer) $M_1$ | — | — | — |
| μ | 15 | | | |
| The seventh layer | (S layer) $a_2$ | — | — | — |
| μ | 6 | | | |
| Total thickness (μ) | 60 | 90 | 90 | 60 |

The marks in Table 5 indicate the following composition of resin mixture.

$H_2$—IPP ($c_1$): 80% by weight; hydrogenated cyclopentadiene resin ($As_1$): 20% by weight.

$H_3$—IPP ($c_1$): 70% by weight; PB-1 ($c_2$): 15% by weight; hydrogenated resin of petroleum resin containing $C_9$ fraction ($AS_2$): 15% by weight.

$M_9$—EVA ($a_1$): 65% by weight; elastomer ($b_1$): 15% by weight; IPP ($c_1$): 15% by weight; PB-1 ($c_2$): 5% by weight.

TABLE 6

| Characteristics | unit | 11 | 12 | 13 | 14 | Comparative ① | Comparative ② | Comparative ③ |
|---|---|---|---|---|---|---|---|---|
| Haze | % | 0.5 | 0.6 | 0.8 | 0.9 | 0.6 | 0.9 | 0.7 |
| 80° C. shrinkage | % | 38 | 36 | 37 | 32 | 35 | 30 | 32 |
| Tensile break strength | Kg/mm² | 16.2 | 16.3 | 16.1 | 9.1 | 12.1 | 8.3 | 8.0 |
| Tensile break elongation | % | 230 | 240 | 240 | 350 | 210 | 260 | 270 |
| Stress at 100% elongation (length direction/width direction) | g/cm width | 890/240 | 870/250 | 890/250 | 290/160 | 750/330 | 520/130 | 420/150 |
| Stress at 200% elongation (length direction/width direction) | g/cm width | —/550 | —/540 | —/520 | 530/320 | —/720 | 900/350 | 680/280 |
| Sealing temperature | °C. | 86 | 86 | 89 | 85 | 86 | 87 | 85 |
| Heat resisting temperature | °C. | 158 | 153 | 159 | 156 | 157 | 155 | 98 |
| Anti-fogging property | — | ⊚ | ⊚ | ○ | ⊚ | ⊚ | ⊚ | ⊚ |
| Sealability | — | ⊚ | ⊚ | ⊚ | ⊚ | ⊚ | ⊚ | Δ |
| Tear strength | g | 62 | 57 | 63 | 43 | 3 | 15 | 18 |
| Stiffness | mg | 68 | 60 | 86 | 21 | 12 | 8 | 5 |
| Thickness of film | μ | 10 | 10 | 10 | 10 | 10 | 10 | 10 |

EXAMPLE 4

Films of Run Nos. 15–23 are obtained in the same manner as in Example 1 using raw films having the compositions of the respective layers and arrangement of the layers as shown in Table 7. However, heat setting stabilization treatment after stretching is carried out by blowing air of 50° C. to the films to shrink by 10% in length direction and by 30% in width direction. Characteristics of the resulting films are shown in Table 8.

The resulting films are superior in all of the characteristics and are especially high in tear strength. Further, although the films of Run Nos. 17 and 18 are extremely thin films of 8 μ thick which has never been seen, they are high in heat resisting temperature in sealing, namely, 154° C. and 153° C.

As practical wrapping test, when an article having projections is wrapped with films of Run Nos. 15–18 in the same manner as in Example 2, shrink wrapping of good finish with no break could be obtained.

Furthermore, when a tray pack of an allowance of 20% is wrapped with the film of Run No. 19 by L type shrink wrapping machine, the content could be tightly wrapped even at a low temperature of 80° C. and besides, the film is especially excellent in fused sealing strength at the time of sealing and cutting operation which comprises sealing simultaneously with fusing by hot wire, namely, it is 1.8 kg/cm width. On the other hand, in the case of Comparative Example (a) shown in Table 2 of Example 1, some creases remaines when wrapping is carried out at 100° C. and tight wrapping could be barely performed at 120° C. Fused sealing strength is 0.3 kg/cm width. When the film of Comparative Example (b) is used, wrapping with no crease is obtained only at 160° C., but cutting is impossible in sealing and cutting operation and the wrap abnormally distorted with shrink.

TABLE 7

| Layer construction of raw film | 15 | 16 | 17 | 18 | 19 | 20 | 21 | 22 | 23 |
|---|---|---|---|---|---|---|---|---|---|
| The first layer | $a_4$ | $a_4$ | $a_4$ | $a_4$ | $a_4$ | $a_{1-4}$ | $a_{4-1}$ | $a_{4-9}$ | $a_{4-10}$ |

TABLE 7-continued

| Layer construction of raw film | 15 | 16 | 17 | 18 | 19 | 20 | 21 | 22 | 23 |
|---|---|---|---|---|---|---|---|---|---|
| (S layer) | | | | | | | | | |
| μ | 9 | 9 | 7 | 7 | 9 | 9 | 9 | 9 | 9 |
| The second layer (SBC layer) | $M_{10}$ | $M_{11}$ | $M_{12}$ | $M_{12}$ | $M_{10}$ | $M_1$ | $M_1$ | $M_1$ | $M_1$ |
| μ | 9 | 9 | 7 | 7 | 9 | 9 | 9 | 9 | 9 |
| The third layer (H layer) | $H_1$ | $H_1$ | $H_1$ | $H_1$ | $H_2$ | $H_1$ | $H_2$ | $H_1$ | $H_2$ |
| μ | 18 | 18 | 14 | 14 | 18 | 18 | 18 | 18 | 18 |
| The forth layer (R layer) | $a_3$ | $a_3$ | $a_4$ | $a_5$ | $a_3$ | $a_4$ | $a_4$ | $a_{1-4}$ | $a_{1-4}$ |
| μ | 18 | 18 | 14 | 14 | 18 | 18 | 18 | 18 | 18 |
| The fifth layer (H layer) | $H_1$ | $H_1$ | $H_1$ | $H_1$ | $H_2$ | $H_1$ | $H_2$ | $H_1$ | $H_2$ |
| μ | 18 | 18 | 14 | 14 | 18 | 18 | 18 | 18 | 18 |
| The sixth layer (SBC layer) | $M_{10}$ | $M_{11}$ | $M_{12}$ | $M_{12}$ | $M_{10}$ | $M_1$ | $M_1$ | $M_1$ | $M_1$ |
| μ | 9 | 9 | 7 | 7 | 9 | 9 | 9 | 9 | 9 |
| The seventh layer (S layer) | $a_4$ | $a_4$ | $a_4$ | $a_4$ | $a_4$ | $a_{1-4}$ | $a_{4-1}$ | $a_{4-9}$ | $a_{4-10}$ |
| μ | 9 | 9 | 7 | 7 | 9 | 9 | 9 | 9 | 9 |
| Total thickness (μ) | 90 | 90 | 70 | 70 | 90 | 90 | 90 | 90 | 90 |

The marks in Table 7 indicate the following compositions of mixed resins.

$M_{10}$—EVA ($a_1$): 35% by weight; linear low-density polyethylene ($a_3$): 20% by weight; linear low-density polyethylene ($a_4$): 10% by weight; elastomer ($b_1$): 20% by weight; IPP ($c_1$): 10% by weight; PB-1 ($c_2$): 5% by weight.

$M_{11}$—EVA ($a_1$): 35% by weight; linear low-density polyethylene ($a_3$): 20% by weight; linear low-density polyethylene ($a_5$): 10% by weight; elastomer ($b_1$): 20% by weight; IPP ($c_1$): 10% by weight; PB-1 ($c_2$): 5% by weight.

$M_{12}$—EVA ($a_1$): 35% by weight; linear low-density polyethylene ($a_4$): 20% by weight; linear low-density polyethylene ($a_5$): 10% by weight; elastomer ($b_1$): 20% by weight; IPP ($c_1$): 10% by weight; PB-1 ($c_2$): 5% by weight.

$a_{1-4}$—EVA ($a_1$): 30% by weight; linear low-density polyethylene ($a_4$): 70% by weight.

$a_{4-1}$—EVA ($a1$): 70% by weight; linear low-density polyethylene ($a_4$): 30% by weight.

$a_{4-9}$—EEA ($a_9$): [ethylene-ethyl acrylate copolymer: content of ethyl acrylate group: 15% by weight, MI: 1.5, mp: 85° C., VSP: 61° C.]: 30% by weight; linear low-density polyethylene ($a_4$): 70% by weight.

$a_{4-10}$—E-AA-BA ($a_{10}$): [ethylene-acrylic acid-butyl acrylate terpolymer: content of acrylic acid group: 4% by weight and content of butyl acrylate group: 8% by weight, MI: 5, mp: 95° C.]: 30% by weight; linear low-density polyethylene ($a_4$): 70% by weight.

TABLE 8

| Characteristics | unit | Run No. 15 | 16 | 17 | 18 |
|---|---|---|---|---|---|
| Haze | % | 0.6 | 0.6 | 0.5 | 0.5 |
| 80° C. shrinkage | % | 35 | 37 | 33 | 36 |
| Tensile break strength | Kg/mm² | 16.5 | 16.3 | 17.3 | 17.4 |
| Tensile break elongation | % | 220 | 220 | 230 | 220 |
| Stress at 100% elongation (length direction/width direction) | g/cm width | 850/240 | 870/250 | 680/200 | 670/200 |
| Stress at 200% elongation (length direction/width direction) | g/cm width | —/580 | —/480 | —/380 | —/460 |
| Sealing temperature | °C. | 91 | 93 | 93 | 91 |
| Heat resisting temperature | °C. | 157 | 156 | 154 | 153 |
| Antifogging property | — | ⊚ | ○ | ○ | ⊚ |
| Sealability | — | ⊚ | ⊚ | ⊚ | ⊚ |
| Tear strength | g | 76 | 73 | 65 | 63 |
| Stiffness | mg | 57 | 54 | 31 | 36 |
| Thickness of film | μ | 10 | 10 | 8 | 8 |

| Characteristics | unit | Run No. 19 | 20 | 21 | 22 | 23 |
|---|---|---|---|---|---|---|
| Haze | % | 0.7 | 0.7 | 0.6 | 0.7 | 0.7 |
| 80° C. shrinkage | % | 37 | 35 | 36 | 39 | 34 |
| Tensile break strength | Kg/mm² | 16.9 | 15.8 | 16.0 | 15.7 | 15.1 |
| Tensile break elongation | % | 240 | 230 | 230 | 260 | 240 |
| Stress at 100% elongation (length direction/width direction) | g/cm width | 850/260 | 830/230 | 820/210 | 860/240 | 830/220 |
| Stress at 200% elongation (length direction/width direction) | g/cm width | —/590 | —/550 | —/480 | —/500 | —/420 |
| Sealing temperature | °C. | 90 | 89 | 88 | 89 | 88 |
| Heat resisting temperature | °C. | 157 | 158 | 156 | 153 | 156 |

TABLE 8-continued

| | | | | | | |
|---|---|---|---|---|---|---|
| Anti-fogging property | — | ⊙ | ⊙ | ⊙ | ⊙ | ⊙ |
| Sealability | — | ⊙ | ⊙ | ⊙ | ⊙ | ⊙ |
| Tear strength | g | 74 | 74 | 75 | 74 | 76 |
| Stiffness | mg | 51 | 55 | 50 | 54 | 51 |
| Thickness of film | μ | 10 | 10 | 10 | 10 | 10 |

EXAMPLE 5

Films of Run Nos. 24–30 and Comparative Run Nos. (4)–(5) are obtained in the same manner as in preparation of Run No. 1 of Example 1 using raw films having the compositions of the respective layers and arrangement of the layers as shown in Table 9. However, heat setting stabilization treatment after stretching is carried out by blowing air of 50° C. to the films to shrink by 10% in length direction and by 30% in width direction. The films of Run Nos. 24–30 are all excellent in stretching processability, but many punctures occurs during stretching with especially the films of Comparative Run Nos. 4 and 5 and stretching is unstable. Characteristics of the resulting films are shown in Table 10.

The resulting films of the present invention are superior in all the characteristics, especially low in heat sealing initiation temperature and high in heat resisting temperature and thus has a wide range of sealing temperature. For example, the film of Run No. 24 has a sealing initiation temperature of 78° C. and a heat resisting temperature in sealing of 157° C. and thus a sealing temperature range of 79° C. while the films of Comparative Run Nos. 4, 5 and 6 has only narrow sealing temperature ranges of 25° C., 12° C. and −3° C., respectively Stretch wrapping with the films of Run Nos. 24–30 in the same manner as in Example 1 could be performed without any problems.

The films of Comparative Run Nos. 4 and 5 has the tendency to be whitened in their surfaces in shrink to deteriorate the transparency. Furthermore, sealed portion on the bottom of the tray is holed to result in unaccepted articles. Especially, the films of Comparative Run Nos. 5 and 6 are entirely unacceptable With lapse of time (30° C. for 1 month), the additives over-bled in the films of Comparative Run Nos. 4–5 to cause surface tackiness and contamination of the surface and these films could not be used. On the other hand, the films of Run Nos. 24–30 has no problems.

Moreover, the films of Run Nos. 24–30 are low in lower limit of sealing temperature and excellent in low-temperature sealability and hence, fresh vegetables (such as cucumbers and egg apples) could be wrapped without using trays (burning of the surface of the contents does not occur).

TABLE 9

| Layer construction of raw film | 24 | 25 | 26 | 27 | 28 |
|---|---|---|---|---|---|
| The first layer | (S layer) $a_7$ | (S layer) $a_9$ | (S layer) $a_{11}$ | (S layer) $a_{12}$ | (S layer) $a_{13}$ |
| μ | 9 | 8 | 9 | 9 | 7 |
| The second layer | (R layer) $a_4$ | (R layer) $a_4$ | (R layer) $a_4$ | (R layer) $a_4$ | (R layer) $a_4$ |
| μ | 18 | 16 | 18 | 18 | 14 |
| The third layer | (H layer) $H_1$ | (H layer) $H_1$ | (H layer) $H_1$ | (H layer) $H_1$ | (H layer) $H_1$ |
| μ | 18 | 16 | 18 | 18 | 14 |
| The forth layer | (SBC layer) $M_6$ | (SBC layer) $M_{13}$ | (SBC layer) $M_{14}$ | (SBC layer) $M_{15}$ | (SBC layer) $M_{16}$ |
| μ | 18 | 16 | 18 | 18 | 14 |
| The fifth layer | (H layer) $H_1$ | (H layer) $H_1$ | (H layer) $H_1$ | (H layer) $H_1$ | (H layer) $H_1$ |
| μ | 18 | 16 | 18 | 18 | 14 |
| The sixth layer | (R layer) $a_4$ | (R layer) $a_4$ | (R layer) $a_4$ | (R layer) $a_4$ | (R layer) $a_4$ |
| μ | 9 | 8 | 9 | 9 | 7 |
| The seventh layer | (S layer) $a_7$ | (S layer) $a_9$ | (S layer) $a_{11}$ | (S layer) $a_{12}$ | (S layer) $a_{13}$ |
| μ | 9 | 8 | 9 | 9 | 7 |
| Total thickness (μ) | 90 | 80 | 90 | 90 | 70 |

| Layer construction of raw film | 29 | 30 | Comparative 4 | Comparative 5 | Comparative 6 |
|---|---|---|---|---|---|
| The first layer | (S layer) $a_{14}$ | (SBC layer) $a_{15}$ | (SBC layer) $M_1$ | (H layer) $M_1$ | (S layer) $H_1$ |
| μ | 9 | 9 | 36 | 38 | 9 |
| The second layer | (R layer) $a_4$ | (R layer) $a_4$ | (H layer) $H_1$ | (R layer) $a_4$ | (SBC layer) $M_1$ |
| μ | 9 | 9 | 18 | 19 | 27 |
| The third layer | (H layer) $H_1$ | (H layer) $H_1$ | (SBC layer) $M_1$ | (SBC layer) $M_1$ | (R layer) $a_4$ |
| μ | 18 | 18 | 36 | 38 | 18 |
| The forth layer | (SBC layer) $M_{17}$ | (SBC layer) $M_{18}$ | — | — | (SBC layer) $M_1$ |
| μ | 18 | 18 | | | 27 |
| The fifth layer | (H layer) $H_1$ | (H layer) $H_1$ | — | — | (H layer) $H_1$ |
| μ | 18 | 18 | | | 9 |
| The sixth layer | (R layer) | (R layer) | — | — | — |

TABLE 9-continued

| layer | $a_4$ | $a_4$ | | | |
|---|---|---|---|---|---|
| μ | 9 | 9 | | | |
| The seventh layer | (S layer) $a_{14}$ | (S layer) $a_{15}$ | — | — | — |
| μ | 9 | 9 | | | |
| Total thickness (μ) | 90 | 90 | 90 | 95 | 90 |

The marks in Table 9 indicate the following resins or resin compositions.

$a_{11}$: EMA [Ethylene-methyl acrylate copolymer; content of methyl acrylate: 18% by weight; MI: 2.0; mp: 96° C.; VSP: 60° C.].

$a_{12}$: EBA [Ethylene-butyl acrylate copolymer; content of butyl acrylate: 19% by weight; MI: 2.0; mp: 96° C.; VSP: 55° C.].

$a_{13}$: EMAA [Ethylene-methacrylic acid copolymer; content of methacrylic acid: 9% by weight; MI: 3.0; mp: 98° C.; VSP: 80° C.].

$a_{14}$: Ionomer [Ethylene-methyl methacrylate-methacrylic acid copolymer of Na neutralized type; content of methyl methacrylate: 4.0 mol %; content of methacrylic acid: 2.6 mol %; saponification degree: 40%; MI: 1.0; neutralization degree: 25%, mp: 83° C.; VSP: 64° C.].

$a_{15}$: 1,2-polybutadiene [crystallinity: 25%; 1,2 bond: 92%; MI: 3.0 (150° C.); density: 0.909 g/cm$^3$; VSP: 68° C.].

$M_{13}$: EVA ($a_1$): 35% by weight; linear low-density polyethylene ($a_3$): 20% by weight; EEA ($a_9$): 10% by weight; elastomer ($b_1$): 20% by weight; IPP ($c_1$): 10% by weight; PB-1 ($c_2$): 5% by weight.

$M_{14}$: EVA ($a_1$): 35% by weight; linear low-density polyethylene ($a_3$): 20% by weight; EMA ($a_{11}$): 10% by weight; elastomer ($b_1$): 20% by weight; IPP ($c_1$): 10% by weight; PB-1 ($c_2$): 5% by weight.

$M_{15}$: EVA ($a_1$): 35% by weight; linear low-density polyethylene ($a_3$): 20% by Weight; EBA ($a_{12}$): 10% by weight; elastomer ($b_1$): 20% by weight; IPP ($c_1$): 10% by weight; PB-1 ($c_2$): 5% by weight.

$M_{16}$: EVA (al): 35% by weight; linear low-density polyethylene ($a_3$): 20% by weight; EMAA ($a_{13}$): 10% by weight; elastomer ($b_1$): 20% by weight; IPP ($c_1$): 10% by weight; PB-1 ($c_2$): 5% by weight.

$M_{17}$: EVA ($a_1$): 35% by weight; linear low-density polyethylene ($a_3$) 20% by weight: ionomer ($a_{14}$): 10% by weight: elastomer ($b_1$): 20% by weight; IPP ($c_1$): 10% by weight; PB-1 ($c_2$): 5% by weight.

$M_{18}$: EVA ($a_1$): 35% by weight; linear low-density polyethylene ($a_3$): 20% by weight; 1,2-polybutadiene ($a_{15}$): 10% by weight; elastomer ($b_1$): 20% by weight; IPP ($c_1$): 10% by weight; PB-1 ($c_2$): 5% by weight.

TABLE 10

| Charac- teristics | unit | Run No. | | | | |
|---|---|---|---|---|---|---|
| | | 22 | 23 | 24 | 25 | 26 |
| Haze | % | 0.7 | 0.6 | 0.9 | 1.0 | 1.0 |
| Gloss ×6 | % | 140 | 150 | 145 | 140 | 140 |
| 80° C. shrinkage | % | 38 | 36 | 34 | 32 | 38 |
| Tensile break strength | Kg/mm$^2$ | 16.1 | 16.2 | 16.1 | 16.4 | 16.8 |
| Tensile break elongation | % | 230 | 240 | 210 | 210 | 220 |
| Stress at 100% (length direction/ width direction) | g/cm width | 830/ 210 | 760/ 190 | 840/ 260 | 860/ 240 | 660/ 185 |
| Sealing temperature | °C. | 78 | 75 | 80 | 76 | 81 |
| Heat resisting temperature | °C. | 157 | 158 | 155 | 151 | 159 |
| Anti- fogging property | — | ⊚ | ⊚ | ⊚ | ⊚ | ⊚ |
| Sealability | — | ⊚ | ⊚ | ⊚ | ⊚ | ⊚ |
| Tear strength | g | 34 | 28 | 37 | 35 | 30 |
| Thickness of film | μ | 10 | 9 | 10 | 10 | 8 |

| Charac- teristics | unit | Run No. | | Com- para- tive 4 | Com- para- tive 5 | Com- para- tive 6 |
|---|---|---|---|---|---|---|
| | | 29 | 30 | | | |
| Haze | % | 0.8 | 0.7 | 1.8 | 1.9 | 0.5 |
| Gloss ×6 | % | 140 | 140 | 90 | 90 | 145 |
| 80° C. shrinkage | % | 33 | 39 | 34 | 32 | 30 |
| Tensile break strength | Kg/mm$^2$ | 16.1 | 16.4 | 15.4 | 13.4 | 15.8 |
| Tensile break elongation | % | 250 | 270 | 260 | 220 | 220. |
| Stress at 100% elongation (length direction/ width direction) | g/cm width | 820/ 240 | 840/ 240 | 890/ 240 | 880/ 240 | 890/ 230 |
| Sealing temperature | °C. | 78 | 76 | 120 | 98 | 156 |
| Heat resisting temperature | °C. | 151 | 152 | 145 | 110 | 153 |
| Anti- fogging property | — | ○ | ⊚ | Δ | Δ | x |
| Sealability | — | ⊚ | ⊚ | ○ | x | x |
| Tear strength | g | 31 | 30 | 3 | 5 | 6 |
| Thickness of film | μ | 10 | 10 | 10 | 10 | 10 |

EXAMPLE 6

Films of Run Nos. 31–38 and Comparative Run Nos. 7–14 are prepared in the same manner as in Example 1 except that composition, construction and ratio of thickness of the layers in Run No. 1 of Example 1 are changed as shown in Table 11. However, the heat setting stabilization treatment after stretching is conducted by blowing air of 60° C. to the films to shrink by 15% in length direction and by 40% in width direction for Run Nos. 31, 32, 34, 35 and 38 and Comparative Run Nos. 7, 8, 9, 10, 11 and 14 and blowing air of 50° C. to the films to shrink by 10% in length direction and by 30% in width direction for Run Nos. 33, 36 and 37 and Comparative Run Nos. 12 and 13. The characteristics of the thus obtained films are shown in Table 12.

When ratio of thickness of S layer is less than 5% (Comparative Run No. 7), transparency decreases as compared with the films of the present invention (Run Nos. 31 and 32) and is especially deteriorated during shrinking in the tunnel and besides, anti-fogging property and sealability also deteriorate. Furthermore, when ratio of thickness of S layer exceeds 40% (Comparative Run No. 8), tear strength decreased and stiffness also decreased and rigidity is lost.

When ratio of thickness of R layer is less than 5% (Comparative Run No. 9), sealability somewhat deteriorated as compared with the films of the present invention (Run Nos. 33 and 34) and besides, tear strength sharply reduces to cause break in wrapping a content having projections. When ratio of thickness exceeds 45% (Comparative Run No. 10), anti-fogging property deteriorates to a large extent.

When ratio of thickness of H layer is less than 5% (Comparative Run No. 11), heat resisting temperature in sealing greatly lowers as compared with the films of the present invention (Run Nos. 35 and 36), stiffness also decreased, rigidity is lost and the film becomes difficult to be set on wrapping machines. When ratio of thickness exceeds 60% (Comparative Run No. 12), stretchability and tear strength deteriorate.

When ratio of thickness of SBC layer is less than 20% (Comparative Run No. 13), the film is cold stretched with difficulty and many punctures of bubble occurs and both transparency and tensile strength deteriorate as compared with the films of the present invention (Run Nos. 37 and 38). When the ratio of thickness exceeds 80% (Comparative Run No. 14), tear strength decreases and stiffness greatly reduces and it becomes difficult to set the film on wrapping machine.

TABLE 11

| Proportion of layers of raw film | 31 | 32 | 33 | 34 | 35 | 36 | 37 | 38 | Comparative 7 | Comparative 8 | Comparative 9 | Comparative 10 | Comparative 11 | Comparative 12 | Comparative 13 | Comparative 14 |
|---|---|---|---|---|---|---|---|---|---|---|---|---|---|---|---|---|
| The first layer (S layer) % | 3 | 20 | 10 | 5 | 10 | 10 | 10 | 10 | 2 | 25 | 10 | 10 | 10 | 7 | 10 | 3 |
| The second layer (R layer) % | 12 | 10 | 5 | 20 | 10 | 10 | 15 | 5 | 10 | 10 | 2 | 25 | 10 | 3 | 20 | 3 |
| The third layer (H layer) % | 5 | 5 | 20 | 5 | 3 | 20 | 15 | 5 | 5 | 5 | 5 | 5 | 2 | 31 | 13 | 3 |
| The forth layer (SBC layer) % | 60 | 30 | 30 | 40 | 54 | 20 | 20 | 60 | 66 | 20 | 66 | 20 | 56 | 18 | 15 | 85 |
| The fifth layer (H layer) % | 5 | 5 | 20 | 5 | 3 | 20 | 15 | 5 | 5 | 5 | 5 | 5 | 2 | 31 | 12 | 2 |
| The sixth layer (R layer) % | 12 | 10 | 5 | 20 | 10 | 10 | 15 | 5 | 10 | 10 | 2 | 25 | 10 | 3 | 20 | 3 |
| The seventh layer (S layer) % | 3 | 20 | 10 | 5 | 10 | 10 | 10 | 10 | 2 | 25 | 10 | 10 | 10 | 7 | 10 | 2 |
| Total thickness ($\mu$) | 70 | 70 | 90 | 70 | 70 | 90 | 90 | 70 | 70 | 70 | 70 | 70 | 70 | 90 | 90 | 70 |

TABLE 12

| Characteristics | unit | Run No. 31 | 32 | 33 | 34 | 35 | 36 | 37 | 38 |
|---|---|---|---|---|---|---|---|---|---|
| Haze | % | 0.9 | 0.6 | 0.6 | 0.7 | 0.7 | 0.8 | 0.6 | 0.7 |
| 80° C. shrinkage | % | 36 | 35 | 38 | 38 | 34 | 37 | 39 | 34 |
| Tensile break strength | Kg/mm$^2$ | 11.5 | 10.2 | 15.8 | 10.6 | 10.7 | 15.8 | 15.2 | 9.3 |
| Tensile break elongation | % | 320 | 310 | 230 | 310 | 320 | 240 | 260 | 370 |
| Stress at 100% elongation (length direction/width direction) | g/cm width | 270/140 | 260/150 | 850/260 | 270/130 | 260/120 | 840/270 | 760/250 | 240/130 |
| Stress at 200% elongation (length direction/width direction) | g/cm width | 580/330 | 570/310 | —/560 | 570/350 | 530/320 | —/570 | —/560 | 540/300 |
| Sealing temperature | °C. | 86 | 85 | 85 | 87 | 86 | 87 | 85 | 86 |
| Heat resisting temperature | °C. | 150 | 150 | 156 | 152 | 148 | 157 | 155 | 151 |
| Anti-fogging property | — | ⊚ | ⊚ | ⊚ | ○ | ⊚ | ⊚ | ⊚ | ⊚ |
| Sealability | — | ○ | ⊚ | ⊚ | ○ | ○ | ⊚ | ⊚ | ⊚ |
| Tear strength | g | 45 | 43 | 20 | 74 | 43 | 47 | 57 | 40 |
| Stiffness | mg | 22 | 20 | 42 | 34 | 18 | 45 | 41 | 21 |
| Thickness of film | $\mu$ | 10 | 10 | 10 | 10 | 10 | 10 | 10 | 10 |

| | Run No. |
|---|---|
| | Comparative / Comparative / Comparative / Comparative / Comparative / Comparative / Comparative |

TABLE 12-continued

| Characteristics | unit | 7 | 8 | 9 | 10 | 11 | 12 | 13 | 14 |
|---|---|---|---|---|---|---|---|---|---|
| Haze | % | 1.2 | 0.8 | 0.6 | 0.8 | 0.7 | 0.7 | 2.1 | 1.1 |
| 80° C. shrinkage | % | 38 | 35 | 34 | 23 | 38 | 38 | 39 | 33 |
| Tensile break strength | Kg/mm$^2$ | 10.8 | 9.6 | 9.8 | 13.5 | 8.2 | 16.4 | 15.8 | 7.9 |
| Tensile break elongation | % | 310 | 300 | 330 | 200 | 310 | 180 | 270 | 320 |
| Stress at 100% elongation (length direction/width direction) | g/cm width | 290/150 | 270/130 | 250/140 | 670/240 | 230/110 | 1000/400 | 800/250 | 210/100 |
| Stress at 200% elongation (length direction/width direction) | g/cm width | 590/340 | 570/320 | 570/330 | —/510 | 510/290 | —/— | —/530 | 500/210 |
| Sealing temperature | °C. | 90 | 87 | 88 | 90 | 86 | 86 | 88 | 87 |
| Heat resisting temperature | °C. | 151 | 150 | 149 | 150 | 120 | 157 | 151 | 135 |
| Anti-fogging property | — | Δ | ⊙ | ○ | x | ⊙ | ⊙ | ○ | Δ |
| Sealability | — | Δ | ○ | Δ | ○ | x | ⊙ | ⊙ | Δ |
| Tear strength | g | 40 | 17 | 8 | 70 | 24 | 7 | 63 | 7 |
| Stiffness | mg | 19 | 8 | 6 | 27 | 4 | 40 | 38 | 3 |
| Thickness of film | μ | 10 | 10 | 10 | 10 | 10 | 10 | 10 | 10 |

EXAMPLE 7

Raw films having a thickness of 90 μ of Run Nos. 39–44 and Comparative Run Nos. 15–20 are prepared in the same manner as in preparation of Run No. 1 in Example 1 except that composition of SBC layer is changed as shown in Table 13.

These films are subjected to the same cold stretching as of Run No. 1 in Example 1. The films of Run Nos. 39–44 could be stably stretched without causing punctures. On the other hand, the films of Comparative Run Nos. 15–18 and 20 are inferior in bubble stability and especially, in the case of Comparative Run No. 20, only the film having many streaks could be obtained. Furthermore, the raw film of Comparative Run No. 19 could not be cold stretched and when stretching temperature is gradually raised, a bubble could be produced at 115° C., but is unstable and punctured. Furthermore, transparency of the film is also inferior. Moreover, a raw film (Comparative Run No. 21) of 90 μ thick having a construction of S/R/H/R/S which corresponds to the layer construction of Run No. 1 except that the fourth layer (SBC layer) is omitted is prepared and cold stretching of this film is attempted, but could not be accomplished like Comparative Run No. 19. The film could be stretched at high temperature (120° C.), but puncture immediately occurs and the film is inferior in stability and the desired film could not be obtained.

Characteristics of the resulting films are shown in Table 14.

The films of the present invention are superior to the comparative films in all of the characteristics and especially excellent in low-temperature shrinkability and are wide in the range of sealing temperature and excellent in tear strength and thus can be used as films for shrink wrapping.

TABLE 13

| | Run No. | | | | | | | | | | | |
|---|---|---|---|---|---|---|---|---|---|---|---|---|
| | 39 | 40 | 41 | 42 | 43 | 44 | Comparative 15 | Comparative 16 | Comparative 17 | Comparative 18 | Comparative 19 | Comparative 20 |
| SBC layer | | | | | | | | | | | | |
| A component | $a_1$ 70 | — | $a_1$ 35 | $a_1$ 92 | — | — | $a_1$ 98 | $a_1$ 5 | — | — | $a_1$ 70 | $a_1$ 10 |
| B component | $b_1$ 30 | $b_1$ 40 | $b_1$ 65 | $b_1$ 8 | $b_1$ 80 | $b_1$ 50 | $b_1$ 2 | $b_1$ 95 | $b_1$ 20 | $b_1$ 95 | — | $b_1$ 15 |
| C component | — | $c_1$ 60 | — | — | $c_1$ 20 | $c_1$ 50 | — | — | $c_1$ 80 | $c_1$ 5 | $c_1$ 30 | $c_1$ 75 |

TABLE 14

| Characteristics | unit | 39 | 40 | 41 | 42 | 43 | 44 |
|---|---|---|---|---|---|---|---|
| Haze | % | 0.7 | 0.6 | 0.6 | 0.8 | 0.6 | 0.6 |
| 80° C. shrinkage | % | 39 | 37 | 36 | 35 | 33 | 35 |
| Tensile break strength | Kg/mm$^2$ | 15.7 | 16.4 | 15.3 | 14.2 | 16.3 | 16.5 |
| Tensile break elongation | % | 230 | 220 | 230 | 240 | 240 | 220 |
| Stress at 100% elongation (length direction/width direction) | g/cm width | 850/220 | 880/320 | 830/230 | 810/220 | 820/230 | 890/260 |
| Stress at 200% elongation (length direction/width direction) | g/cm width | —/540 | —/650 | —/500 | —/600 | —/560 | —/590 |
| Sealing temperature | °C. | 87 | 87 | 88 | 86 | 87 | 87 |
| Heat resisting temperature | °C. | 156 | 158 | 152 | 153 | 159 | 161 |
| Anti-fogging property | — | ⊙ | ⊙ | ⊙ | ⊙ | ⊙ | ⊙ |
| Sealability | — | ⊙ | ⊙ | ⊙ | ⊙ | ⊙ | ⊙ |
| Tear strength | g | 25 | 23 | 27 | 23 | 27 | 25 |
| Stiffness | mg | 44 | 52 | 50 | 41 | 52 | 58 |
| Thickness of film | μ | 10 | 10 | 10 | 10 | 10 | 10 |

TABLE 14-continued

| Characteristics | unit | Run No. Comparative | Comparative | Comparative | Comparative | Comparative |
|---|---|---|---|---|---|---|
| Haze | % | 2.3 | 1.7 | 1.8 | 2.2 | 6.5 |
| 80° C. shrinkage | % | 20 | 33 | 23 | 35 | 18 |
| Tensile break strength | Kg/mm² | 6.1 | 7.4 | 8.5 | 6.2 | 7.5 |
| Tensile break elongation | % | 83 | 95 | 86 | 91 | 79 |
| Stress at 100% elongation (length direction/ width direction) | g/cm width | —/ — | —/ 240 | —/ — | —/ — | —/ — |
| Stress at 200% elongation (length direction/ width direction) | g/cm width | —/ — | —/ — | —/ — | —/ — | —/ — |
| Sealing temperature | °C. | 86 | 87 | 88 | 87 | 86 |
| Heat resisting temperature | °C. | 153 | 149 | 158 | 150 | 157 |
| Anti-fogging property | — | Δ | ⊚ | ○ | ○ | ○ |
| Sealability | — | ○ | ○ | ○ | ○ | Δ |
| Tear strength | g | 13 | 11 | 8 | 16 | 8 |
| Stiffness | mg | 37 | 25 | 49 | 21 | 46 |
| Thickness of film | μ | 12 | 13 | 12 | 11 | 11 |

EXAMPLE 8

Raw films (Run Nos. 45–51) of 70 μ thick and of 5 to 8 layers in which compositions of S layer, SBC layer, R layer and H layer and construction of the layers are as shown in Table 15 are prepared. Stretching is conducted in the same manner as in Run No. 8 of Example 1 to obtain films as shown in Table 16.

The resulting films are excellent in all of the characteristics and it is clarified that especially tear strength and stiffness (rigidity of film) are highly improved in the films comprising at least 7 layers in which two R layers and two H layers are respectively arranged in symmetric positions than in the films of 5 layers or 6 layers.

Tray wrapping is carried out with the resulting films by the same automatic wrapping machine for stretch wrapping (elevator type) as used in Example 1 and as a result, wrappings of good finish and good sealing by hot plate, could be obtained without occurrence of creases.

TABLE 15

| Layer construction of raw film | Run No. 45 | 46 | 47 | 48 | 49 | 50 | 51 |
|---|---|---|---|---|---|---|---|
| The first layer μ | (S layer) $a_2$ 7 | (S layer) $a_2$ 7 | (S layer) $a_2$ 7 | (S layer) $a_2$ 7 | (S layer) $a_2$ 7 | (S layer) $a_2$ 7 | (S layer) $a_2$ 7 |
| The second layer μ | (R layer) $a_3$ 24 | (SBC layer) $M_1$ 21 | (R layer) $a_3$ 5 | (H layer) $H_2$ 3 | (R layer) $a_3$ 7 | (H layer) $H_2$ 4 | (SBC layer) $M_1$ 14 |
| The third layer μ | (H layer) $H_1$ 7 | (R layer) $a_3$ 7 | (SBC layer) $M_1$ 20 | (R layer) $a_3$ 5 | (H layer) $H_1$ 3 | (R layer) $a_3$ 3 | (H layer) $H_1$ 4 |
| The forth layer μ | (SBC layer) $M_1$ 25 | (H layer) $H_1$ 7 | (H layer) $H_1$ 7 | (SBC layer) $M_1$ 40 | (R layer) $a_3$ 5 | (SBC layer) $M_1$ 17 | (SBC layer) $M_1$ 10 |
| The fifth layer μ | (S layer) $a_2$ 7 | (SBC layer) $M_1$ 21 | (SBC layer) $M_1$ 20 | (R layer) $a_3$ 4 | (SBC layer) $M_1$ 30 | (H layer) $H_2$ 7 | (R layer) $a_3$ 11 |
| The sixth layer μ | — | (S layer) $a_2$ 7 | (R layer) $a_3$ 4 | (H layer) $H_2$ 4 | (H layer) $H_2$ 4 | (SBC layer) $M_1$ 18 | (H layer) $H_2$ 3 |
| The seventh layer μ | — | — | (S layer) $a_2$ 7 | (S layer) $a_2$ 7 | (R layer) $a_3$ 7 | (R layer) $a_3$ 7 | (SBC layer) $M_1$ 14 |
| The eighth layer μ | — | — | — | — | (S layer) $a_2$ 7 | (S layer) $a_2$ 7 | (S layer) $a_2$ 7 |
| Total thickness (μ) | 70 | 70 | 70 | 70 | 70 | 70 | 70 |

TABLE 16

| Characteristics | unit | Run No. 45 | 46 | 47 | 48 | 49 | 50 | 51 |
|---|---|---|---|---|---|---|---|---|
| Haze | % | 0.8 | 0.6 | 0.6 | 0.5 | 0.7 | 0.7 | 0.6 |
| 80° C. shrinkage | % | 35 | 33 | 35 | 37 | 36 | 37 | 34 |
| Tensile break strength | Kg/mm² | 12.5 | 11.3 | 13.6 | 13.2 | 12.2 | 12.5 | 12.3 |
| Tensile break elongation | % | 290 | 350 | 330 | 360 | 330 | 320 | 340 |
| Stress at 100% elongation (length direction/ | g/cm width | 330/ 170 | 320/ 160 | 300/ 150 | 290/ 150 | 260/ 140 | 280/ 160 | 270/ 180 |

TABLE 16-continued

| Characteristics | unit | Run No. | | | | | | |
|---|---|---|---|---|---|---|---|---|
| | | 45 | 46 | 47 | 48 | 49 | 50 | 51 |
| width direction) | | | | | | | | |
| Stress at 200% elongation (length direction/ width direction) | g/cm width | 610/ 310 | 590/ 300 | 580/ 300 | 570/ 300 | 550/ 290 | 580/ 280 | 530/ 270 |
| Sealing temperature | °C. | 86 | 86 | 87 | 88 | 86 | 87 | 86 |
| Heat resisting temperature | °C. | 152 | 150 | 151 | 153 | 152 | 152 | 151 |
| Anti-fogging property | — | ⊚ | ⊚ | ⊚ | ⊚ | ⊚ | ⊚ | ⊚ |
| Sealability | — | ⊚ | ⊚ | ⊚ | ⊚ | ⊚ | ⊚ | ⊚ |
| Tear strength | g | 63 | 55 | 61 | 82 | 92 | 86 | 65 |
| Stiffness | mg | 28 | 25 | 20 | 40 | 33 | 34 | 24 |
| Thickness of film | μ | 10 | 10 | 10 | 10 | 10 | 10 | 10 |

EXAMPLE 9

EVA ($a_1$): 50% by weight, linear low-density polyethylene ($a_4$): 10% by weight, ethylene-α-olefin copolymer thermoplastic elastomer ($b_1$): 25% by weight, IPP ($c_1$): 10% by weight and crystalline polybutene ($c_2$): 5% by weight are mixed and to 100 parts by weight of the resulting resin mixture are added 15 parts by weight of hydrogenated cyclopentadiene resin [softening point 125° C. measured by ring and ball method]: $AS_1$ as an AS agent and besides, 5 parts by weight of a mineral oil and this mixture is kneaded to obtain a specific mixed composition: ($M_{19}$) for SBC layer. Furthermore, IPP ($c_1$): 70% by weight and PB-1 ($c_2$): 30% by weight are mixed to obtain a mixed composition ($H_1$) for H layer. The linear low-density polyethylene ($a_4$) is used for R layer and EVA ($a_2$) is used for S layer. In the same manner as in Example 1, raw films of 80, 90 and 100 μ thick (Run Nos. 52-54 in Table 17) are obtained from them using four extruders. These raw films are cold stretched to 3.2 times in length direction and to 3.0 times in width direction in the same manner as in Example 1 except that they are heated to 35° C. and the stretching terminated region is cooled to 10° C. and thereafter, are subjected to heat setting stabilization treatment in the same manner as in Example 1 at a shrink of 10% in length direction and 30, 20 or 10% in width direction to obtain films having a final thickness of 10 μ Characteristics of the resulting films are shown in Table 18.

It can be seen that the films of Run Nos. 52-54 all has excellent characteristic values. Furthermore, when wrapping is conducted with these films using no tunnel by the automatic wrapping machines for stretch packaging (pillow type and elevator type) used in Example 1, wrapping with no creases and good sealability could be accomplished by all of these films. Moreover, when hand wrapping is carried out with these films by the aforementioned hand wrapper, wrapping in good finish could be performed. However, the film of Run No. 52 has the tendency to retain creases as compared with the film of Run No. 54 unless tension applied to the film is adjusted in wrapping by the wrapping machine.

When the raw film of Run No. 54 which is cold stretched is not subjected to the heat setting stabilization treatment, this film having 10 μ thick has stresses in length direction/width direction of 1200/800 (g/cm width) at 200% elongation and many creases occurs in the above stretch wrapping and when the film is strongly pulled in order to remove the creases, the tray is broken and wrapping could not be accomplished.

TABLE 17

| | Run No. | | |
|---|---|---|---|
| | 52 | 53 | 54 |
| The first layer (S layer) μ | $a_2$ 8 | $a_2$ 9 | $a_2$ 10 |
| The second layer (R layer) μ | $a_4$ 8 | $a_4$ 9 | $a_4$ 10 |
| The third layer (H layer) μ | $H_1$ 4 | $H_1$ 5 | $H_1$ 5 |
| The forth layer (SBC layer) μ | $M_{19}$ 40 | $M_{19}$ 45 | $M_{19}$ 50 |
| The fifth layer (H layer) μ | $H_1$ 4 | $H_1$ 4 | $H_1$ 5 |
| The sixth layer (R layer) μ | $a_4$ 8 | $a_4$ 9 | $a_4$ 10 |
| The seventh layer (S layer) μ | $a_2$ 8 | $a_2$ 9 | $a_2$ 10 |
| Total thickness (μ) | 80 | 90 | 100 |

TABLE 18

| Characteristics | unit | Run No. | | |
|---|---|---|---|---|
| | | 52 | 53 | 54 |
| Haze | % | 0.6 | 0.5 | 0.5 |
| 80° C. shrinkage | % | 36 | 40 | 43 |
| Tensile break strength | Kg/mm² | 8.0 | 10.0 | 12.4 |
| Tensile break elongation | % | 360 | 320 | 290 |
| Stress at 100% elongation (length direction/ width direction) | g/cm width | 250/ 120 | 290/ 150 | 300/ 280 |
| Stress at 200% elongation (length direction/ width direction) | g/cm width | 470/ 200 | 520/ 240 | 420/ 370 |
| Sealing temperature | °C. | 84 | 84 | 85 |
| Heat resisting temperature | °C. | 150 | 150 | 150. |
| Anti-fogging property | — | ⊚ | ⊚ | ⊚ |
| Sealability | — | ⊚ | ⊚ | ⊚ |
| Tear strength | g | 42 | 35 | 24 |
| Stiffness | mg | 23 | 27 | 30 |
| Thickness of film | μ | 10 | 10 | 10 |

EXAMPLE 10

Raw films of Run Nos. 55-58 are prepared with the compositions of respective layers and the construction of the layers as shown in Table 19 in the same manner as in Run No. 6 of Example 1. The raw films of Run Nos.

55-56 are irradiated with 5 Mrad of electron rays (energy of 500 KV) as energy beam and the raw film of Run No. 57 is irradiated with 3 Mrad of the same electron rays. One side of the raw film of Run No. 58 is irradiated with 5 Mrad of electron rays (150 KV) as energy beam. These films are subjected to the cold stretching and the heat setting stabilization treatment in the same manner as in Example 1 to obtain the films as shown in Table 20.

It can be seen that the films of Run Nos. 55-58 has excellent characteristics. Especially, heat resisting temperature in sealing can be widened to the high temperature side without causing elevation of initiation temperature and the range of proper heat sealing temperature can be widened.

When wrapping is carried out with the films of Run Nos. 55-58 by the stretch wrapping machine used in Example 1, the wrapping could be performed without creases and with a good finish.

TABLE 19

| Layer construction of raw film | Run No. 55 | 56 | 57 | 58 |
|---|---|---|---|---|
| The first layer | (S layer) | (S layer) | (S layer) $a_{17}$ | (S layer) $a_2$*4 |
| μ | $a_{16}$ 7 | $a_{17}$*2 9 | 7 | 11 |
| The second layer | (R layer) | (R layer) | (R layer) $a_4$ | (R layer) $a_4$ |
| μ | $a_4$ 7 | $a_4$ 9 | 7 | 11 |
| The third layer | (H layer) | (H layer) | (H layer) $H_1$ | (H layer) $H_1$ |
| μ | $H_1$ 4 | $H_1$ 18 | 4 | 22 |
| The forth layer | (SBC layer) | (SBC layer) | (SBC layer) $M_{18}$*1 | (SBC layer) $M_1$*1 |
| μ | $M_1$*1 35 | $M_1$*1 18 | 35 | 22 |
| The fifth layer | (H layer) | (H layer) | (H layer) $H_1$ | (H layer) $H_1$ |
| μ | $H_1$ 3 | $H_1$ 18 | 3 | 22 |
| The sixth layer | (R layer) | (R layer) | (R layer) $a_4$ | (R layer) $a_4$ |
| μ | $a_4$ 7 | $a_4$ 9 | 7 | 11 |
| The seventh layer | (S layer) | (S layer) | (S layer) $a_{17}$ | (S layer) $a_2$*5 |
| μ | $a_{16}$ 7 | $a_{17}$*2 9 | 7 | 11 |
| Total thickness (μ) | 70 | 90 | 70 | 110 |

*1 Gel % and MI of SBC layer were 12% and 0.08, respectively.
*2 Gel % and MI of S layer were 2% and 0.6, respectively.
*3 Gel % and MI of SBC layer were 20% and 0.04, respectively.
*4 Gel % and MI and of S layer were 10% and 0.1 (irradiated side), respectively.
*5 Gel % and MI of S layer were 0% and 2.2, respectively.

The marks in Table 19 indicate the following resin and resin composition.

$a_{16}$: EVA [Content of vinyl acetate group: 13% by weight; MI: 4.0; mp: 93° C.; VSP: 75° C.].

$a_{17}$: Composition prepared by kneading EVA ($a_2$) with 0.5% of an antioxidant.

TABLE 20

| Characteristics | unit | Run No. 55 | 56 | 57 | 58 |
|---|---|---|---|---|---|
| Haze | % | 0.6 | 0.6 | 0.6 | 0.6 |
| 80° C. shrinkage | % | 37 | 38 | 37 | 35 |
| Tensile break strength | Kg/mm² | 12.7 | 16.3 | 10.1 | 9.3 |

TABLE 20-continued

| Characteristics | unit | Run No. 55 | 56 | 57 | 58 |
|---|---|---|---|---|---|
| Tensile break elongation | % | 320 | 250 | 340 | 370 |
| Stress at 100% elongation (length direction/width direction) | g/cm width | 340/ 170 | 820/ 280 | 310/ 150 | 280/ 150 |
| Stress at 200% elongation (length direction/width direction) | g/cm width | 600/ 310 | —/ 550 | 570/ 310 | 560/ 290 |
| Sealing temperature | °C. | 92 | 86 | 84 | 90 |
| Heat resisting temperature | °C. | 179 | 178 | 178 | 159 |
| Anti-fogging property | — | ⊙ | ⊙ | ⊙ | ⊙ |
| Sealability | — | ⊙ | ⊙ | ⊙ | ⊙ |
| Tear strength | g | 57 | 34 | 52 | 73 |
| Stiffness | mg | 28 | 51 | 25 | 44 |
| Thickness of film | μ | 10 | 10 | 10 | 10 |

EXAMPLE 11

Raw films of Run Nos. 59-63 are prepared with the compositions of respective layers and the construction of the layers as shown in Table 21 in the same manner as in Example 1. These raw films are cold stretched in the same manner as in Run No. 6 of Example 1 to obtain respective films. However, heat setting stabilization treatment is carried out with shrinking by 10% in length direction and 30% in width direction for the films of Run Nos. 59-61 and 15% in length and 40% in width direction for the films of Run Nos. 62-63. Characteristics of the resulting films are shown in Table 22.

The films of Run Nos. 59-63 are excellent in all of the characteristics. Especially, the films of the present invention such as the film of Run No. 59 could be made to extremely thin film of 5 μ thick and besides, even with such thickness, the films maintain excellent characteristics such as tensile strength, sealability (temperature range), tear strength, and stiffness (rigidity of the film) by which the films can be used for shrink wrapping. The film of Run No. 62 has excellent characteristics such as stretchability, sealability (temperature range) and tear strength as extremely thin film for stretch wrapping.

The films of Run Nos. 59-61 are subjected to practical wrapping test in the same manner as in Example 1 using the L type wrapping machine and the commercially available shrinking tunnel and stretch wrapping machine (with a simple tunnel). As a result, tight and beautiful wrapping could be performed with a good finish and without occurrence of creases and deterioration of optical characteristics after shrinking.

When the same wrapping as in Example 1 is carried out with the films of Run Nos. 62-63 using the same stretch wrapping machine as used in Example 1, wrapping with no crease and with a good finish could be performed with these films.

Thus, the films of the present invention can be sufficiently used for both the shrink wrapping and the stretch wrapping even in the extremely thin thickness of 10 μ or less and such films have never been able to be produced up to the present.

In the case of hand wrapping, stretch wrapping could be performed smoothly and without occurrence of break with the films of Run Nos. 59, 60, 62 and 63.

TABLE 21

| | Run No. | | | | |
|---|---|---|---|---|---|
| | 59 | 60 | 61 | 62 | 63 |
| The first layer (S layer) μ | $a_2$ 4 | $a_2$ 5 | $a_2$ 6 | $a_2$ 5 | $a_2$ 7 |
| The second layer (R layer) μ | $a_4$ 4 | $a_4$ 4 | $a_4$ 5 | $a_4$ 5 | $a_4$ 7 |
| The third layer (H layer) μ | $H_2$ 8 | $H_2$ 9 | $H_2$ 11 | $H_2$ 25 | $H_1$ 35 |
| The forth layer (SBC layer) μ | $M_{19}$ 8 | $M_{19}$ 9 | $M_{19}$ 11 | $M_{19}$ 25 | $M_{19}$ 35 |
| The fifth layer (H layer) μ | $H_2$ 8 | $H_2$ 10 | $H_2$ 11 | $H_2$ 2 | $H_1$ 3 |
| The sixth layer (R layer) μ | $a_4$ 4 | $a_4$ 4 | $a_4$ 5 | $a_4$ 5 | $a_4$ 7 |
| The seventh layer (S layer) μ | $a_2$ 4 | $a_2$ 5 | $a_2$ 6 | $a_2$ 5 | $a_2$ 7 |
| Total thickness (μ) | 40 | 47 | 55 | 50 | 70 |

TABLE 22

| Characteristics | unit | Run No. | | | | |
|---|---|---|---|---|---|---|
| | | 59 | 60 | 61 | 62 | 63 |
| Haze | % | 0.4 | 0.5 | 0.5 | 0.7 | 0.6 |
| 80° C. shrinkage | % | 39 | 38 | 38 | 35 | 36 |
| Tensile break strength | Kg/mm² | 16.1 | 16.3 | 16.7 | 7.7 | 7.5 |
| Tensile break elongation | % | 210 | 230 | 220 | 290 | 330 |
| Stress at 100% elongation (length direction/ width direction) | g/cm width | 480/ 130 | 520/ 160 | 610/ 200 | 160/ 90 | 190/ 110 |
| Stress at 200% elongation (length direction/ width direction) | g/cm width | —/ 290 | —/ 280 | —/ 390 | 330/ 190 | 400/ 220 |
| Sealing temperature | °C. | 85 | 85 | 85 | 84 | 85 |
| Heat resisting temperature | °C. | 152 | 155 | 157 | 151 | 150 |
| Anti-fogging property | — | ⊚ | ⊚ | ⊚ | ⊚ | ⊚ |
| Sealability | — | ○ | ○ | ⊚ | ⊚ | ⊚ |
| Tear strength | g | 18 | 24 | 30 | 42 | 48 |
| Stiffness | mg | 25 | 32 | 39 | 19 | 28 |
| Thickness of film | μ | 5 | 6 | 7 | 8 | 10 |

EXAMPLE 12

The raw films of Run No. 1 in Example 1 are subjected to cold stretching and heat setting stabilization treatment in the same manner as in Example 1 with changing the stretching temperature to 40, 53 and 80° C. to obtain films of Run Nos. 64–66.

All of the raw films could be stably stretched at any of the above stretching temperatures with a little unevenness in thickness. Characteristics of the resulting films are shown in Table 23.

The resulting films are excellent in all of the characteristics and are well balanced in transparency, tensile strength, sealability (temperature range), tear strength and stiffness (rigidity of the films). When the same shrink wrapping test as in Example 1 is conducted, the wrapping could be performed tightly, with no creases and with a good finish.

TABLE 23

| Characteristics | unit | Run No. | | |
|---|---|---|---|---|
| | | 64 | 65 | 66 |
| Haze | % | 0.6 | 0.6 | 1.5 |
| 80° C. shrinkage | % | 38 | 35 | 20 |
| Tensile break strength | Kg/mm² | 16.5 | 16.0 | 7.5 |
| Tensile break elongation | % | 16.5 | 16.0 | 7.5 |
| Stress at 100% elongation (length direction/ width direction) | g/cm width | 230 | 240 | 180 |
| Stress at 200% elongation (length direction/ width direction) | g/cm width | —/ 540 | —/ 550 | —/ 530 |
| Sealing temperature | °C. | 87 | 86 | 87 |
| Heat resisting temperature | °C. | 155 | 155 | 155 |
| Anti-fogging property | — | ○ | ○ | ○ |
| Sealability | — | ○ | ○ | ○ |
| Tear strength | g | 25 | 27 | 27 |
| Stiffness | mg | 46 | 45 | 46 |
| Thickness of film | μ | 10 | 10 | 10 |

EXAMPLE 13

A mixed composition ($M_{20}$) for SBC layer is prepared in the following manner. That is, 35% by weight of ethylene-vinyl acetate copolymer ($a_1$), 30% by weight of a linear low-density polyethylene ($a_{18}$) [copolymer of ethylene with 20% by weight of octene-1 as α-olefin; MI: 3.0; VSP: 81° C.; mp: 115° C.; density: 0.907 g/cm³], 15% by weight of a soft thermoplastic elastomer ($b_1$), 10% by weight of a crystalline polypropylene ($c_1$) and 5% by weight of crystalline polybutene-1 ($c_2$) are mixed, and to 100 parts by weight of the mixed resins is added 10 parts by weight of a hydrogenated cyclopentadiene resin ($AS_1$) as an AS agent and the resulting mixture is kneaded. Next, a mixed composition ($H_1$) for H layer is prepared in the same manner as in Example 1. Furthermore, linear low-density polyethylene ($a_{18}$) is prepared as a resin for R layer and ethylene-vinyl acetate copolymer ($a_2$) is prepared as a resin for S layer. These resins for SBC layer, H layer, R layer and S layer are thermoplasticized and melt mixed at a cylinder maximum temperature of 220° C. by the following four extruders, respectively: an extruder having a screw of 50 mm in diameter (L/D=37) and a injection port at the position of L/D=8 from the tip portion, an extruder having a screw of 40 mm in diameter (L/D=29), an extruder having a screw of 40 mm in diameter (L/D=37) and an injection port at the position of L/D=8 from the tip portion, and an extruder having a screw of 40 mm in diameter (L/D=37) and an injection port at the position of L/D=12 from the tip portion, In this case, from the injection ports of extruders for R layer and S layer, two anti-fogging agents of glycerin monooleate and diglycerin monooleate are injected so that each of the layers contained the anti-fogging agents in a amount of 1.5% by weight each and totally 3.0% by weight of them and are kneaded with the above resins. Respective kneaded products are extruded from an annular die (die slit: 1.0 mm) having 7 layers of 4 kinds and rapidly cooled by a water cooling ring provided at the position of 5 cm from the tip of the die which uniformly discharges water to obtain a raw film of 180 mm$\phi$ (Run No. 67 in Table 24). Various raw films of Run Nos. 68–69 in Table 24 are obtained in the same manner as above except that only the thickness is changed.

Unevenness (in circumferential direction) in thickness of the resulting raw films is within ±2%. Each of these raw films is passed between two pairs of carrying nip rolls and take-off nip rolls, where the films are heated to 65° C. by hot air and then air is introduced into the films as they re and the films are continuously inflated by the rectification contact guide to stretch them to about 3.2–3.6 times in length direction and about 3.2–3.7 times in width direction. The stretching terminated portion is cooled by an air ring from which cold air of 18° C. is jetted, folded by a deflator, and taken off by nip rolls and air of 50° C. is blown against the film and the film is shrunk by 12% in length direction and by 30% in width direction in a zone between two pairs of inlet nip rolls and outlet nip rolls, speed of the latter being slower 15% than that of the former. Thereafter, the film is subjected to heat setting stabilization treatment simultaneously with orientation modification and edge portions of the film are slit to separate into two films, which are respectively wound up under a constant tension to obtain desired films having a given thickness. Similarly, the films of the given thickness are obtained using raw films having the compositions and the construction of layers of Comparative Run Nos. 22–26 shown in Table 24 (3.0% by weight of the anti-fogging agent (same as used 15 in Run Nos. 67–69) was injected into SBC layer and S layer in Comparative Run Nos. 22–26. Characteristics of the resulting film are shown in Table 25. The films of Run Nos. 67–69 are all excellent in stretchability and especially, even in the case of final thickness of 5 $\mu$ of Run No. 67, the film could be very stably performed with two punctures of bubble per 1 hour. On the other hand, film could be formed in Comparative Run No. 22, but many punctures, namely, 35 punctures occurred per 1 hour and film formation could not be stably performed.

The films of Run Nos. 67–69 are excellent in all of the characteristics and especially high in tear strength and it is a surprising effect that even the extremely thin film of 5 $\mu$ showed a value of 170 g. Moreover, they have high stiffness which shows the rigidity of the film and are superior in running properties on wrapping machine.

A lump of meat put on a PSP tray is wrapped with each of the films in Table 25 by the wrapping machine for stretch wrapping used in Example 1. When the films of Run Nos. 67–69 are used, good wraps are obtained even by loose wrapping in case a simple tunnel which discharges a hot air of 80° C. is positioned above the sealing part of the wrapping machine.

When objects having sharp projections such as frozen lobsters and frozen fishes are wrapped, break does not occur or does not propagate even if it occurs in case of using the films of Run Nos. 67–69, although breaks occur frequently in case of conventional films. With reference to the films of Comparative Run Nos. 22–26, objects having no projections could be satisfactorily wrapped with the films of Comparative Run Nos. 24 and 26 only when the objects are loosely wrapped using a simple tunnel while the objects could not be satisfactorily wrapped with the occurrence of many breaks in the case of using the films of Comparative Run Nos. 22, 23 and 25. Furthermore, when objects having projections are wrapped, many breaks occurs in all of the films of Comparative Run Nos. 22–26 and they propagate and thus, satisfactory wraps could not be obtained.

As explained above, the films of the present invention have far more superior features than conventional films in the conventional use of shrink films and especially, even when the films are made to extremely thin films as compared with conventional films, such extremely thin films maintain sufficient practical characteristics.

TABLE 24

| Layer construction of raw film | Run No. | | | |
|---|---|---|---|---|
| | 67 | 68 | 69 | Comparative 22 |
| The first layer $\mu$ | (S layer) $a_2$ 4 | (S layer) $a_2$ 5 | (S layer) $a_2$ 6 | (S layer) $a_2$ 4 |
| The second layer $\mu$ | (R layer) $a_{18}$ 7 | (R layer) $a_{18}$ 9 | (R layer) $a_{18}$ 6 | (R layer) $M_5$ 16 |
| The third layer $\mu$ | (H layer) $H_1$ 8 | (H layer) $H_1$ 10 | (H layer) $H_1$ 12 | (H layer) $H_1$ 16 |
| The forth layer $\mu$ | (SBC layer) $M_2$ 8 | (SBC layer) $M_{20}$ 10 | (SBC layer) $M_{20}$ 12 | (SBC layer) $M_5$ 4 |
| The fifth layer $\mu$ | (H layer) $H_1$ 8 | (H layer) $H_1$ 10 | (H layer) $H_1$ 12 | (S layer) $a_1$ 4 |
| The sixth layer $\mu$ | (R layer) $a_{18}$ 4 | (R layer) $a_{18}$ 5 | (R layer) $a_{18}$ 6 | — |
| The seventh layer $\mu$ | (S layer) $a_2$ 4 | (S layer) $a_2$ 5 | (S layer) $a_2$ 6 | — |
| Total thickness ($\mu$) | 40 | 50 | 60 | 40 |

| Layer construction of raw film | Run No. | | | |
|---|---|---|---|---|
| | Comparative 23 | Comparative 24 | Comparative 25 | Comparative 22 |
| The first layer $\mu$ | (S layer) $a_2$ 5 | (S layer) $a_2$ 6 | (S layer) $a_2$ 5 | (S layer) $a_2$ 6 |
| The second layer $\mu$ | (SBC layer) $M_5$ 10 | (SBC layer) $M_5$ 12 | (SBC layer) $M_5$ 5 | (SBC layer) $M_5$ 6 |
| The third layer $\mu$ | (H layer) $H_1$ 20 | (H layer) $H_1$ 24 | (H layer) $H_1$ 10 | (H layer) $H_1$ 12 |
| The forth layer $\mu$ | (SBC layer) $M_5$ 10 | (SBC layer) $M_5$ 12 | (SBC layer) $M_5$ 10 | (SBC layer) $M_5$ 12 |
| The fifth layer $\mu$ | (S layer) $a_2$ 5 | (S layer) $a_2$ 6 | (H layer) $H_1$ 10 | (H layer) $H_1$ 12 |
| The sixth | — | — | (SBC layer) | (SBC layer) |

TABLE 24-continued

| layer | | | $M_5$ | $M_5$ |
|---|---|---|---|---|
| $\mu$ | | | 5 | 6 |
| The seventh layer | — | — | (S layer) $a_2$ | (S layer) $a_2$ |
| $\mu$ | | | 5 | 6 |
| Total thickness ($\mu$) | 50 | 60 | 50 | 60 |

TABLE 25

| Characteristics | unit | Run No. 67 | Run No. 68 | Run No. 69 |
|---|---|---|---|---|
| Haze | % | 0.4 | 0.4 | 0.5 |
| 80° C. shrinkage | % | 39 | 39 | 38 |
| Tensile break strength | Kg/mm² | 18.2 | 18.0 | 18.2 |
| Tensile break elongation | % | 220 | 210 | 220 |
| Stress at 100% elongation (length direction/width direction) | g/cm width | 410/190 | 600/200 | 800/250 |
| Stress at 200% elongation (length direction/width direction) | g/cm width | —/310 | —/450 | —/600 |
| Sealing temperature | °C. | 90 | 90 | 90 |
| Heat resisting temperature | °C. | 158 | 156 | 156 |
| Anti-fogging property | — | ⊚ | ⊚ | ⊚ |
| Sealability | — | ⊚ | ⊚ | ⊚ |
| Tear strength | g | 180 | 170 | 170 |
| Stiffness | mg | 25 | 33 | 45 |
| Thickness of film | $\mu$ | 5 | 7 | 10 |
| Stretchability* | | o | ⊚ | ⊚ |

| Characteristics | unit | Comparative 22 | Comparative 23 | Comparative 24 | Comparative 25 | Comparative 26 |
|---|---|---|---|---|---|---|
| Haze | % | 0.5 | 0.6 | 0.6 | 0.5 | 0.6 |
| 80° C. shrinkage | % | 38 | 38 | 37 | 38 | 38 |
| Tensile break strength | Kg/mm² | 12.0 | 12.5 | 12.7 | 12.0 | 12.6 |
| Tensile break elongation | % | 200 | 210 | 200 | 200 | 200 |
| Stress at 100% elongation (length direction/width direction) | g/cm width | 360/150 | 530/250 | 750/330 | 580/200 | 760/320 |
| Stress at 200% elongation (length direction/width direction) | g/cm width | —/300 | —/460 | —/750 | —/510 | —/740 |
| Sealing temperature | °C. | 89 | 90 | 89 | 90 | 90 |
| Heat resisting temperature | °C. | 155 | 157 | 157 | 157 | 158 |
| Anti-fogging property | — | o | ⊚ | ⊚ | ⊚ | ⊚ |
| Sealability | — | ⊚ | ⊚ | ⊚ | ⊚ | ⊚ |
| Tear strength | g | 3 | 4 | 4 | 7 | 10 |
| Stiffness | mg | 4 | 8 | 13 | 24 | 30 |
| Thickness of film | $\mu$ | 5 | 7 | 10 | 7 | 10 |
| Stretchability* | | x | Δ | o | Δ | o |

*
- ⊚: The number of punctures of bubble (per 1 hour) 1 or less
- o: The number of punctures of bubble (per 1 hour) 2-5
- Δ: The number of punctures of bubble (per 1 hour)
- x: The number of punctures of bubble (per 1 hour) 16 or more

EXAMPLE 14

A mixed composition ($M_{21}$) for SBC layer is prepared in the following manner. That is, 35% by weight of ethylene-vinyl acetate copolymer ($a_1$), 30% by weight of a linear low-density polyethylene ($a_{19}$) [copolymer of ethylene with 15% by weight of hexene-1 as α-olefin;' MI: 3.6; VSP: 82° C.; mp: 117° C.; density: 0.908 cm³], 25% by weight of a soft thermoplastic elastomer ($b_1$), 5% by weight of a crystalline polypropylene ($c_1$) and 5% by weight of crystalline polybutene-1 ($c_2$) are mixed, and to 100 parts by weight of the mixed resins is added 10 parts by weight of a hydrogenated cyclopentadiene resin ($AS_1$) as an AS agent and the resulting mixture is kneaded. Next, a mixed composition ($H_1$) for H layer is prepared in the same manner as in Example 1. Furthermore, linear low-density polyethylene ($a_{19}$) is prepared as a resin for R layer and ethylene-vinyl acetate copolymer ($a_2$) is prepared as a resin for S layer. These resins are thermoplasticized and melt mixed at a cylinder maximum temperature of 220° C. by the four extruders (for respective layers of M, H, R and S), respectively: an extruder having a screw of 50 mm in diameter (L/D=37) and an injection port at the position of L/D=8 from the tip portion, an extruder having a screw of 40 mm in diameter (L/D=29), an extruder having a screw of 40 mm in diameter (L/D=37) and an injection port at the position of L/D=8 from the tip portion, and an extruder having a screw of 40 mm in diameter (L/D=37) and an injection port at the position of L/D=12 from the tip portion. In this case, from the injection ports of the extruders for R layer and S layer, two anti-fogging agents of glycerin monooleate and diglycerin monooleate are injected so that each of the layers contained the anti-fogging agents in an amount of 1.5% by weight each and totally 3.0% by weight and are kneaded with the resins. Respective kneaded products are extruded from an annular die (die slit: 0.8 mm) having 7 layers of 4 kinds and rapidly cooled by a water cooling ring provided at the position of 5 cm from the tip of the die which uniformly discharges water to obtain a raw film of 180 mm$\phi$ and 35 $\mu$ thick (Run No. 70 in Table 26). Various raw films of Run Nos. 71–72 in Table 26 are obtained in the same manner as above with changing only the thickness.

Unevenness (in the circumferential direction) in thickness of the resulting raw films is within ±2%. Each of these raw films is passed between two pairs of carrying nip rolls and take-off nip rolls, where the films are heated to 45° C. by hot air and then air is introduced into the films as they are and the films are continuously inflated by the rectification contact guide to stretch them to about 3.2–3.6 times in length direction and about 3.2–3.7 times in width direction. The stretching terminated portion is cooled by an air ring from which cold air of 18° C. is jetted, folded by a deflator, and taken off by nip rolls and air of 60° C. is blown against the film and the film is shrunk by 15% in length direction and by 40% in width direction in a zone between two pairs of inlet nip rolls and outlet nip rolls, speed of the latter being slower 15% than that of the former and simultaneously the film is subjected to heat setting stabilization treatment and edge portions of the film are slit to separate into two films, which are respectively wound up under a constant tension to obtain desired films having a given thickness. Similarly, the films of the given thickness are obtained using raw films having the compositions and the construction of layers of Comparative Run Nos. 27–31 shown in Table 26 (3.0% by weight of the anti-fogging agent (same as used in Run Nos. 70–72) is injected into SBC layer and S layer in Comparative Run Nos. 27–31). Characteristics of the resulting film are shown in Table 27 The films of Run Nos. 70–72 are all excellent in stretchability and especially, even in the case of final thickness of 5 $\mu$ of Run No. 70, the film formation could be very stably performed with three punctures of bubble per 1 hour. On the other hand, film could be formed in Comparative Run No. 27, but many punctures, namely, 40 punctures occurred per 1 hour and film formation could not be stably performed.

The films of Run Nos. 70–72 are excellent in all of the characteristics and especially high in tear strength and it is a surprising effect that even the extremely thin film of 5 $\mu$ showed a value of 190 g. Moreover, they have high stiffness which shows the rigidity of the film and are superior in running properties on packaging machine.

In the same manner as in Example 13, wrapping is carried out with each of the films in Table 27 by the wrapping machine (pillow type and elevator type) for stretch wrapping used in Example 1. When the films of Run Nos. 70–71 are used, wrapping are easily obtained with occurrence of no creases even without using a simple shrink tunnel which discharges hot air and no break occurs. Furthermore, stretch wrapping by hands could be easily accomplished with no break. Even after transportation and stacking of the wrap, no great loosing of the film occurs. Even when objects having sharp projections such as frozen lobsters and frozen fishes are wrapped without using the simple tunnel, break does not occur or holes does not propagate even if it occurs in case of using the films of Run Nos. 70–72, though break occurs, frequently in case of conventional films. With reference to the films of Comparative Run Nos. 27–31, objects having no projections could be satisfactorily wrapped with the films of Run Nos. 29 and 31 only when the objects are wrapped without using a simple tunnel while the objects could not be satisfactorily wrapped with occurrence of many breaks in the case of using the films of Comparative Run Nos. 27, 28 and 30. Furthermore, when objects having projections are wrapped, many breaks occur in all of the films of Comparative Run Nos. 27–31 and they propagate and thus, satisfactory wraps could not be obtained.

As explained above, the films of the present invention have far more superior features than conventional films in the conventional use of shrink films and especially, even when the films are made to extremely thin films as compared with conventional films, such extremely thin films maintain sufficient practical characteristics.

TABLE 26

| Layer construc- | Run No. | | | Comparative |
|---|---|---|---|---|
| tion of raw film | 70 | 71 | 72 | 27 |
| The first layer $\mu$ | (S layer) $a_2$ 3 | (S layer) $a_2$ 5 | (S layer) $a_2$ 7 | (S layer) $a_2$ 3 |
| The second layer $\mu$ | (R layer) $a_{19}$ 4 | (R layer) $a_{19}$ 5 | (R layer) $a_{19}$ 7 | (SBC layer) $M_5$ 12 |
| The third layer $\mu$ | (H layer) $H_1$ 2 | (H layer) $H_1$ 3 | (H layer) $H_1$ 4 | (H layer) $H_1$ 4 |
| The forth layer $\mu$ | (SBC layer) $M_{21}$ 17 | (SBC layer) $M_{21}$ 24 | (SBC layer) $M_{21}$ 4 | (SBC layer) $M_5$ 13 |
| The fifth layer $\mu$ | (H layer) $H_1$ 2 | (H layer) $H_1$ 3 | (H layer) $H_1$ 4 | (S layer) $a_2$ 3 |
| The sixth layer $\mu$ | (R layer) $a_{19}$ 4 | (R layer) $a_{19}$ 5 | (R layer) $a_{19}$ 7 | — |
| The seventh layer $\mu$ | (S layer) $a_2$ 3 | (S layer) $a_2$ 5 | (S layer) $a_2$ 7 | — |
| Total thickness ($\mu$) | 40 | 50 | 70 | 35 |

| Layer construc- | Run No. | | | |
|---|---|---|---|---|
| tion of raw film | Comparative 28 | Comparative 29 | Comparative 30 | Comparative 31 |
| The first layer $\mu$ | (S layer) $a_2$ 5 | (S layer) $a_2$ 7 | (S layer) $a_2$ 5 | (S layer) $a_2$ 7 |
| The second layer $\mu$ | (SBC layer) $M_5$ 17 | (SBC layer) $M_5$ 25 | (SBC layer) $M_5$ 5 | (SBC layer) $M_5$ 7 |
| The third layer $\mu$ | (H layer) $H_1$ 5 | (H layer) $H_1$ 7 | (H layer) $H_1$ 3 | (H layer) $H_1$ 4 |
| The forth layer $\mu$ | (SBC layer) $M_5$ 18 | (SBC layer) $M_5$ 24 | (SBC layer) $M_5$ 24 | (SBC layer) $M_5$ 34 |
| The fifth layer $\mu$ | (S layer) $a_2$ 5 | (S layer) $a_2$ 7 | (H layer) $H_1$ 3 | (H layer) $H_1$ 4 |
| The sixth layer $\mu$ | — | — | (SBC layer) $M_5$ 5 | (SBC layer) $M_5$ 7 |
| The seventh layer $\mu$ | — | — | (S layer) $a_2$ 5 | (S layer) $a_2$ 7 |
| Total thickness ($\mu$) | 50 | 70 | 50 | 70 |

TABLE 27

| | | Run No. | | | Comparative |
|---|---|---|---|---|---|
| Characteristics | unit | 70 | 71 | 72 | 27 |
| Haze | % | 0.5 | 0.7 | 0.7 | 0.6 |
| 80° C. shrinkage | % | 36 | 36 | 37 | 30 |
| Tensile break strength | Kg/mm$^2$ | 10.1 | 10.4 | 10.5 | 7.9 |

TABLE 27-continued

| | | | | | |
|---|---|---|---|---|---|
| Tensile break elongation | % | 280 | 290 | 340 | 200 |
| Stress at 100% elongation (length direction/ width direction) | g/cm width | 150/ 50 | 200/ 60 | 280/ 100 | 160/ 70 |
| Stress at 200% elongation (length direction/ width direction) | g/cm width | 230/ 100 | 340/ 140 | 520/ 210 | 330/ 110 |
| Sealing temperature | °C. | 85 | 85 | 84 | 85 |
| Heat resisting temperature | °C. | 153 | 156 | 157 | 153 |
| Anti-fogging property | — | ⊚ | ⊚ | ⊚ | ⊚ |
| Sealability | — | ⊚ | ⊚ | ⊚ | ○ |
| Tear strength | g | 190 | 180 | 180 | 7 |
| Stiffness | mg | 11 | 20 | 29 | 3 |
| Thickness of film | μ | 5 | 7 | 10 | 5 |
| Stretchability* | | ○ | ⊚ | ⊚ | x |

| Characteristics | unit | Comparative 28 | Comparative 29 | Comparative 30 | Comparative 31 |
|---|---|---|---|---|---|
| Haze | % | 0.6 | 0.7 | 0.7 | 0.8 |
| 80° C. shrinkage | % | 31 | 30 | 33 | 35 |
| Tensile break strength | Kg/mm² | 8.1 | 8.0 | 8.0 | 8.1 |
| Tensile break elongation | % | 210 | 260 | 230 | 260 |
| Stress at 100% elongation (length direction/ width direction) | g/cm width | 230/ 90 | 330/ 120 | 240/ 95 | 320/ 130 |
| Stress at 200% elongation (length direction/ width direction) | g/cm width | 480/ 150 | 650/ 250 | 450/ 170 | 600/ 250 |
| Sealing temperature | °C. | 85 | 85 | 86 | 85 |
| Heat resisting temperature | °C. | 155 | 155 | 155 | 155 |
| Anti-fogging property | — | ⊚ | ⊚ | ⊚ | ⊚ |
| Sealability | — | ⊚ | ⊚ | ⊚ | ⊚ |
| Tear strength | g | 9 | 16 | 15 | 25 |
| Stiffness | mg | 5 | 8 | 10 | 17 |
| Thickness of film | μ | 7 | 10 | 7 | 10 |
| Stretchability* | | Δ | ○ | Δ | ○ |

*
- ⊚: The number of punctures of bubble (per 1 hour) 1 or less
- ○: The number of punctures of bubble (per 1 hour) 2-5
- Δ: The number of punctures of bubble (per 1 hour)
- x: The number of punctures of bubble (per 1 hour) 16 or more

COMPARATIVE EXAMPLE 1

Raw films having the compositions of respective layers and the construction of the layers as shown in Table 28 are prepared in the same manner as in Example 1 with adding the same additives in the same amount as in Example 1 to the first layer and the third layer (Comparative Run Nos. 32-36). It is attempted to subject these raw films to cold stretching in the same manner as in Example 1, but they could not be cold stretched at all and are punctured only by attempting to inflate them to 1.5-2.0 times in width direction for introducing air into the bubble. Therefore, the raw films of Comparative Run Nos. 32-33 are stretched to 4 times in length direction and 4 times in width direction at a stretching temperature of 115° C. to obtain films of 10 μ thick. With reference to Comparative Run Nos. 34-36, the raw films melted just below the die in preparation thereof and when the temperature reaches about 180° C., air is introduced into the tube to directly prepare an inflation bubbles, which are cooled to obtain films of 13 μ thick. Characteristics of the resulting films are shown in Table 29.

The resulting films of Comparative Run Nos. 32-33 are inferior in transparency and have a shrinkage of about 10% at 80° C. Further, they are inferior in sealability (narrow in temperature range). The shrink wrapping test of Example 1 is conducted using these films to find that tight wrapping with no creases could not be performed unless temperature of the shrinking tunnel is 120° C. and passing time is about 5 seconds. (As mentioned in Example 1, satisfactory wrapping could be performed with the films of the present invention under the conditions of 90° C. and 2 seconds.)

The films of Comparative Run Nos. 34-36 are also inferior in transparency and sealability, and small in stress at elongation, but low in stiffness. When stretch wrapping (by wrapping machine) as carried out in Example 1 is carried out using these films, creases remained, finish is unsatisfactory, sealability is inferior and besides, the tucked film peels off and thus, only such wrapping as having problems could be performed. Moreover, the films are inferior in recovery from deformation against projections and permanently deformed. Furthermore, stretch wrapping (both the wrappings by machine and hands) with the films of Comparative Run Nos. 32-33 is impossible.

TABLE 28

| | Comparative 32 | Comparative 33 | Comparative 34 | Comparative 35 | Comparative 36 |
|---|---|---|---|---|---|
| The first layer (%) | a₂ (15) | a₂ (20) | a₂ (100) | a₁₆ (100) | a₂ (30) |
| The second layer (%) | a₃ (70) | a₂ (60) | — | — | c₂ (40) |
| The third layer (%) | a₂ (15) | a₃ (30) | — | — | a₂ (30) |

TABLE 29

| | | Run No. | | | | |
|---|---|---|---|---|---|---|
| Characteristics | unit | Comparative 32 | Comparative 33 | Comparative 34 | Comparative 35 | Comparative 36 |
| Haze | % | 2.0 | 2.3 | 2.2 | 2.0 | 3.0 |
| 80° C. shrinkage | % | 12 | 10 | Did not shrink | Did not shrink | Did not shrink |
| Tensile break strength | Kg/mm² | 10.2 | 9.3 | 2.5 | 6.0 | 6.5 |
| Tensile break elongation | % | 150 | 130 | 450 | 600 | 330 |
| Stress at 100% elongation (length direction/ width direction) | g/cm width | 940/ 400 | 930/ 420 | 170/ 90 | 130/ 90 | 300/ 120 |
| Stress at 200% elongation (length direction/ | g/cm width | —/ — | —/ — | 230/ 100 | 260/ 100 | 450/ 130 |

TABLE 29-continued

| Charac-teristics | unit | Com-para-tive 32 | Com-para-tive 33 | Com-para-tive 34 | Com-para-tive 35 | Com-para-tive 36 |
|---|---|---|---|---|---|---|
| width direction) | | | | | | |
| Sealing temperature | °C. | 87 | 100 | 87 | 100 | 87 |
| Heat resisting temperature | °C. | 98 | 110 | 85 | 110 | 100 |
| Anti-fogging property | — | Δ | x | ⊙ | x | ○ |
| Sealability | — | Δ | x | x | x | Δ |
| Tear strength | g | 10 | 22 | 50 | 300 | 100 |
| Stiffness | mg | 12 | 16 | 6 | 20 | 6 |
| Thickness of film | μ | 10 | 10 | 13 | 13 | 13 |

COMPARATIVE EXAMPLE 2

Raw films of Run Nos. 37-39 having the compositions of respective layers and the construction of the layers as shown in Table 30 are prepared in the same manner as in Run No. 1 of Example 1. These raw films are subjected to the same cold stretching and heat setting stabilization treatment as in Example 1 to obtain films of 10 μ thick.

All of the raw films of Comparative Run Nos. 37-39 could be cold stretched and stably formed into films. The film of Comparative Run No. 37 is superior in transparency, but inferior in sealability (narrow in temperature range) and has little stiffness. The film of Comparative Run No. 38 is superior in transparency, but inferior in sealability and has no stiffness as the film of Comparative Run No. 37. When stretch wrapping test is conducted as in Example 1 using the films of Comparative Run Nos. 37-38, only such wrapping as those having creases and inferior in finish could be performed and sealing is insufficient and the tucked film peeled off. Besides, since the films have no stiffness, sticking of the films to the rolls in the wrapping machine often occurs.

The film of Comparative Run No. 39 is superior in transparency and in sealing range, but when the sealed portion is pulled, the surface layer readily peeled off. In addition, tear strength is lower (18 g) than 74 g of the film of Run No. 34. When the aforementioned stretch wrapping test is conducted, the wrapping is possible at low speed packaging, but when wrapping is carried out at a high speed of 100 raps/min, break often occurred upon contacting with edged of tray or contents. Anti-fogging property is in the grade of "Δ". When the content has projections, the film is readily torn and satisfactory wrapping could not be attained.

TABLE 30

| Layer construc-tion of raw film | Comparative 37 | Comparative 38 | Comparative 39 |
|---|---|---|---|
| The first layer μ | (SBC layer) $M_1$ 90 | (S layer) $a_2$ 9 | (S layer) $a_2$ 9 |
| The second layer μ | — | (SBC layer) $M_1$ | (H layer) $H_1$ |
| The third layer | — | (S layer) $a_2$ | (SBC layer) $M_9$ |
| The forth layer μ | — | 9 | 63 (H layer) $H_1$ 4 |
| The fifth layer μ | — | — | (S layer) $a_2$ 9 |
| Total thickness (μ) | 90 | 90 | 90 |

COMPARATIVE EXAMPLE 3

A raw film having a thickness of 160 μ and having the composition and the construction of layers of Run No. 1 in Example 1 is subjected to hot stretching to 4 times in length direction and 4 times in width direction at 130° C. to obtain a film of 10 μ thick. The resulting film has a haze of 2.2%, a shrinkage percentage of 4% at 80° C. and a tear strength of 4 g. When hand stretching is carried out with this film, a large amount of necking (unevenness in thickness) occurs in the direction of stretching and this is not desired. Moreover, creases which occurred in the wrapping could not removed and the film is readily torn. Besides, recovery from deformation is extremely inferior.

INDUSTRIAL APPLICABILITY

The present invention relates to a high-strength multi-layered film stretched and oriented in at least monoaxial direction which comprises at least 5 layers comprising at least one layer containing a specific mixed composition which mainly improves stretchability, a layer which improves elastic modulus and heat resistance of the film and which is mainly composed of at least one hard polymer selected from crystalline polybutene and the like, an auxiliary layer which mainly further improves strength of the film, a surface layer which improves optical characteristics of the surface and the like, and other layers and to a method for producing such film. The film of the present invention is excellent in heat resistance, low-temperature shrinkability, stretchability, tear strength and impact strength and besides, in practical wrapping properties and in addition, shows sufficient practicality even in the form of extremely thin film which has not been present. Therefore, the film has high practicality in the uses such as shrink wrapping, stretch wrapping, stretch-shrink wrapping, skin pack wrapping, contact household wrapping, non-shrink wrapping, soft deep-draw wrapping and has a very high industrial applicability.

We claim:

1. A high-strength multi-layered film excellent in heat resistance, shrinkability and stretchability which comprises at least five layers comprising a surface layer (S layer) mainly composed of at least one polymer selected from (A), (B), crystalline 1,2-polybutadiene and soft ethylenic polymer ionomer resin and as inner layers at least one base layer (SBC layer) containing mainly a mixed composition selected from (A)+(B)+(C), (A)+(B) and (B)+(C), at least one core layer (H layer) containing mainly a polymer selected from (C), and at least one auxiliary layer (R layer) containing mainly an ethylene-α-olefin copolymer soft elastomer selected from component (B) and having a melt index of 0.1 to 10, a density of 0.905 to 0.870 g/cm$^3$ and an ethylene content of 95 to 85 mol % or an ethylene-α-olefin copolymer selected from component (A) and having a melt index of 0.1 to 10, a density of 0.905 to 0.935 g/cm$^3$, an ethylene content of 99 to 90 mol % and whose α-olefin has 4 to 12 carbon atoms, with a proviso that when R layer is adjacent to the S layer, the R layer comprises a resin different from that of the S layer, and said (A) being an ethylene-α-olefin copolymer selected from component (A) and having a density of 0.905 to 0.935 g/cm$^3$ and the Vicat softening point of this resin is 1.05 times or more the Vicat softening point of a resin of the surface layer (S layer), and said (C) being selected from a crystalline polypropylene, a crystalline polybutene-1, a crystalline poly-4-methylpentene-1 and a mixture thereof.

2. A multi-layered film according to claim 1, wherein the low-density polyethylene of the component (A) is a linear low-density polyethylene (including ultra-low-density polyethylenes) and is a copolymer of at least one α-olefin of 3-12 carbon atoms with ethylene.

3. A multi-layered film according to claim 2, wherein the low-density polyethylene has a Vicat softening point of 80° C. or higher.

4. A multi-layered film according to claim 1, wherein the component (B) is at least one soft elastomer selected from an ethylene-α-olefin copolymer, a copolymer of different α-olefins, a butyl rubber copolymer, a 1,2-polybutadiene polymer, a styrene-conjugated diene derivative copolymer, and an at least partially hydrogenated styrene-conjugated diene derivative copolymer.

5. A multi-layered film according to claim 1, wherein the soft elastomer of the component (B) is an ethylene-α-olefin copolymer comprising 95-5 mol % of ethylene and at least one α-olefin having 3-12 carbon atoms.

6. A multi-layered film according to claim 4 or 5, wherein the ethylene-α-olefin copolymer of the component (B) has a melt index of 0.1-10 and a density of 0.905 g/cm$^3$ or less.

7. A multi-layered film according to claim 1, wherein the mixed composition of the base layer (SBC layer) has a weight ratio of the components of $0.90 > B/(A+B) > 0.05$ or $0.90 > B/(B+C) > 0.30$ or $0.90 > B/(A+B) > 0.05$ and $2.0 > C/(A+B) > 0.05$.

8. A multi-layered film according to claim 1, wherein the surface layer (S layer) is mainly composed of at least one polymer selected from the linear low-density polyethylene (including ultra-low-density polyethylene) and ethylene-vinyl acetate copolymer selected from the component (A).

9. A multi-layered film according to claim 1, wherein the auxiliary layer (R layer) is mainly composed of at least one polymer selected from an ethylene-α-olefin copolymer soft elastomer selected from the component (B) which has a melt index of 0.1–10 and a density of 0.905–0.870 g/cm$^3$ and has an ethylene content of 95–85 mol % and a linear low-density polyethylene (including ultra-low-density polyethylene) selected from the component (A) which has a melt index of 0.1–10 and a density of 0.905–0.935 g/cm$^3$ and has an ethylene content of 99–90 mol %.

10. A multi-layered film according to claim 1, wherein when R layer is adjacent to S layer, the R layer comprises an ethylene-α-olefin copolymer selected from the component (A) which has a density of 0.905–0.935 g/cm$^3$ and a Vicat softening point which is 1.05 times or more than that of the resin of the surface layer (S layer).

11. A multi-layered film according to claim 1, wherein the core layer (H layer) is mainly composed of a mixed composition comprising a crystalline polypropylene and a crystalline polybutene-1 of the component (C).

12. A multi-layered film according to claim 1, having a 7 layer construction of S/R/H/SBC/H/R/S.

13. A multi-layered film according to claim 1 or 12, wherein thickness of the base layer (SBC layer) is 20–80% of the total thickness, that of the skin layer (S layer) is 5–40% of the total thickness, that of the core layer (H layer) is 5–50% of the total thickness, and that of the auxiliary layer (R layer) is 10–70% of the total thickness.

14. A multi-layered film according to claim 12, wherein the film is treated with energy beam and at least one layer contains 0–70% by weight of boiling xylene insoluble gel and has a melt index of 1.0 or less.

15. A high-strength multi-layered film excellent in heat resistance, shrinkability and stretchability which comprises at least five layers comprising a surface layer (S layer) composed of at least one polymer selected from (A), (B), crystalline 1,2-polybutadiene and soft ethylenic copolymer ionomer resin and as inner layers at least one base layer (SBC layer) containing a mixed composition selected from (A)+(B)+(C), (A)+(B) and (B)+(C), at least one core layer (H layer) containing a polymer selected from (C), and at least one auxiliary layer (R layer) containing an ethylene-α-olefin copolymer soft elastomer selected from component (B) and having a melt index of 0.1 to 10, a density of 0.905 to 0.870 g/cm$^3$ and an ethylene content of 95 to 85 mol % or an ethylene-α-olefin copolymer selected from component (A) and having a melt index of 0.1 to 10, a density of 0.905 to 0.935 g/cm$^3$, an ethylene content of 99 to 99 mol % and whose α-olefin has 4 to 12 carbon atoms, with a proviso that when R layer is adjacent to the S layer, the R layer comprises a resin different from that of the S layer, and said (A) being an ethylene-α-olefin copolymer selected from component (A) and having a density of 0.905 to 0.935 g/cm$^3$ and the Vicat softening point of this resin is 1.05 times or more the Vicat softening point of a resin of the surface layer (S layer), and said (C) being selected from a crystalline polypropylene, a crystalline polybutene-1, a crystalline poly-4-methylpentene-1 and a mixture thereof.

* * * * *